US012548087B1

(12) United States Patent
Therrien et al.

(10) Patent No.: US 12,548,087 B1
(45) Date of Patent: Feb. 10, 2026

(54) ONLINE SERVICE PROVIDER (OSP) MONITORING RUNNING STATISTIC OF INCOMING DATASETS OF ENTITY IN RELATION TO HIGHER-BURDEN THRESHOLD OF DOMAIN IDENTIFIED FROM PLURALITY OF DOMAINS, FOR NOTIFYING THE ENTITY OF RARE RISK OF NEGATIVE CONSEQUENCES OF THE RUNNING STATISTIC REACHING THE HIGHER-BURDEN THRESHOLD WITHIN CURRENT TIME PERIOD, AND OPPORTUNITY TO AVOID THE NEGATIVE CONSEQUENCES

(71) Applicant: Avalara, Inc., Seattle, WA (US)

(72) Inventors: Seth Therrien, Seattle, WA (US);
Jonathan Parramore, Seattle, WA (US); Sujoy Paul, Redmond, WA (US);
Trevor Thomas, Seattle, WA (US);
Kelly Woznicki, Seattle, WA (US);
Jacob Wallace Bixby, Seattle, WA (US); Kevin Robert Halverson, Seattle, WA (US); Gregory T. Kavounas, Bellevue, CA (US)

(73) Assignee: Avalara, Inc., Seattle, WA (US)

( * ) Notice: Subject to any disclaimer, the term of this patent is extended or adjusted under 35 U.S.C. 154(b) by 269 days.

(21) Appl. No.: 18/219,529

(22) Filed: Jul. 7, 2023

Related U.S. Application Data

(63) Continuation-in-part of application No. 16/585,829, filed on Sep. 27, 2019, now Pat. No. 11,928,744.

(Continued)

(51) Int. Cl.
*G06Q 10/0637* (2023.01)
*G06Q 40/10* (2023.01)

(52) U.S. Cl.
CPC .................................. *G06Q 40/10* (2013.01)

(58) Field of Classification Search
CPC ...................................................... G06Q 40/10
See application file for complete search history.

(56) References Cited

U.S. PATENT DOCUMENTS

| 5,335,169 A | 8/1994 | Chong | |
|---|---|---|---|
| 6,163,773 A * | 12/2000 | Kishi | G06F 12/121 |
| | | | 711/134 |

(Continued)

FOREIGN PATENT DOCUMENTS

WO 2013/163625 A1 10/2013

OTHER PUBLICATIONS

"Sales and Transactions Checker for Economic Nexus," TaxJar, Feb. 19, 2019, https://www.taxjar.com/sales-and-transactions-checker/, 8 pages.

(Continued)

*Primary Examiner* — Ojo O Oyebisi
(74) *Attorney, Agent, or Firm* — Jeremiah J. Baunach; Frontier IP Law PLLC

(57) ABSTRACT

In embodiments, an Online Service Provider (OSP) receives incoming datasets of a primary entity, and computes one or more running statistics of the datasets, such as their number or a sum of their base values. The OSP may further monitor the statistics in relation to a higher-burden threshold of a domain identified from plurality of domains. When the running statistic is still less than the higher-burden threshold, the OSP may further estimate a prospective net gain of continuing. In rare cases there is a risk that a prospective net gain could become negative, if the running statistic crosses the higher-burden threshold late in the current time period but before the end of it. In such cases, the OSP may send to the primary entity a rare opportunity notification about (Continued)

avoiding the risk, by pausing, for the remaining current time period, the activity that sends datasets for the identified domain.

12 Claims, 42 Drawing Sheets

Related U.S. Application Data

(60) Provisional application No. 62/831,179, filed on Apr. 8, 2019.

(56) References Cited

U.S. PATENT DOCUMENTS

| | | |
|---|---|---|
| 6,236,365 B1 | 5/2001 | Leblanc et al. |
| 6,993,502 B1 | 1/2006 | Gryglewicz et al. |
| 7,200,569 B2 | 4/2007 | Gallagher et al. |
| 7,257,553 B1 | 8/2007 | Baker |
| 7,337,910 B2 | 3/2008 | Cartmell et al. |
| 7,516,242 B2 | 4/2009 | Furukawa et al. |
| 7,606,741 B2 | 10/2009 | King et al. |
| 7,783,536 B2 | 8/2010 | William et al. |
| 7,933,803 B1 | 4/2011 | Nadler et al. |
| 7,945,536 B2 | 5/2011 | Bao et al. |
| 8,099,342 B1 | 1/2012 | Christian et al. |
| 8,265,974 B2 | 9/2012 | Wadhwani et al. |
| 8,386,344 B2 | 2/2013 | Christian et al. |
| 8,458,337 B2 | 6/2013 | Corley et al. |
| 8,526,405 B2 | 9/2013 | Curtis et al. |
| 8,528,047 B2 | 9/2013 | Terzis et al. |
| 8,613,044 B2 | 12/2013 | Casey et al. |
| 8,620,578 B1 | 12/2013 | Brown et al. |
| 8,725,407 B2 | 5/2014 | Hurley et al. |
| 8,751,399 B2 | 6/2014 | Kolhatkar et al. |
| 8,849,862 B2 | 9/2014 | Scott |
| 8,904,493 B1 | 12/2014 | Dibble |
| 9,101,834 B2 | 8/2015 | Letourneau et al. |
| 9,323,428 B1 | 4/2016 | Maguire et al. |
| 9,342,367 B2 | 5/2016 | Koneti et al. |
| 9,613,190 B2 | 4/2017 | Ford et al. |
| 9,734,169 B2 | 8/2017 | Redlich et al. |
| 9,760,915 B2 | 9/2017 | Pavlou et al. |
| 9,762,553 B2 | 9/2017 | Ford et al. |
| 10,033,702 B2 | 7/2018 | Ford et al. |
| 10,043,035 B2 | 8/2018 | Lafever et al. |
| 10,332,216 B2 | 6/2019 | Barsade et al. |
| 10,374,968 B1 | 8/2019 | Duerk et al. |
| 10,445,818 B1 | 10/2019 | Chowdhary |
| 10,572,684 B2 | 2/2020 | Lafever et al. |
| 10,572,953 B1 | 2/2020 | Char et al. |
| 10,614,130 B1 | 4/2020 | Pai et al. |
| 10,628,582 B2 | 4/2020 | Reybok et al. |
| 10,764,254 B2 | 9/2020 | Ford et al. |
| 10,769,611 B2 | 9/2020 | Mcneel |
| 10,789,590 B2 | 9/2020 | Tran et al. |
| 10,872,100 B1 | 12/2020 | Shefferman et al. |
| 10,997,251 B2 | 5/2021 | Tran et al. |
| 11,030,341 B2 | 6/2021 | Lafever et al. |
| 11,106,794 B2 | 8/2021 | Chow |
| 11,176,620 B1 | 11/2021 | Lubczynski et al. |
| 11,238,542 B1 | 2/2022 | Wixted et al. |
| 11,431,812 B2 | 8/2022 | Kavounas et al. |
| 11,455,410 B2 | 9/2022 | Turgeman et al. |
| 11,463,375 B1 | 10/2022 | Kushniruk et al. |
| 11,475,430 B2 | 10/2022 | Burton et al. |
| 11,514,448 B1 | 11/2022 | Liberman |
| 11,632,419 B1 | 4/2023 | Robles et al. |
| 11,853,302 B1 | 12/2023 | Nash et al. |
| 2001/0005675 A1 | 6/2001 | Aho |
| 2001/0034767 A1 | 10/2001 | Aho |
| 2002/0116456 A1 | 8/2002 | Morita |
| 2002/0138649 A1 | 9/2002 | Cartmell et al. |
| 2002/0138765 A1 | 9/2002 | Fishman et al. |
| 2003/0055754 A1 | 3/2003 | Sullivan |
| 2003/0093320 A1 | 5/2003 | Sullivan |
| 2003/0101112 A1 | 5/2003 | Gallagher et al. |
| 2003/0144931 A1 | 7/2003 | Stokes et al. |
| 2004/0004967 A1 | 1/2004 | Nakatsugawa et al. |
| 2004/0083306 A1 | 4/2004 | Gloe |
| 2004/0179539 A1 | 9/2004 | Takeda et al. |
| 2004/0215707 A1 | 10/2004 | Fujita et al. |
| 2005/0125335 A1 | 6/2005 | Bross et al. |
| 2005/0255811 A1 | 11/2005 | Allen et al. |
| 2006/0053208 A1 | 3/2006 | Laurila et al. |
| 2006/0085275 A1 | 4/2006 | Stokes et al. |
| 2006/0235776 A1 | 10/2006 | Temme |
| 2006/0282900 A1 | 12/2006 | Johnson et al. |
| 2007/0073892 A1 | 3/2007 | Laurila et al. |
| 2007/0124294 A1 | 5/2007 | Sun et al. |
| 2007/0136158 A1 | 6/2007 | Rawlings et al. |
| 2007/0136159 A1 | 6/2007 | Rawlings et al. |
| 2007/0136475 A1 | 6/2007 | Leppisaari et al. |
| 2007/0203718 A1 | 8/2007 | Merrifield, Jr. |
| 2007/0239464 A1 | 10/2007 | Carroll |
| 2008/0104124 A1 | 5/2008 | Bao et al. |
| 2008/0154754 A1 | 6/2008 | William et al. |
| 2009/0006467 A1 | 1/2009 | Visscher |
| 2009/0024698 A1 | 1/2009 | Ho et al. |
| 2009/0067395 A1 | 3/2009 | Curtis et al. |
| 2009/0076965 A1 | 3/2009 | Elson et al. |
| 2009/0082008 A1 | 3/2009 | Thorell |
| 2009/0138307 A1 | 5/2009 | Belcsak et al. |
| 2009/0187500 A1 | 7/2009 | Wilson et al. |
| 2009/0279455 A1 | 11/2009 | Wang et al. |
| 2010/0095359 A1 | 4/2010 | Gordon |
| 2010/0211634 A1 | 8/2010 | Song et al. |
| 2011/0022485 A1 | 1/2011 | Von et al. |
| 2011/0187864 A1 | 8/2011 | Snider |
| 2012/0011518 A1 | 1/2012 | Duan et al. |
| 2012/0179801 A1 | 7/2012 | Luna et al. |
| 2012/0239731 A1 | 9/2012 | Shyamsunder et al. |
| 2013/0013471 A1 | 1/2013 | Fishman |
| 2013/0061179 A1 | 3/2013 | Alletto et al. |
| 2013/0086380 A1 | 4/2013 | Krishnaswamy et al. |
| 2013/0191883 A1 | 7/2013 | Tung |
| 2013/0268357 A1 | 10/2013 | Heath |
| 2013/0281115 A1 | 10/2013 | Dupray et al. |
| 2013/0290200 A1 | 10/2013 | Singhal et al. |
| 2013/0317944 A1 | 11/2013 | Huang et al. |
| 2013/0346608 A1 | 12/2013 | Tung |
| 2014/0094199 A1 | 4/2014 | Palanki et al. |
| 2014/0172526 A1 | 6/2014 | Arrocho et al. |
| 2014/0172656 A1 | 6/2014 | Shaw |
| 2014/0222524 A1 | 8/2014 | Pluschkell et al. |
| 2014/0289386 A1 | 9/2014 | Vatto et al. |
| 2014/0337189 A1 | 11/2014 | Barsade et al. |
| 2014/0351105 A1 | 11/2014 | Hamm |
| 2015/0019591 A1 | 1/2015 | Visscher |
| 2015/0058931 A1 | 2/2015 | Miu et al. |
| 2015/0154717 A1 | 6/2015 | Stibel et al. |
| 2015/0163206 A1 | 6/2015 | Mccarthy et al. |
| 2015/0310188 A1 | 10/2015 | Ford et al. |
| 2016/0042466 A1 | 2/2016 | Herndon et al. |
| 2016/0062949 A1 | 3/2016 | Smith et al. |
| 2016/0099963 A1 | 4/2016 | Mahaffey et al. |
| 2016/0140668 A1 | 5/2016 | Maguire et al. |
| 2016/0179874 A1 | 6/2016 | Lynch |
| 2017/0041296 A1 | 2/2017 | Ford et al. |
| 2017/0140471 A1 | 5/2017 | Hemberg et al. |
| 2017/0142076 A1 | 5/2017 | Ford et al. |
| 2017/0272316 A1 | 9/2017 | Johnson et al. |
| 2017/0272485 A1 | 9/2017 | Gordon et al. |
| 2017/0330121 A1 | 11/2017 | Sullivan et al. |
| 2018/0096175 A1 | 4/2018 | Schmeling et al. |
| 2018/0150647 A1 | 5/2018 | Naqvi et al. |
| 2018/0176099 A1 | 6/2018 | Guo et al. |
| 2018/0246479 A1 | 8/2018 | Judd et al. |
| 2018/0307859 A1 | 10/2018 | Lafever et al. |
| 2018/0367506 A1 | 12/2018 | Ford et al. |
| 2019/0114609 A1 | 4/2019 | Burton et al. |
| 2019/0222560 A1 | 7/2019 | Ford et al. |
| 2019/0332807 A1 | 10/2019 | Lafever et al. |
| 2020/0117690 A1 | 4/2020 | Tran et al. |

(56) References Cited

U.S. PATENT DOCUMENTS

| | | |
|---|---|---|
| 2020/0328951 A1 | 10/2020 | Vishwakarma |
| 2020/0349572 A1 | 11/2020 | O'Sullivan et al. |
| 2020/0356974 A1 | 11/2020 | Mcneel |
| 2020/0387527 A1 | 12/2020 | Visscher |
| 2020/0387896 A1 | 12/2020 | Tran et al. |
| 2021/0082051 A1 | 3/2021 | Moses |
| 2021/0158456 A1 | 5/2021 | Morgan et al. |
| 2021/0233181 A1 | 7/2021 | Bubalo et al. |
| 2023/0403337 A1 | 12/2023 | Kavounas et al. |

OTHER PUBLICATIONS

"What is Nexus?" Sales Tax Institute, Aug. 26, 2019, https://www.salestaxinstitute.com/sales_tax_faqs/what_is_nexus, 6 pages.

Deseir, "Digital Transformation Challenges In Large and Complex Organizations", 2018.

Ellen Wixted et al., "Online Interactive Notification Platform for Exploring Possible Tax Nexus and Implications," USAN: U.S. Appl. No. 16/775,771, filed Jan. 29, 2020. (111 pages).

International Preliminary Report on Patentability received for PCT Patent Application No. PCT/US2021/040168, mailed on Jan. 12, 2023, 9 pages.

International Search Report and Written Opinion received for PCT Patent Application No. PCT/US2021/040168, mailed on Oct. 22, 2021, 10 pages.

Maccarrone, "The Impact of the U.S. Supreme Court's Decision in South Dakota v. Wayfair," 2021, retrieved from https://www.cpajournal.com/2021/04/26/the-impace-of-the-u-s-supreme-courts-decision-in-south-dakota-v-wayfair/, 11 pages.

Morgan et al., "Assembling Parameters To Compute Taxes for Cross-Border Sales," U.S. Appl. No. 16/696,062, filed Nov. 26, 2019, 75 pages.

Nash, Nikki, et al., "Automatically Starting Activities Upon Crossing Threshold", U.S. Appl. No. 17/338,220, filed Jun. 3, 2021, 107 pages.

Pichan et al., "Cloud Forensics: Technical Challenges, solutions, and comparative analysis", Digital Investigation, vol. 13, Jun. 2015, pp. 38-57.

Sales Tax Institute, "How do I know if I should be collecting tax in a state", Sales Tax Institute, Aug. 12, 2017, 2 pages.

Seth Therrien et al., "Tax Nexus Notification Platform," USAN: U.S. Appl. No. 16/585,829, filed Sep. 27, 2019. (72 pages).

Smith, "Due Process Implications Related to State Notice and Economic Nexus Laws," Tax Lawyer 70(4):833-868, 2017.

Stefan Kim et al., "Disestablishing Entity's Selected Resource Computation in Response To Loss of Nexus Establishment Condition for Selected Domain," USAN: U.S. Appl. No. 16/834,934, filed Mar. 30, 2020. (63 pages).

Taxconnex, "Sales Tax Nexus Guide", taxconnex, Whitepaper, 2019, 18 pages.

The Seller's Guide to eCommerce Sales Tax, TaxJar, Jun. 18, 2019, https://www.taxjar.com/guides/intro-to-sales-tax/, 19 pages.

Yetter, "Sales Tax Institute helps you understand sales and use tax obligations," YouTube Video, Dec. 15, 2011, URL=https://www.youtube.com/watch?v=gKFe1W062Ok&feature=emb_logo, download date Sep. 10, 2019, 1 page. (Screenshot).

Hu et al, "Game Theoretic Analysis for Offense—Defense Challenges of Algorithm Contests on TopCoder", 2015 IEEE Symposium on Science Oriented System Engineering Mar. 2015, IEEE Publiishing.

\* cited by examiner

SAMPLE RECEIVED DATASETS

FIG. 12  *SAMPLE SORTING OF DATASETS*

SAMPLE STATISTICS OF DATASETS, AND HIGHER-BURDEN THRESHOLDS

FIG. 14  *SAMPLE RUNNING STATISTICS*

FIG. 16      METHODS

FIG. 17    EMBODIMENTS

EMBODIMENTS –
FIRST SCENARIO

EMBODIMENTS –
SECOND SCENARIO

EMBODIMENTS –
THIRD SCENARIO

FIG. 22 — USER INTERFACE (UI)

*EMBODIMENTS*

FIG. 24     METHODS

SAMPLE RECEIVED DATASETS

*SAMPLE SORTING OF DATASETS*

APPLY RULES TO DATASETS TO DETERMINED WHETHER ECONOMIC NEXUS HAS BEEN REACHED

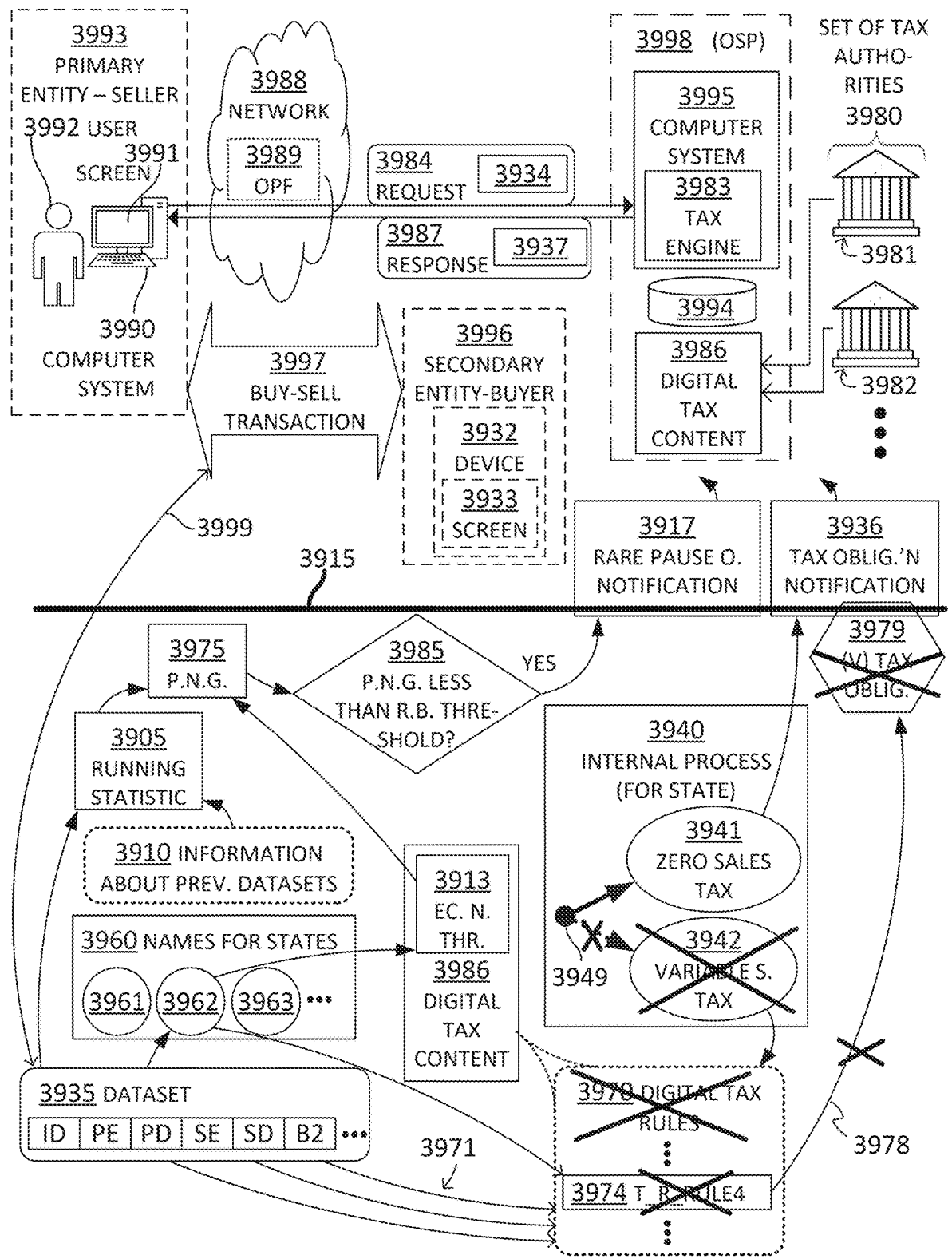
FIG. 39     USE CASE

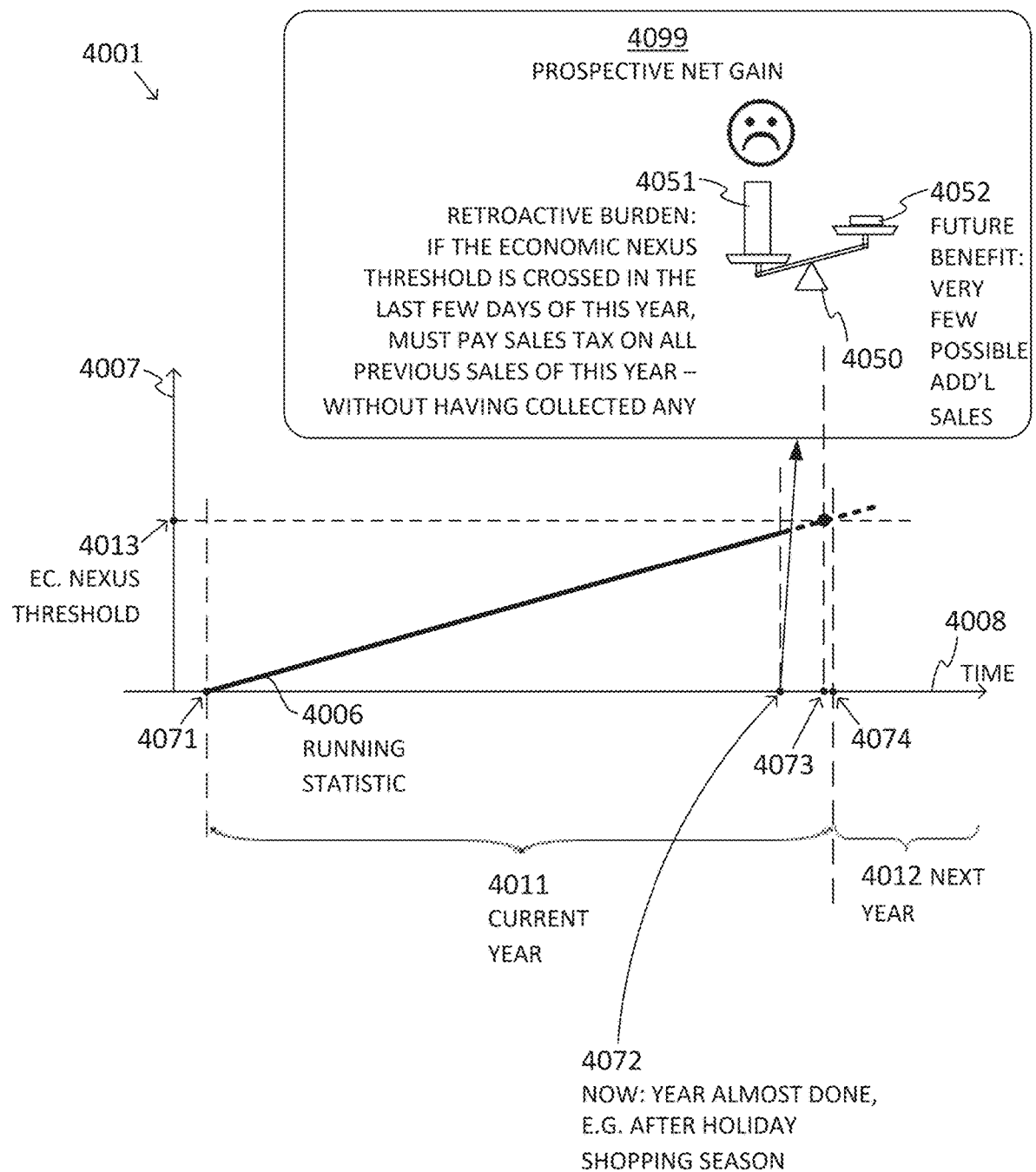
FIG. 40     *USE CASE*

4191 SCREEN  
4100 UI

A) NOTIFICATION OF RARE RISK & PAUSE-OPPORTUNITY:
Right now you have developed a rare risk, because an unusual coincidence has occurred:

THE UNUSUAL OCCURRENCE:

1)    Your sales in this state will very soon cross the economic nexus threshold, where you have to report and pay more sales tax, retroactively, and which you have not been collecting.

And:  2)    You are unlikely to make that many more sales in this state during this year, based on:
    a) your historical sales in this and other states, and
    b) the fact that little time is left until the end of the year.
    (In fact, now is December 26, which is near the end of the year, and most people have finished their purchases for the holiday season.)

YOUR RARE RISK, therefore, is that:
    if you make one more sale in this state before the end of the year,
    then you will owe sales taxes to this state based on all of your prior sales of this year,
    and these are *sales taxes that you have not been collecting so far*, while
    based on your historical data in this and other states, it is unlikely that you will have enough new sales during this year to offset this.

B) YOUR OPPORTUNITY TO AVOID THIS RARE RISK:
You may pause your sales this year, in this state. This way you will not have to pay sales tax for this whole year, which you have not been collecting. Make it so that those who want to buy will be notified to come back after January 1.

We will remind you to resume on January 1.

FIG. 41

*USER INTERFACE (UI)*
*IN USE CASE*

ONLINE SERVICE PROVIDER (OSP) MONITORING RUNNING STATISTIC OF INCOMING DATASETS OF ENTITY IN RELATION TO HIGHER-BURDEN THRESHOLD OF DOMAIN IDENTIFIED FROM PLURALITY OF DOMAINS, FOR NOTIFYING THE ENTITY OF RARE RISK OF NEGATIVE CONSEQUENCES OF THE RUNNING STATISTIC REACHING THE HIGHER-BURDEN THRESHOLD WITHIN CURRENT TIME PERIOD, AND OPPORTUNITY TO AVOID THE NEGATIVE CONSEQUENCES

CROSS-REFERENCE TO RELATED APPLICATIONS

This patent application is a Continuation-In-Part of co-pending U.S. patent application Ser. No. 16/585,829, filed on Sep. 27, 2019, which claims benefit of provisional 62/831,179, filed on Apr. 8, 2019, commonly assigned herewith.

This patent application may be found to be related to U.S. patent application Ser. No. 17/127,205, filed on Dec. 18, 2020 and issued as U.S. Pat. No. 11,632,419, and also to U.S. patent application Ser. No. 17/185,732, filed on Feb. 25, 2021 and issued as U.S. Pat. No. 11,463,375, and also to U.S. patent application Ser. No. 17/188,910, filed on Mar. 1, 2021 and issued as U.S. Pat. No. 11,403,419, and also to U.S. patent application Ser. No. 17/365,339, filed on Jul. 1, 2021 and issued as U.S. Pat. No. 11,431,812, all commonly assigned herewith.

BACKGROUND

Online software platforms (OSPs) perform computations and related tasks for clients.

SUMMARY

The present description gives instances of computer systems, computer-readable media, and methods in connection with new and improved online service providers and online software platforms that provide software services. Providing, in a timely and efficient manner, insightful notifications may help an entity optimize their operations just in time, and may result in avoiding the need to operations that would be needed for corrections, had the notifications not been provided or heeded.

In first embodiments, an online service provider (OSP) receives datasets of an entity, identifies a certain domain out of many, monitors a running statistic of the datasets associated with the certain domain, and notifies the entity if the running statistic reaches, within a current time period, a higher-burden threshold of the certain domain.

In particular, an Online Service Provider (OSP) receives datasets of a primary entity, identifies a certain domain out of many possible domains, and computes one or more running statistics of those of the datasets that are associated with the specific domain. The running statistic can be the number of the datasets of the specific domain, a sum of their base values, and so on. If the running statistic reaches, within a current time period, a higher-burden threshold of the specific domain, the OSP may send to the primary entity a higher-burden notification about a burden that has become higher.

An advantage and/or benefit can be that, responsive to the higher-burden notification, the primary entity may adjust its operations to meet the higher burden. For instance, the primary entity may adjust the OSP's Internal processing of producing resources for the datasets of the identified domain. The primary entity may also take other actions that allocate more fairly the burden of who these resources will be shouldered by, in the future. Accordingly, less computer resources would be needed in the future for corrections, had the higher-burden notification not been provided or heeded.

In second, related embodiments, an online service provider (OSP) monitors a running statistic of incoming datasets of an entity in relation to a higher-burden threshold of a domain identified from a plurality of domains, for notifying the entity of a rare risk of negative consequences of the running statistic reaching the higher-burden threshold within a current time period, and of an opportunity to avoid the negative consequences.

In an example embodiment, a method of the system disclosed herein may include a computer system receiving from a remote device via a communications network, a dataset having dataset parameters of a relationship instance between a primary entity and a secondary entity, at least some of the dataset parameters having respective dataset values, at least one of the dataset values characterizing an attribute of the secondary entity, at least one of the dataset values characterizing a date of the relationship instance, the date being within a current time period; identifying, by the computer system and from the characterized attribute, a domain for the dataset out of a plurality of domains; producing, by the computer system, a resource having a value of zero for the dataset responsive to an internal process for the identified domain being set up to produce a resource having a zero value; else, responsive to the internal process being set up to produce for the identified domain a resource having a variable value: accessing, by the computer system, stored digital resource rules, then selecting, by the computer system and responsive to one or more of the dataset values, a certain one of the accessed digital resource rules that is associated with the identified domain, and then producing, by the computer system applying the certain digital resource rule to at least one of the dataset values, a resource for the dataset; then causing, by the computer system, a resource notification to be transmitted about an aspect of the produced resource to one of an output device and another device; accessing, by the computer system and responsive to the internal process being set up to thus produce a resource having zero value, previously stored information about previously received datasets for the primary entity that relate to the identified domain, the previously received datasets having respective dataset values characterizing respective previous dates that are within the current time period; computing, by the computer system, from the dataset and from the previously stored information, a running statistic for the dataset and for the previously received datasets, the running statistic for the primary entity and for the current time period; determining, by the computer system, whether or not the running statistic is within a predetermined threshold of meeting or exceeding a higher-burden threshold for the identified domain; and causing, by the computer and responsive to determining that the running statistic is within the predetermined threshold, a higher-burden notification to be communicated to a computer of the primary entity, the higher-burden notification being about changing the internal process to be set up instead to thus produce a resource having a variable value.

Thus, the operation of the computer system is improved by avoiding the computer system needlessly producing resource values when the digital resource rules do not require it for a particular current time period. This is enabled by computing the running statistic for the dataset and for the previously received datasets for the current time period and determining, by the computer system, whether or not the running statistic is within a predetermined threshold of meeting or exceeding a higher-burden threshold for the identified domain. Therefore, by avoiding the computer system needlessly producing resource values when the digital resource rules do not require it for a particular current time period, the system improves the functioning of computer or other hardware, such as by reducing the processing, storage, and data transmission resources needed to perform various tasks, thereby enabling the tasks to be performed by less capable, capacious and expensive hardware devices, and be performed with less latency, preserving more of the conserved resources for use in performing other tasks or additional instances of the same task.

In another example embodiment, a method of the system disclosed herein may include receiving, by the computer system from a remote device via a communications network, a dataset having dataset parameters of a relationship instance between a primary entity and a secondary entity, at least some of the dataset parameters having respective dataset values, at least one of the dataset values characterizing an attribute of one of the primary entity and the secondary entity, at least one of the dataset values characterizing a date of the relationship instance, the date being within a current time period; identifying, by the computer system and from the characterized attribute, a domain for the dataset out of a plurality of domains; producing, by the computer system, a resource having a value of zero for the dataset responsive to an internal process for the identified domain being set up to produce a resource having a zero value; else, responsive to the internal process being set up to produce for the identified domain a resource having a variable value: accessing, by the computer system, stored digital resource rules, then selecting, by the computer system and responsive to one or more of the dataset values, a certain one of the accessed digital resource rules that is associated with the identified domain, and then producing, by the computer system applying the certain digital resource rule to at least one of the dataset values, a resource for the dataset; then causing, by the computer system, a resource notification to be transmitted about an aspect of the produced resource to one of an output device and another device; accessing, by the computer system and responsive to the internal process being set up to thus produce a resource having zero value, previously stored information about previously received datasets for the primary entity that relate to the identified domain, the previously received datasets having respective dataset values characterizing respective previous dates that are within the current time period; computing, by the computer system, from at least one of the dataset parameters and from the previously stored information, a running statistic for the dataset and for the previously received datasets, the running statistic for the primary entity and for the current time period; estimating, by the computer system and when the running statistic is less than a higher-burden threshold for the identified domain, a prospective net gain that is expected to result within the current time period due to the running statistic reaching the higher-burden threshold; determining, by the computer system, whether or not the prospective net gain is less than a retroactive burden threshold; and causing, by the computer system and responsive to determining that the prospective net gain is less than the retroactive burden threshold, a rare pause opportunity notification to be communicated to a device of the primary entity, the rare pause opportunity notification about issuing computer commands from the remote device to prevent activity that generates and sends datasets with dataset parameters that have dataset values characterizing the attribute of the certain entity and a date that is within the current time period, else not causing the rare pause opportunity notification to be thus communicated.

Thus, the operation of the device of the primary entity and the computer system is improved by causing the device to avoid needlessly generating and sending to the computer system datasets with dataset parameters for a particular current time period by determining that a prospective net gain in doing so is less than a retroactive burden. This is enabled by computing the running statistic for the dataset and for the previously received datasets for the current time period and determining, by the computer system and when the running statistic is less than a higher-burden threshold for the identified domain, a prospective net gain that is expected to result within the current time period due to the running statistic reaching the higher-burden threshold and then determining, by the computer system, whether or not the prospective net gain is less than a retroactive burden threshold. Therefore, by causing the device to avoid needlessly generating and sending to the computer system datasets with dataset parameters for a particular current time period, the system improves the functioning of computer or other hardware, such as by reducing the processing, storage, and data transmission resources needed to perform various tasks, thereby enabling the tasks to be performed by less capable, capacious and expensive hardware devices, and be performed with less latency, preserving more of the conserved resources for use in performing other tasks or additional instances of the same task.

In particular, an Online Service Provider (OSP) receives incoming datasets of a primary entity, and computes one or more running statistics of the datasets, such as their number or a sum of their base values. The OSP may further monitor the statistics in relation to a higher-burden threshold of a domain identified from plurality of domains. When the running statistic is still less than the higher-burden threshold, the OSP may further estimate a prospective net gain of continuing. In rare cases there is a risk that a prospective net gain could become negative, if the running statistic crosses the higher-burden threshold late in the current time period but before the end of it. In such cases, the OSP may send to the primary entity a rare opportunity notification about avoiding the risk, by pausing, for the remaining current time period, the activity that sends datasets for the identified domain.

An advantage and/or benefit can be that, responsive to the notification, the primary entity may opt to Issue computer commands to pause an activity that generates and sends datasets until the start of the next time period. This in turn may prevent the running statistic from reaching the higher-burden threshold within the current time period. This way, the primary entity will avoid needing to undertake the higher burden associated with the higher-burden threshold.

Accordingly, less computer resources would be needed in the future for corrections, had the rare opportunity notification not been provided or heeded.

Such notifications therefore may result in conserving resources needed to perform various tasks, thereby liberating these resources to perform other tasks.

Providing such notifications, and in conjunction with communicating such information in a timely and efficient manner over computer networks and in a way that integrates well into existing technical environments presents an additional technical problem for ERP applications.

As such, it will be appreciated that embodiments have utility, and in fact may cause results that are larger than the sum of their individual parts.

These and other features and advantages of the claimed invention will become more readily apparent in view of the embodiments described and illustrated in this specification, namely in this written specification and the associated drawings, which are not necessarily drawn to scale.

BRIEF DESCRIPTION OF THE DRAWINGS

FIG. 39 is a diagram of sample aspects for describing operational examples and use cases of the second embodiments.

FIG. 40 shows a timing diagram along with a rare scenario that may result from the embodiments of FIG. 39, where a prospective net gain is not desirable in a use case.

FIG. 41 is a sample view of a User Interface (UI) in a use case of an embodiment, with a rare pause opportunity notification as to how the prospective net gain of FIG. 39 may be avoided.

DETAILED DESCRIPTION

As has been mentioned, the present description is about computer systems, methods, and processors for providing software services. First and second embodiments are presented, which share a common background.

First Embodiments

In first embodiments, an Online Service Provider (OSP) monitors a running statistic of incoming datasets of an entity, and notifies the entity if the running statistic reaches, within a current time period, a higher-burden threshold of domain identified from a plurality of domains. Examples are now described in more detail.

Figure 1:
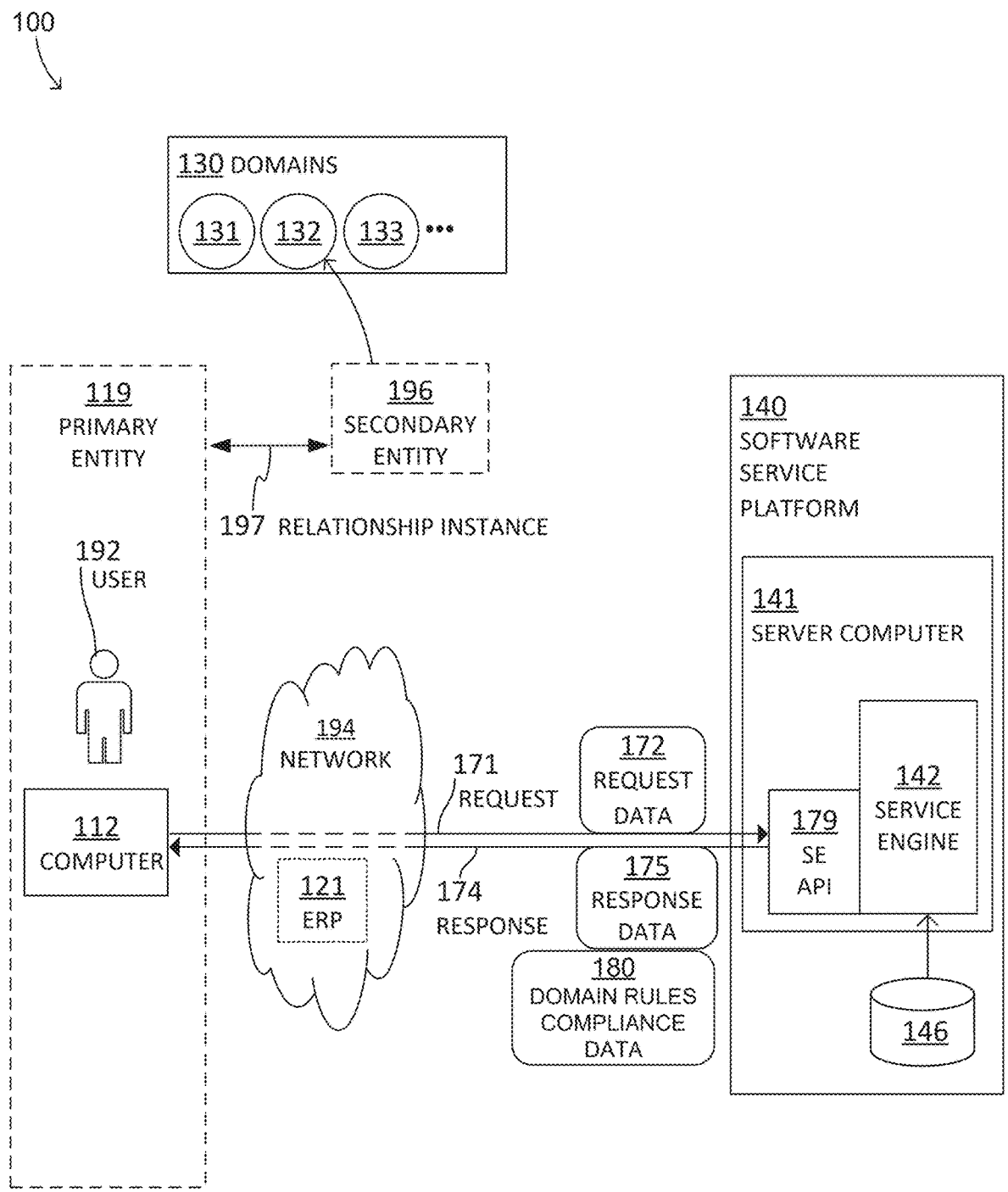
FIG. 1 is a block diagram showing sample aspects of embodiments of the present disclosure, which are improvements in automated computerized systems.

FIG. 1 is a block diagram showing an example configuration of a system 100 working with a new service engine 142 that generates domain rules compliance data 180, according to various embodiments of the present disclosure.

FIG. 1 is a block diagram showing an example configuration of a system 100 working with a new service engine 142 that generates domain rules compliance data 180, according to various embodiments of the present disclosure.

A sample primary entity 119 includes a computer 112, and a user 192 who may use computer 112. Both could be located within a physical site of the primary entity 119, but that is not necessary. A sample secondary entity 196 is also shown, which has at least one attribute, which is not shown separately in FIG. 1.

In this example, a plurality 130 of domains includes domains 131, 132, 133, . . . . Of those, the domain 132 may be identifiable from the attribute of the secondary entity 196. The plurality 130 of domains may have rules, for instance rules about resources being produced, rules about when these resources need to be produced or be excused from being produced, such as rules involving thresholds, and so on. The primary entity 119 and/or the secondary entity 196 may need to be compliant with rules of one of more of the plurality 130 of domains.

The secondary entity 196 may have a sample relationship instance 197 with the primary entity 119. The relationship instance 197 can be associated with a date in which it occurred. More details about the computer 112 are provided with reference to FIG. 25.

In this example, a network 194 is a communications network. Network 194 can be any type of network, such as a local area network (LAN), a metropolitan area network (MAN), a wide area network (WAN), or the internet. In some embodiments, network 194 is considered to be the cloud. An Enterprise Resource Planning (ERP) system 121 may also be within network 194, if it is the cloud, or accessible by computer 112 via network 194.

In this example, a software service platform 140 is implemented by a server computer 141 and a database 146 storing data. Software service platform 140 can be implemented in the cloud, on the premises of a provider, in a combination of the two, and so on. Of course, additional server computers may be used for a single service, for example in a peer-to-peer configuration, with the operations of the service distributed among them. The server computers can be located at a single geographic location or be distributed across multiple locations. Similarly, additional databases may be used for the service, and so on.

Server computer 141 is configured, by software, to implement a service engine 142. Service engine 142 is configured, in embodiments, to perform a predefined service. The service can be a computation, a search, a verification, a registration, a notification, generation of specialized information and so on. According to various embodiments of the present disclosure, the service may be determining or generating information about potential lack of domain rules compliance of primary entity 119 in various domains based on domain rules involving thresholds and/or transmitting a notification about the generation of the information, such as a higher-burden notification. In some embodiments, the transmission of such a notification may alert the primary entity 119 of the potential lack of domain rules compliance. The domain rules compliance data 180 may be or include such information about potential lack of domain rules compliance.

In the context of FIG. 1, user 192 desires the service. User 192 uses computer 112 to access network 194 and, from network 194, to access software service platform 140. It will be appreciated that, in some contexts, service engine 142 performs cloud computing and is provided as software as a service (SaaS). Moreover, computer 112 can be viewed as a client computer from the perspective of software service platform 140.

The service of service engine 142 can be performed responsive to service engine 142 being properly invoked. While being performed, the service may use data from database 146.

Server computer 141 further hosts a service engine (SE) Application Programming Interface (API) 179. In some embodiments, SE API 179 is configured to invoke service engine 142 to perform its service, when properly requested. In various embodiments, service engine 142 may perform its service without invocation by SE API 179. For example, service engine 142 may also or instead automatically invoke itself to perform the applicable service periodically and/or in response to one or more various conditions being satisfied, including, but not limited to, one or more of: a detected change or update to stored digital rules about thresholds in a certain domain; a detected change or update to data that may cause a threshold associated with a certain domain to be reached or exceeded, such as data of the primary entity 119; that one or more thresholds are being met or being exceeded, for instance within a predetermined threshold for being so met or exceeded; and conditions indicated by stored preferences of primary entity 119.

SE API 179 is configured to receive a request 171, which is shown as an arrow. Request 171 may be transmitted via network 194. Request 171 may have been ultimately caused to be generated by computer 112, for example as operated by user 192. In some embodiments, request 171 is transmitted via network 194 directly to SE API 179. In other embodiments, computer 112 causes ERP system 121 to transmit request 171. In yet other embodiments, ERP system 121 originates request 171 on behalf of primary entity 119.

Request 171 may also include associated request data 172. When SE API 179 receives request 171 with its request data 172, it invokes service engine 142. When thus invoked, service engine 142 may perform its service using request data 172. In response, SE API 179 can be configured to transmit a response 174, also shown as an arrow. Response 174 may include response data 175 that arises out of the service, such as a computed result, a confirmation, and so on. Response 174 can be transmitted back to the sender of request 171, or as otherwise directed. In some embodiments, the request 171 may be automatically generated and transmitted, such as by the ERP system 121 and/or computer 112 in response to one or more various conditions being satisfied, including, but not limited to, one or more of: a detected change or update to stored digital rules about thresholds in a certain domain; a detected change or update to data that may cause a threshold associated with a certain domain to be reached or exceeded, such as data of the primary entity 119; that one or more thresholds are being met or being exceeded, for instance within a predetermined threshold for being so met or exceeded; and conditions indicated by stored preferences of primary entity 119.

In response to such a request being automatically generated, or in response to the service engine 142 invoking itself, the service engine 142 may generate and/or transmit domain rules compliance data 180, either together with the response data 175 or separately. For example, domain rules compliance data 180 may be or include information about potential lack of domain rules compliance of primary entity 119 in various domains based on digital rules about thresholds in a certain domain; and/or a notification about the generation of the information. In an example embodiment, the domain rules compliance data 180 may be or include an alert or other notification that alerts the primary entity 119 entity of the potential lack of domain rules compliance. In some embodiments, the domain rules compliance data 180 may be used to update information regarding the potential lack of domain rules compliance for a certain domain within an account associated with the primary entity 119. The account associated with the primary entity 119 may be accessible by the primary entity 119 via a client computing device, for example, the computer 112, wherein the updated information regarding the potential lack of domain rules compliance is for display on a user interface associated with the account. Such a user interface may, in various embodiments, be a user interface of the server computer 141, computer 112, and/or a computer in ERP system 121, and so on. Furthermore, the account associated with the primary entity 119 may be managed, stored and/or accessible by the server computer 141, computer 112, and/or a computer in ERP system 121, and so on.

Computer program code for carrying out operations for aspects of the present disclosure may be written in any combination of one or more programming languages, including an object-oriented programming language such as Java, Smalltalk or the like, and/or conventional procedural programming languages, such as the "C" programming language or similar programming languages such as C++, C sharp, etc. Portions of the program code may be executed on server computer 141, computer 112, a computer in ERP system 121, and so on.

Additional details about the components of FIG. 1, which may be known to some, are provided later in this description, for not interrupting the flow of this description at this stage.

Figure 2:
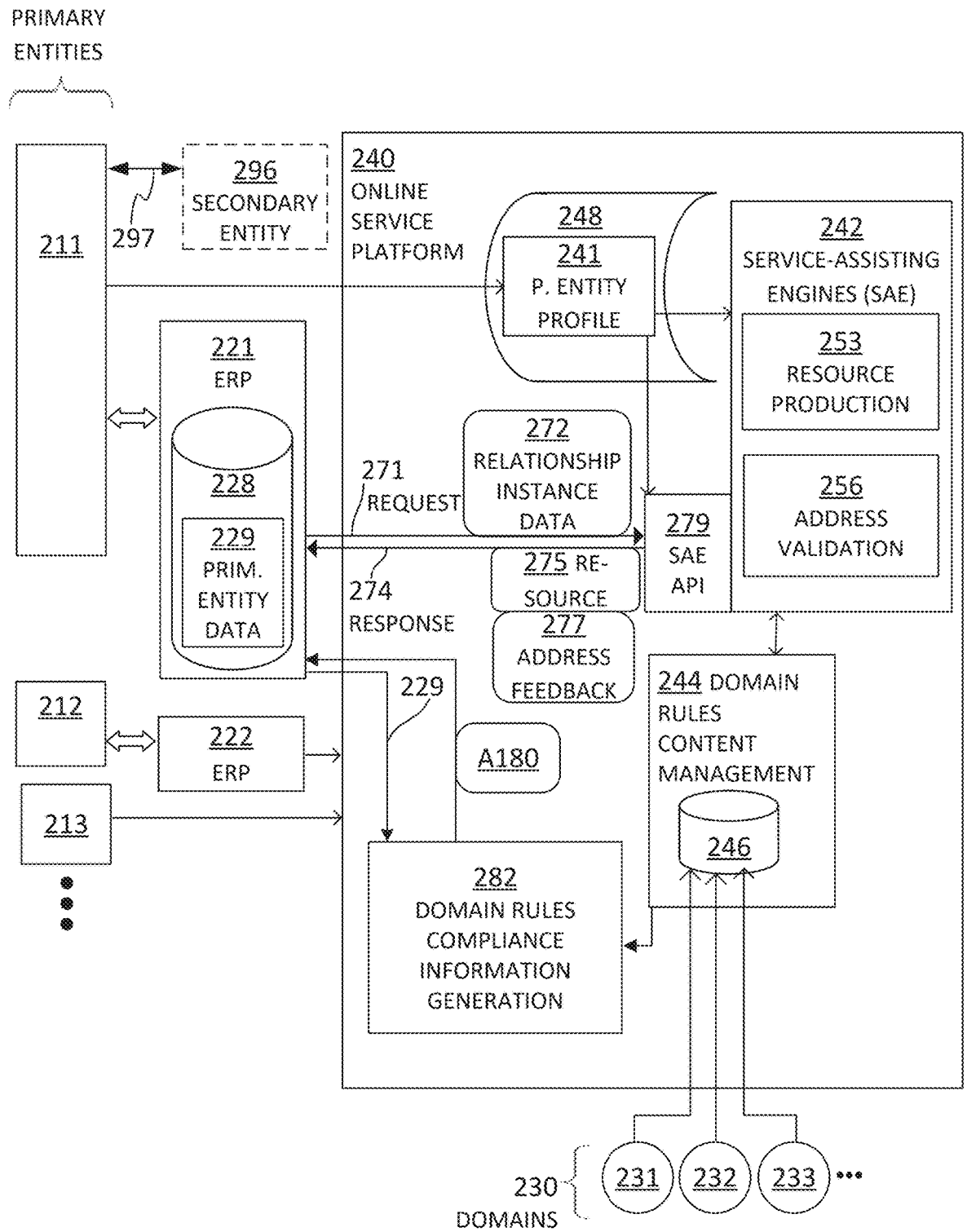
FIG. 2 is a block diagram showing a sample software architecture according to various embodiments of the present disclosure, which are improvements in automated computerized systems.

FIG. 2 is a block diagram showing an example software architecture working with a domain rules compliance information generation engine 282, according to various embodiments of the present disclosure. At the bottom right, a plurality of domains 230 includes sample domains 231, 232, 233, . . . .

In this example, a software-implemented online service platform 240 is configured to provide the desired services. These services may include determining potential lack of domain rules compliance in various different domains for the primary entities 210, generating information regarding potential lack of domain rules compliance of the entity for the various domains, and/or transmitting one or more notifications about the generation of the information. For example, such a notification may be a notification to a particular primary entity 211 that there is a potential lack of domain rules compliance of that primary entity 211 in a certain domain. In some embodiments, these services may also include producing resources and performing address validation for primary entities 210. Any one of sample primary entities 211, 212, 213, . . . may be as described for primary entity 119. A sample secondary entity 296 is also shown, which has at least one attribute. Similarly with FIG. 1, a domain 232 may be identifiable from the attribute, from among the domains 230, even though this identification is not reflected by an arrow in FIG. 2, as it was in FIG. 1. In addition, the primary entity 211 may have its own attribute, from which the different domain 231 can be similarly identifiable.

The sample secondary entity 296 may have a sample relationship instance 297 with the sample primary entity 211. The relationship instance 297 can be associated with a date in which it occurred. These primary entities 210 may access the software-implemented online service platform 240, for receiving its services.

Figure 25:
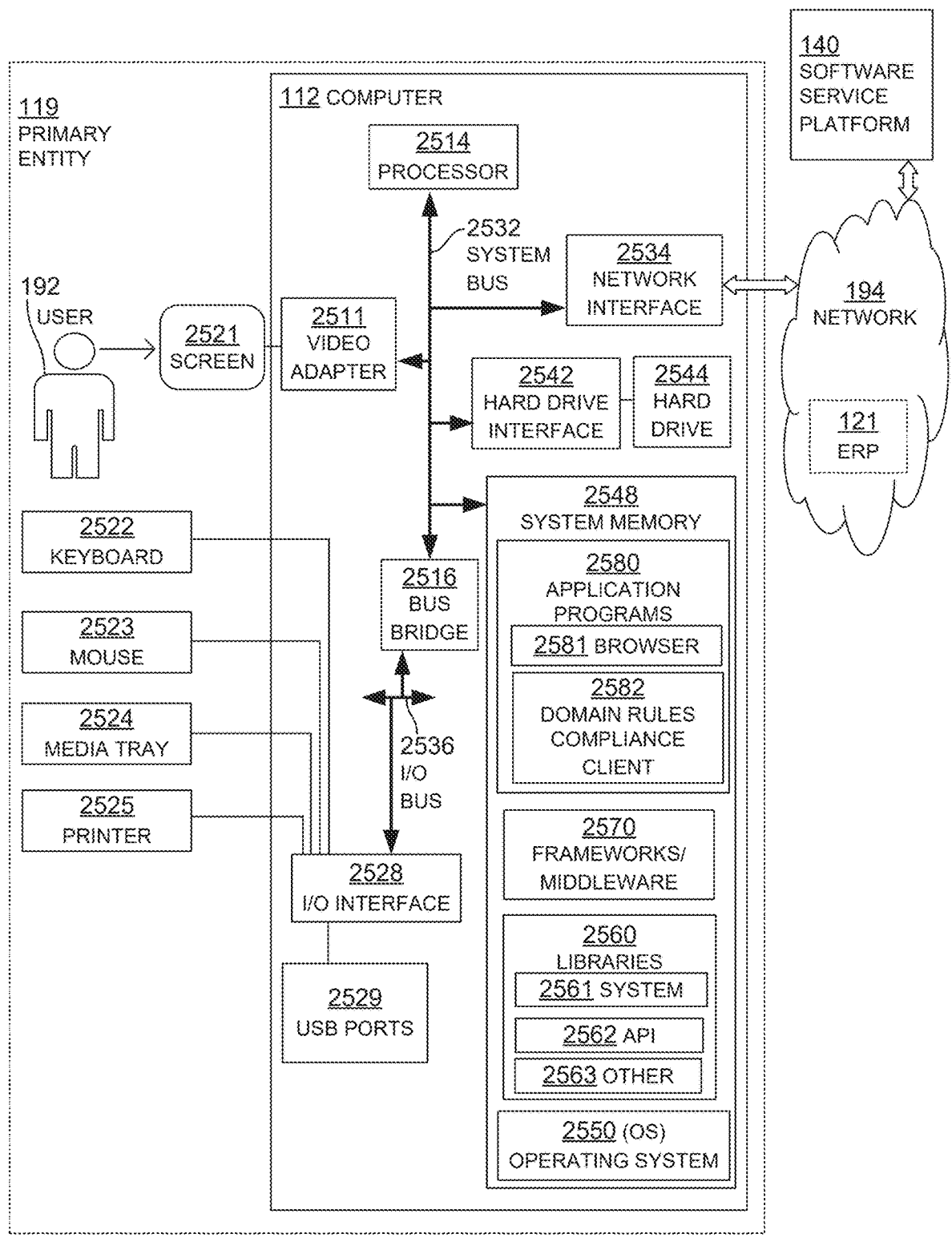
FIG. 25 is a block diagram showing more details of a computer of an example primary entity of FIG. 1, with reference to the communication network and the software service platform, according to various embodiments of the present disclosure.

Aspects of FIG. 2 may be implemented by components described and shown elsewhere in this document, for example with reference to FIG. 1 and FIG. 25. For instance, in some embodiments, primary entities 210 access online service platform 240 fully directly, for example as is shown for primary entity 213. In other embodiments, this accessing is performed at least in part indirectly, for example by using Enterprise Resource Planning (ERP) systems 221, 222. In this example, ERP system 221 has a database 228 that stores primary entity data 229 of primary entity 211, such as relationship instance data that have been previously accumulated. For example, such data may be used by the domain rules compliance information generation engine 282 data to determine potential lack of domain rules compliance in the various domains for the primary entities 210. In this example, online service platform 240 includes a database 248, and primary entity 211 has stored their own primary entity profile 241 in database 248.

Online service platform 240 includes a domain rules management component 244 for use by SAE 242 and the domain rules compliance information generation engine 282. Domain rules management component 244 may store digital rules that reflect rules of one or more of the domains 230. Domain rules management component 244 includes a database 246 for storing the digital rules, which may reflect rules for producing resources, thresholds below which resources need not be produced if not met over a time period, etc.

Online service platform 240 includes service-assisting engines (SAE) 242. In some embodiments, SAE 242 includes a resource production engine 253, and even an address validation engine 256.

In this example, service-assisting engines 242 may be invoked via a SAE Application Programming Interface (API) 279. Only one SAE API 279 is shown implemented here, while multiple ones may be implemented instead, for example one for invoking each of resource production engine 253 and address validation engine 256. In this example, SAE API 279 is configured to receive a request 271 or other information from ERP 221. Request 271 has data 272 of primary entity 211. Data 272 may be looked up from primary entity data 229 in database 228. In various embodiments, data 272 may also or instead be transmitted to one or more of the service-assisting engines 242 in response to a request from the respective service-assisting engine. In some embodiments, data 272 may also or instead be pushed to one or more of the service-assisting engines 242 from one or more of the primary entities 210 and/or ERP system 221, such as in response to the primary entity data 229 being updated or changed, or on a periodic basis. In response to receiving request 271 with its data 272, SAE API 279 invokes one of service-assisting engines 242 to perform its service. Then, SAE API 279 is configured to transmit a response 274. Response 274 can be transmitted back to the sender of request 271, or otherwise.

In some embodiments, primary entity data 229 may be received by the domain rules compliance information generation engine 282 from one or more of the primary entities 210 and/or ERP system 221. The primary entity data 229 may be so received by being accessed, for example on a periodic basis or in response to the content of database 246 becoming updated, as described later in this document. Or, the primary entity data 229 may be so received by being pushed, such as in response to the primary entity data 229 being updated or changed, or on a periodic basis. Or, this process may start, for example periodically, from the domain rules compliance client 2582 if provided. In response to receiving the primary entity data 229, the domain rules compliance information generation engine 282 may perform its service and send the domain rules compliance data 180. The domain rules compliance data 180 may be transmitted back to the sender of the primary entity data 229, to a corresponding primary entity 210, or otherwise. In various embodiments, the domain rules compliance information generation engine 282 may also or instead automatically invoke itself to perform the applicable service in response to one or more various conditions being satisfied, including, but not limited to, one or more of: a detected change or update to stored digital rules about thresholds in a certain domain; a detected change or update to data that may cause a threshold associated with a certain domain to be reached or exceeded, such as data of the primary entity 119; that one or more thresholds are being met or being exceeded, for instance within a predetermined threshold for being so met or exceeded; and conditions indicated by stored preferences of primary entity 119. For example, such stored digital rules, including the thresholds, may be stored in the database 246 of the domain rules management component 244 and be accessible by the domain rules compliance information generation engine 282. Also, records of the relationship instances for the primary entities 210 may comprise and/or be part of the primary entity data 229 and transmitted to the domain rules compliance information generation engine 282. The stored preferences of one or more of the primary entities 210 may also comprise and/or be part of the primary entity data 229 and transmitted to the domain rules compliance information generation engine 282.

In some embodiments, the primary entity data 229 may be automatically transmitted to the domain rules compliance information generation engine 282, such as by the ERP system 221 and/or one or more of the primary entities 210 in response to one or more various conditions being satisfied, including, but not limited to, one or more of: a detected change or update to stored digital rules about thresholds in a certain domain; a detected change or update to data that may cause a threshold associated with a certain domain to be reached or exceeded, such as data of the primary entity 119; that one or more thresholds are being met or being exceeded, for instance within a predetermined threshold for being so met or exceeded; and conditions indicated by stored preferences of primary entity 119.

In response to the primary entity data 229 being automatically transmitted to the domain rules compliance information generation engine 282, or in response to the domain rules compliance information generation engine 282 invoking itself when certain conditions are satisfied, the domain rules compliance information generation engine 282 may generate and/or transmit domain rules compliance data 180 based on received primary entity data 229. For example, domain rules compliance data 180 may be or include information about potential lack of domain rules compliance of one or more primary entities 210 in various domains 230 based on domain rules about thresholds. Also, domain rules compliance data 180 may be or include a notification about the generation of the information. In an example embodiment, the domain rules compliance data 180 may be or include an alert or other notification that alerts one or more of the primary entities 210 of the potential lack of domain rules compliance in one or more of the domains 230. For example, the domain rules compliance information generation engine 282 may periodically, or upon the primary entity data 229 being updated, receive data that is implicated by the domain rules. The domain rules compliance information generation engine 282 may then compare the received data of the primary entity data 229 against the digital rules stored in database 246, which are about the aforementioned thresholds. If, for example, based on the received data included in the primary entity data 229, the domain rules compliance information generation engine 282 determines that the data of accumulated relationship instances of primary entity 211 meet, are within a predetermined threshold of meeting, or exceed a threshold indicated by the rules of the domain 231, then the domain rules compliance information generation engine 282 may transmit a notification to primary entity 211 that there is a potential lack of domain rules compliance for primary entity 211 in domain 231. This notification may be, or be part of the domain rules compliance data 180. In various embodiments, the domain rules compliance information generation engine 282 may perform such a service based on monitoring updates to the digital rules stored in database 246 and monitoring the relationship instance data of the primary entity data 229 for each of the primary entities 210 for each of the domains 230 without needing to receive a specific request for such a service.

In some embodiments, the domain rules compliance data 180 may be used to update information regarding the potential lack of domain rules compliance for one or more of the domains 230 within an account associated with the one or more primary entities 210. For example, an account associated with the primary entity 211 may be associated with or include primary entity profile 241 and accessible by the primary entity 211 via the online service platform 240, wherein the updated information regarding the potential lack of domain rules compliance is for display on a user interface associated with the account. Furthermore, the account associated with the primary entity 211 may be managed, stored and/or accessible by the primary entity 211, the online service platform 240, and/or the ERP system 221.

If resource production engine 253 is invoked by request 271, it may produce a resource, based on data 272. In that case, response 274 includes a component of the resource 275, for instance indicating a calculated amount.

If address validation engine 256 is thus invoked by request 271, it may perform an address-validation process, based on data 272. In that case, response 274 includes a component of an address feedback 277. The latter can be a message that an address is valid, or not, or propose a different address.

In some embodiments, online service platform 240 may perform a variety of services in addition to what is described above. For one example, online service platform 240 may accumulate and store relationship instance data 272.

Figure 3:
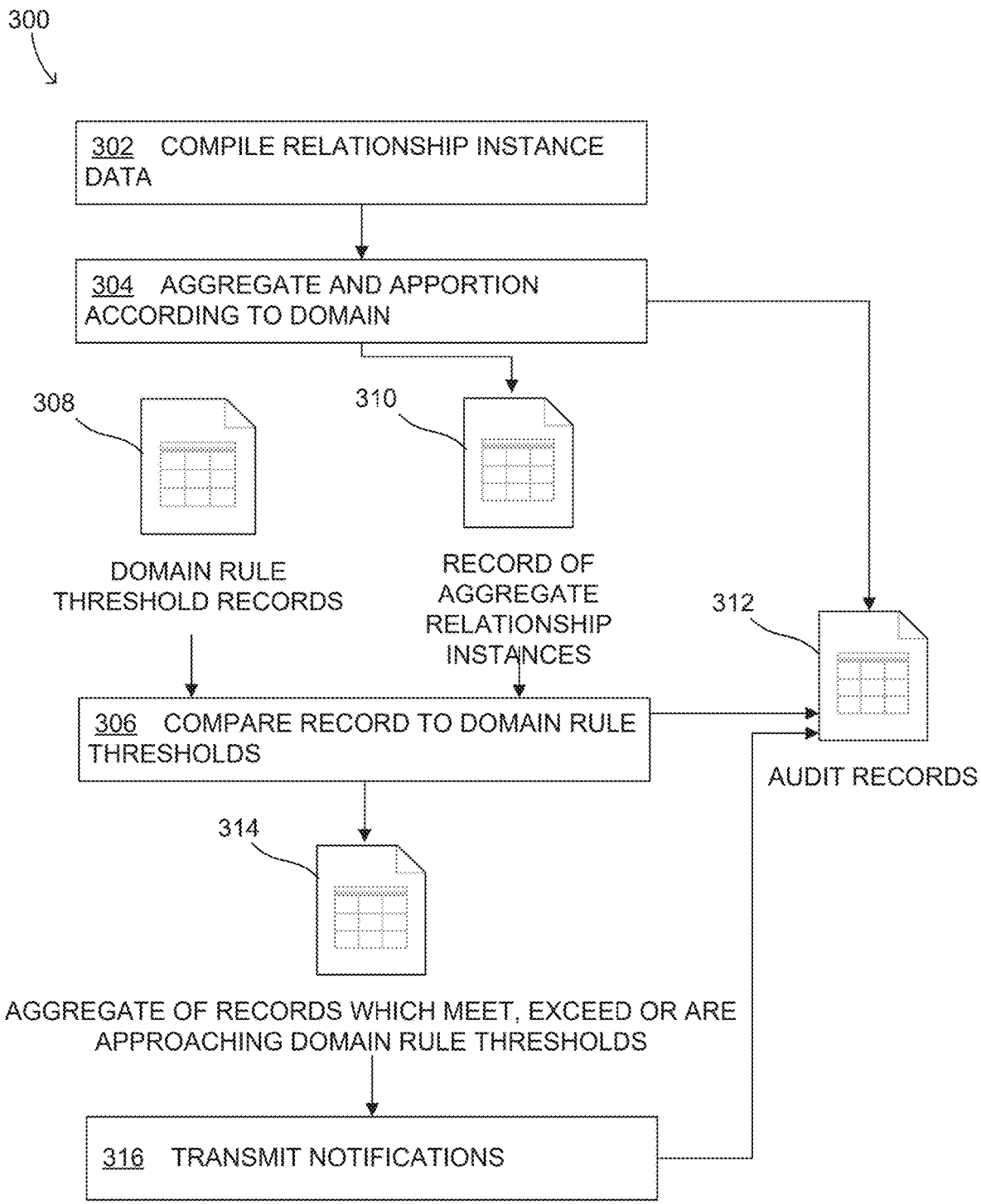
FIG. 3 is a flow diagram of an example process and corresponding data flow for transmitting notifications about information regarding potential lack of domain rules compliance, according to various embodiments of the present disclosure.

FIG. 3 is a flow diagram of an example process 300 and corresponding data flow for transmitting notifications about information regarding potential lack of domain rules compliance, according to various embodiments of the present disclosure.

At 302, the domain rules compliance information generation engine 282 of FIG. 2 may compile relationship instance data of primary entities, such as primary entities 210 of FIG. 2. For example, such relationship instance data may include data representing, for each of the primary entities 210, a base amount associated with one or more of the domains 230 and/or a number of relationship instances associated with one or more of the domains 230. The domain rules compliance information generation engine 282 may compile such data from one or more sources, including, but not limited to, primary entity data 229 from database 228 and/or ERP system 222 of FIG. 2.

At 304, the domain rules compliance information generation engine 282 may aggregate and apportion the compiled relationship instance data according to their domain, to produce a record of aggregate relationship instances 310. Such data may be organized by total base amounts and/or total number of relationship instances per domain and per primary entity. Such data may also be organized according to dates of the relationship instances. The domain rules compliance information generation engine 282 may change the compiling, including organization, of such data based on corresponding changing rules, about thresholds in the domains 230. Such rules may be about burdens, when these burdens may be ignored or excused, for each domain. The domain rules compliance information generation engine 282 may monitor such changes in the rules for each domain and update the rules accordingly. For example, the domain rules compliance information generation engine 282 may access the rules from one or more sources, including, but not limited to, domains 230 of FIG. 2. Such rules and corresponding updates may be stored in database 246.

At 306 the domain rules compliance information generation engine 282 may compare the record of aggregate relationship instances 310 for one or more primary entities 210 to updated rules about thresholds in the plurality of domains, which may include domain rule threshold records 308 that include rules regarding a base amount of relationship instance data that are associated with each of various domains and/or a number of the relationship instances that are associated with each of various domains within a predetermined time period.

The comparison may include comparison of data representing various different other or additional criteria, which may, in some embodiments, be indicated by or otherwise based on the particular rules for specific domains including, but not limited to the dates of the relationship instances.

Based on such comparison, the domain rules compliance information generation engine 282 may determine which records of the record of aggregate relationship instances, which are apportioned according to their domain, include relationship instances that meet, are within a predetermined threshold of meeting, and/or exceed one or more thresholds regarding base amount for one or more of the corresponding individual domain that is identified for the entity. For example, the domain rules compliance information generation engine 282 may generate an aggregate of records which meet, exceed or are approaching domain rule thresholds 314 for each domain for each primary entity. Also, in some embodiments, the domain rules compliance information generation engine 282 may first check the domain rule threshold records 308 and then compare against the record of aggregate relationship instances 310 to determine whether there are any records which meet, are within a predetermined threshold of meeting, and/or exceed one or more thresholds.

At 316, the domain rules compliance information generation engine 282 may then transmit corresponding notifications to each of the primary entities which, according to the aggregate of records, have relationship instances that meet, exceed or are approaching domain rule thresholds for one or more of the corresponding individual domain. For example, the notification may indicate to the primary entity that there is a potential lack of domain rules compliance of the entity for the specific corresponding domains.

Whether, when and how to receive notifications and which thresholds to use may be selectable by the individual primary entity and/or domain rules compliance information generation engine 282. In various embodiments, such selectable features may include selectable items for amounts for base amount, number of relationship instances, number of domains, specific domains, types of relationship instances, periods of time, time of year, time of month, "notice and report" thresholds, etc. For example, particular primary entity 211 may select to receive notifications when primary entity 211 is within a selectable $20,000 threshold of meeting any domain rule threshold for any domain. Other primary entities may select to receive notifications only when the threshold for a particular domain is met or exceeded.

Notifications may be transmitted or initiated by various electronic techniques, including, but not limited to: email, updates to user accounts, text messages, automated phone calls, chat messages, web-based messages, desktop computer alerts, pop-up messages or alerts, mobile device messages, mobile device applications, etc. In some embodiments, a message may be electronically initiated by the domain rules compliance information generation engine 282 to be sent by mail or courier to an address selected by the primary entity. In some embodiments, the notifications do not indicate there is a potential lack of domain rules compliance, but just that there is a notification available for the primary entity and may include instructions or a link for receiving or otherwise accessing further information, including information regarding potential lack of domain rules compliance. In some embodiments, the notification regarding potential lack of domain rules compliance may include or provide access to a notification regarding a potential lack of domain rules compliance regarding producing and reporting resources for individual domains.

Such notifications may also include some or all of the results and underlying data involved in the comparison of the record of aggregate relationship instances 310 to updated rules, and which relationship instances of the primary entity caused the determination of potential lack of domain rules compliance. Additionally, audit records 312 of the aggregation and apportionment of relationship instance data 272, the comparison 306 to domain rule threshold records 308 and the transmission of notifications 316 may be generated and stored by the domain rules compliance information generation engine 282, and may also be accessible by the corresponding primary entities 210 and/or the ERP system 222.

Figure 4:
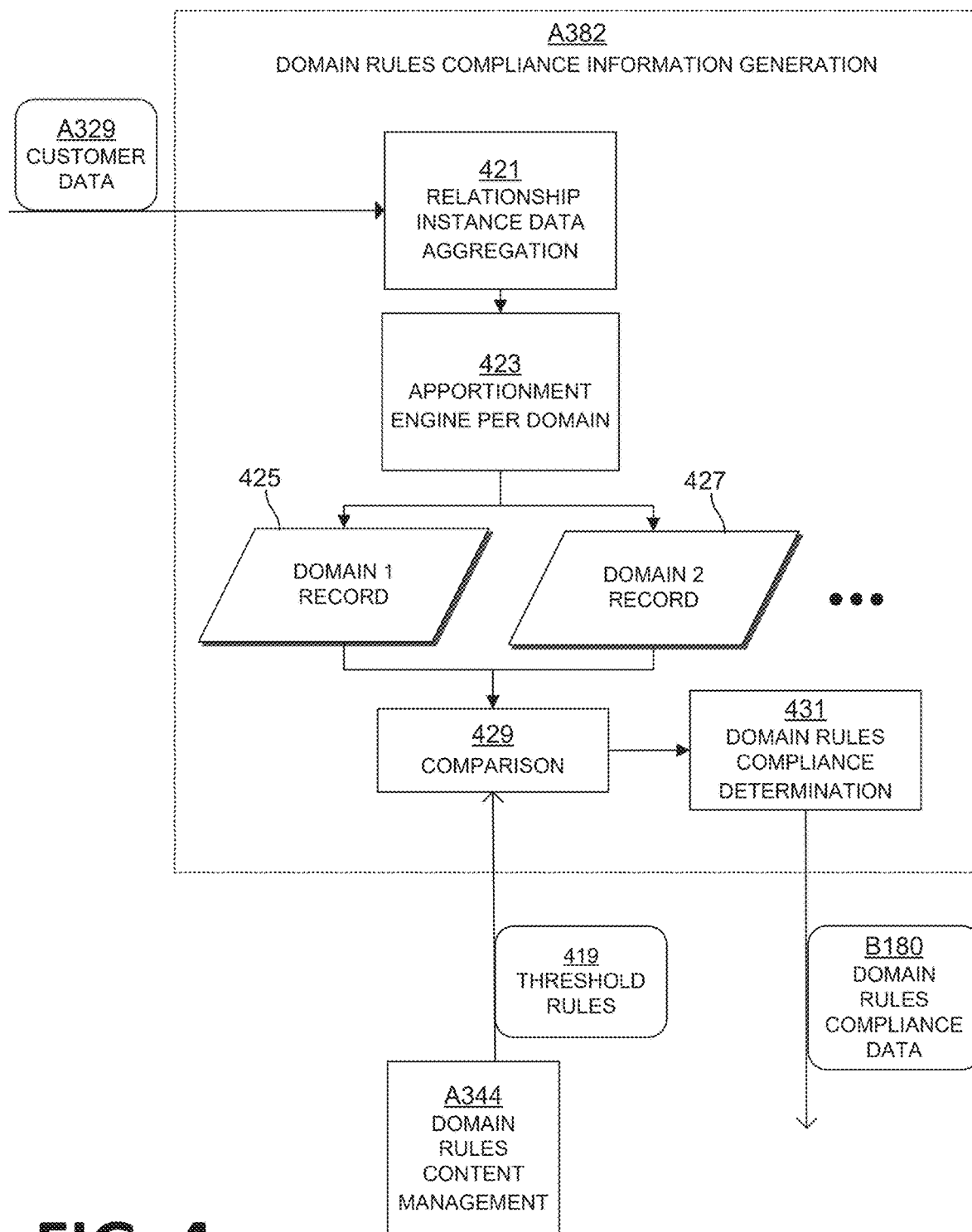
FIG. 4 is a block diagram showing more details of a domain rules compliance information generation engine of FIG. 2, according to various embodiments of the present disclosure.

FIG. 4 is a block diagram showing more details of a domain rules compliance information generation engine 282 of FIG. 2, according to various embodiments of the present disclosure.

Shown is a relationship instance data aggregation engine 421 that may receive the primary entity's relationship instance data 272. For example, the relationship instance data aggregation engine 421 may compile relationship instance data of primary entities from relationship instance data 272, such as primary entities 210 of FIG. 2. For example, such relationship instance data may include data representing, for each of the primary entities 210, a base amount of relationship instance data associated with one or more of the domains 230 and/or a number of relationship instances associated with one or more of the domains 230. Relationship instance data aggregation engine 421 may receive the relationship instance data 272 and compile such data from one or more sources, including, but not limited to, primary entity data 229 from database 228 and/or ERP system 222 of FIG. 2.

Shown coupled to the relationship instance data aggregation engine 421 is apportionment engine 423 that may aggregate and apportion according to their domain the compiled relationship instance data from the relationship instance data aggregation engine 421, to produce a record of relationship instances apportioned to each domain. For example, relationship instance data of a particular primary entity for which a first Domain 1 is identified may be assigned, grouped or otherwise apportioned to Domain 1 record 425. Similarly, relationship instance data of a particular primary entity for which a second Domain 2 is identified, may be assigned, grouped or otherwise apportioned to Domain 2 record 427, and so on. The Domain 1 record 425 and the Domain 2 record 427 can also be called apportionment records.

Shown as receiving the apportionment records from the apportionment engine 423 is the comparison engine 429. The comparison engine 429 may compare the apportionment records for one or more primary entities 210 to updated threshold rules 419 in the plurality of domains, which may include domain rule threshold records from domain rules management component 244. For example, the domain rule threshold records from domain rules management component 244 may include threshold rules 419 regarding a base amount of relationship instance data that are associated with each of various domains and/or a number of the relationship instances that are associated with each of various domains.

Shown coupled to the comparison engine 429 is the domain rules compliance determination engine 431. Based on such comparison made by the comparison engine 429, the domain rules compliance determination engine 431 may determine which records of the apportionment records include relationship instances that meet, are within a predetermined threshold of meeting, and/or exceed one or more thresholds regarding relationship instance data for the corresponding domain. For example, based on such comparison made by the comparison engine 429, the domain rules compliance determination engine 431 may find that the records of the Domain 1 record 425 for a particular primary entity exceed the threshold number of relationship instances in the applicable time period for the first domain 1. The domain rules compliance determination engine 431 may then determine there is a potential lack of domain rules compliance of the particular primary entity in the first domain 1 based on this finding. The domain rules compliance determination engine 431 may then generate domain rules compliance data 180, which, for example, may be, include, or reference notifications to individual primary entities indicating potential lack of domain rules compliance for various domains.

Figure 5:
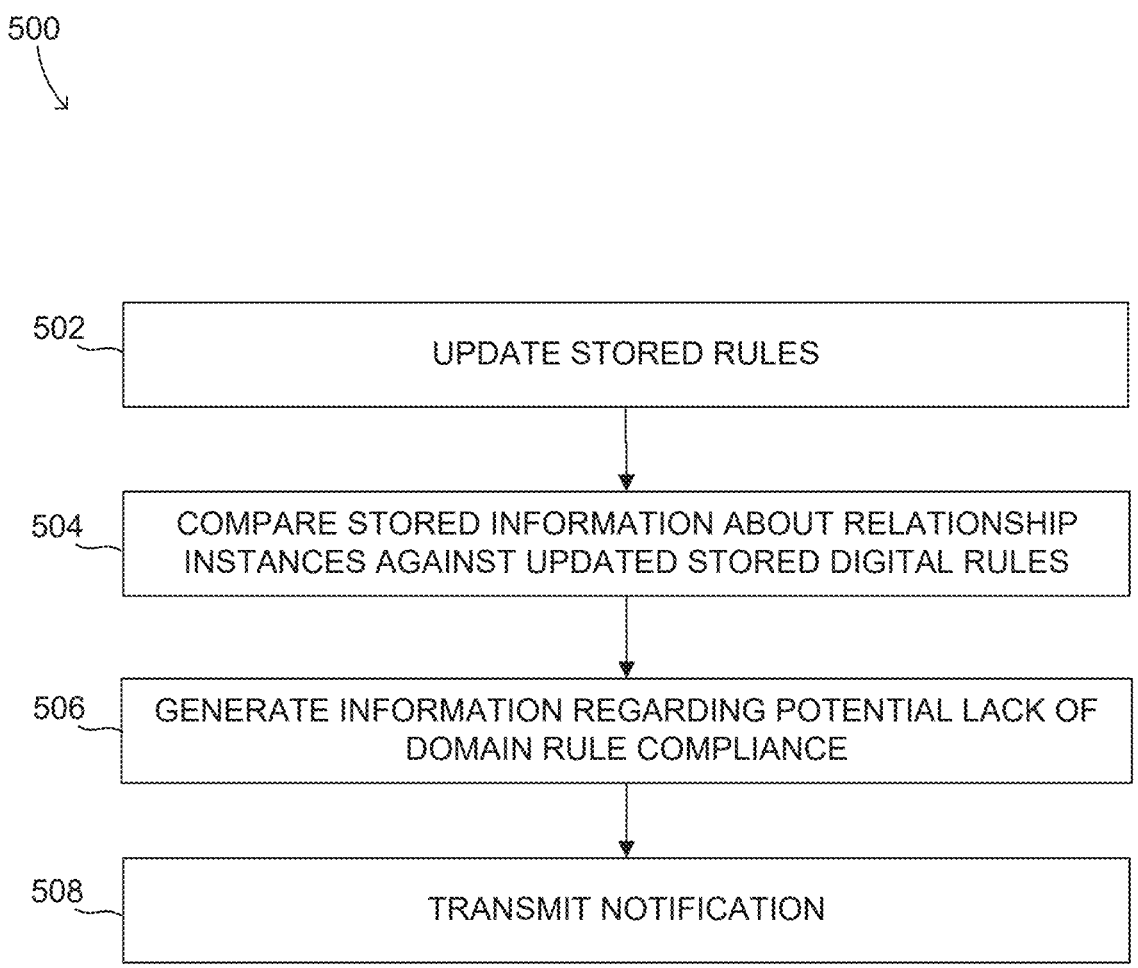
FIG. 5 is a flow diagram of an example process for generating information regarding potential lack of domain rules compliance of an entity and transmitting a corresponding notification, according to various embodiments of the present disclosure.

FIG. 5 is a flow diagram of an example process 500 for generating information regarding potential lack of domain rules compliance of an entity and transmitting a corresponding notification, according to various embodiments of the present disclosure.

At 502, the system 100 updates stored rules for a certain one of a plurality of domains. The stored rules may be about thresholds. The system 100 may also monitor changes in rules for the plurality of domains and the updating the stored rules may be performed in response to the monitoring.

At 504, the system 100 compares stored information about relationship instances of an entity in the certain domain against the updated stored digital rules for the certain domain. The comparing may include determining whether one or more thresholds regarding the relationship instances are met, are within a predetermined threshold of being met, or are exceeded.

In some embodiments, the comparing may be in response to the updating of the stored rules. The system 100 may detect a change in the stored information of the relationship instances, for instance in their number or the sum of their base amounts for a certain domain.

At 506, the system 100 generates information regarding potential lack of domain rules compliance of the entity for the certain domain based on the comparison. The system 100 may determine there is a potential lack of domain rules compliance of the entity in the certain domain if the one or more of the aforementioned thresholds for a domain are met, are within a predetermined threshold of being met, or are exceeded.

At 508, the system transmits over a network, to a client computing device associated with the entity, a notification about the generation of the information. In some embodiments, the information is presented graphically and/or includes a map of the certain domain. The transmitting the notification about the generation of the information may include alerting the entity of potential lack of domain rules compliance by at least causing an indication of each of the plurality of domains for which there exists a potential lack of domain rules compliance of the entity to be presented on a map. The transmitting of the notification may, in some embodiments, include aggregating the determined records of the one or more records of aggregate relationship instances. For each determined record of the aggregated determined records, the system 100 may notify an entity associated with the determined record that there is a potential lack of domain rules compliance of the entity for one or more of the corresponding individual domains.

Figure 6:
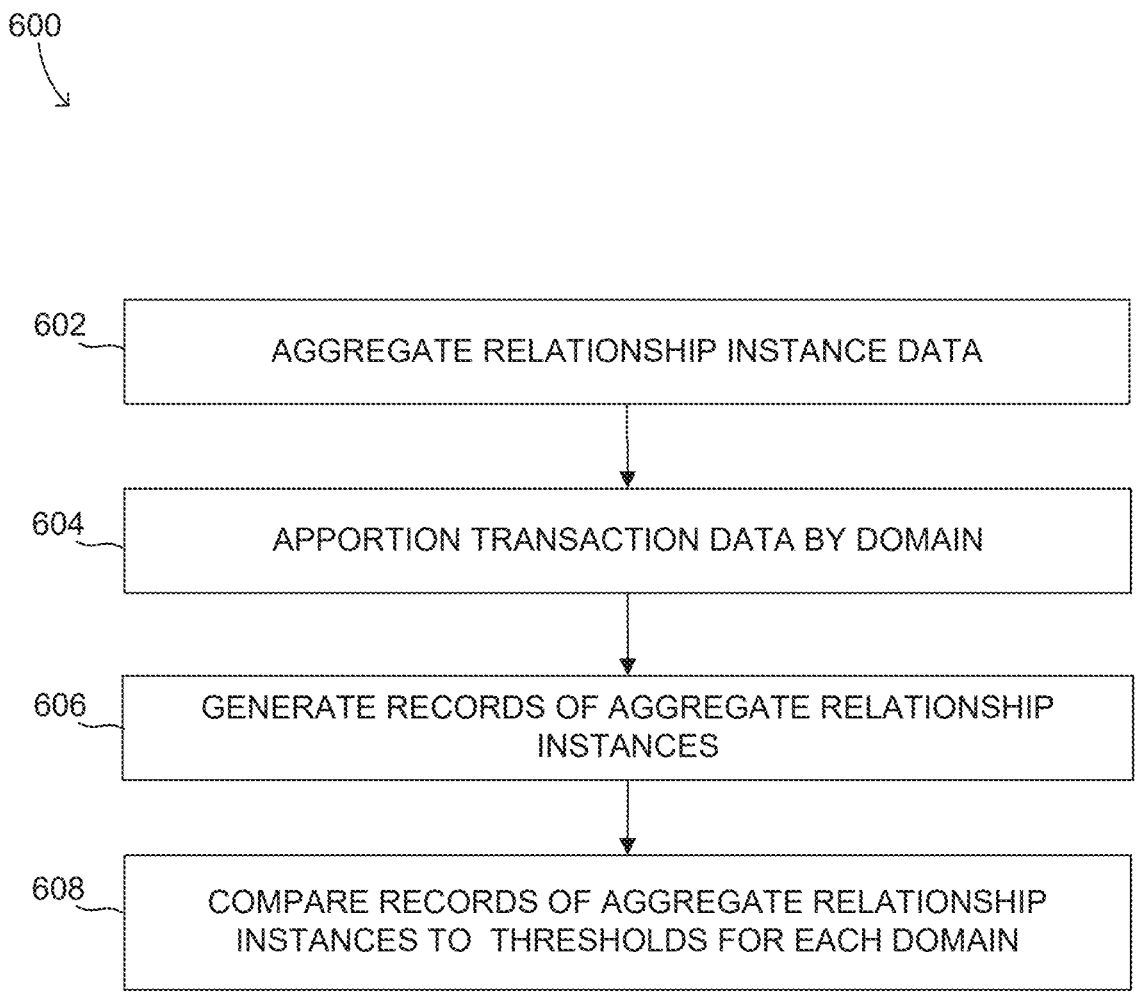
FIG. 6 is a flow diagram of an example process useful in generating information regarding potential lack of domain rules compliance, according to various embodiments of the present disclosure.

FIG. 6 is a flow diagram of an example process 600 useful in generating information regarding potential lack of domain rules compliance, according to various embodiments of the present disclosure. For example, comparing of stored information about relationship instances of a plurality of entities against the stored rules about thresholds in the plurality of domains may include the process 600.

At 602, the system 100 aggregates relationship instance data from the stored information about the relationship instances.

At 604, the system apportions the relationship instance data according to their domain to corresponding individual domains of the plurality of domains.

At 606, the system 100 generates one or more records of aggregate relationship instances based on the apportioning. The generating one or more records of aggregate relationship instances may include determining, based on the comparing, which records of the one or more records of aggregate relationship instances meet, are within a predetermined threshold of meeting, or exceed one or more thresholds regarding relationship instance data for one or more of the corresponding individual domains.

At 608, the system 100 compares the one or more records of aggregate relationship instances to one or more thresholds regarding relationship instance data for each of the corresponding individual domains based on the apportioning. The one or more thresholds may be regarding when resources are due to be produced from relationship instance data statistics in the corresponding individual domains.

Figure 7:
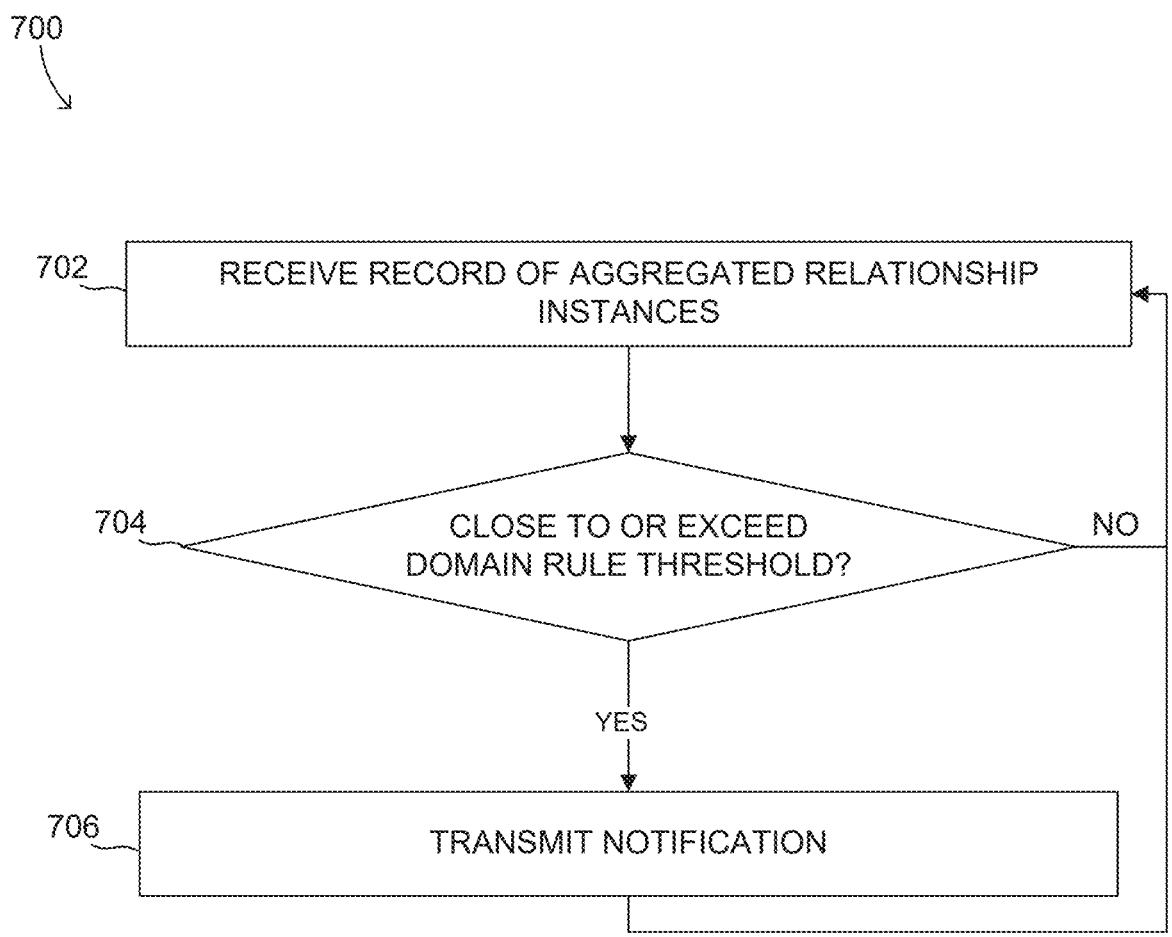
FIG. 7 is a flow diagram of an example process useful in determining for an entity whether there is a potential lack of domain rules compliance in a domain based on aggregated relationship instances, according to various embodiments of the present disclosure.

FIG. 7 is a flow diagram of an example process 700 useful in determining for an entity whether there is a potential lack of domain rules compliance in a domain based on aggregated relationship instances, according to various embodiments of the present disclosure.

At 702, the system 100 receives a record of aggregated relationship instances of a primary entity for a particular domain.

At 704, the system 100 determines whether the record of aggregated relationship instances for the domain meets, is within a predetermined threshold of meeting, or exceeds one or more domain thresholds for the domain. For example, the system 100 may total the base amounts for all the relationship instances in the record and/or determine a total number of relationship instances over applicable periods of time and compare these totals to corresponding thresholds included in updated rules to determine whether these numbers meet, are within a predetermined threshold of meeting, or exceed the thresholds regarding relationship instance data for the domain.

If it is determined by the system 100 at 704 that the record of aggregated relationship instances for the domain does not meet, is not within a predetermined threshold of meeting and does not exceed the one or more thresholds regarding relationship instance data for the domain, then the process 700 proceeds back to 702 to receive a record of aggregated relationship instances of the particular primary entity for another domain. If it is determined at 704 that the record of aggregated relationship instances for the domain meets, is within a predetermined threshold of meeting, or exceeds one or more thresholds regarding relationship instance data for the domain, then the process 700 proceeds to 706.

At 706, the system 100 transmits a notification to the entity associated with that there is a potential lack of domain rules compliance of the entity for the particular domain and the process proceeds to 702 to receive a record of aggregated relationship instances of the primary entity for another domain. This notification may be transmitted in response to the determination by the system 100 at 704 that the record of aggregated relationship instances for the domain meets, is within a predetermined threshold of meeting, or exceeds one or more thresholds regarding relationship instance data for the domain.

Figure 8:
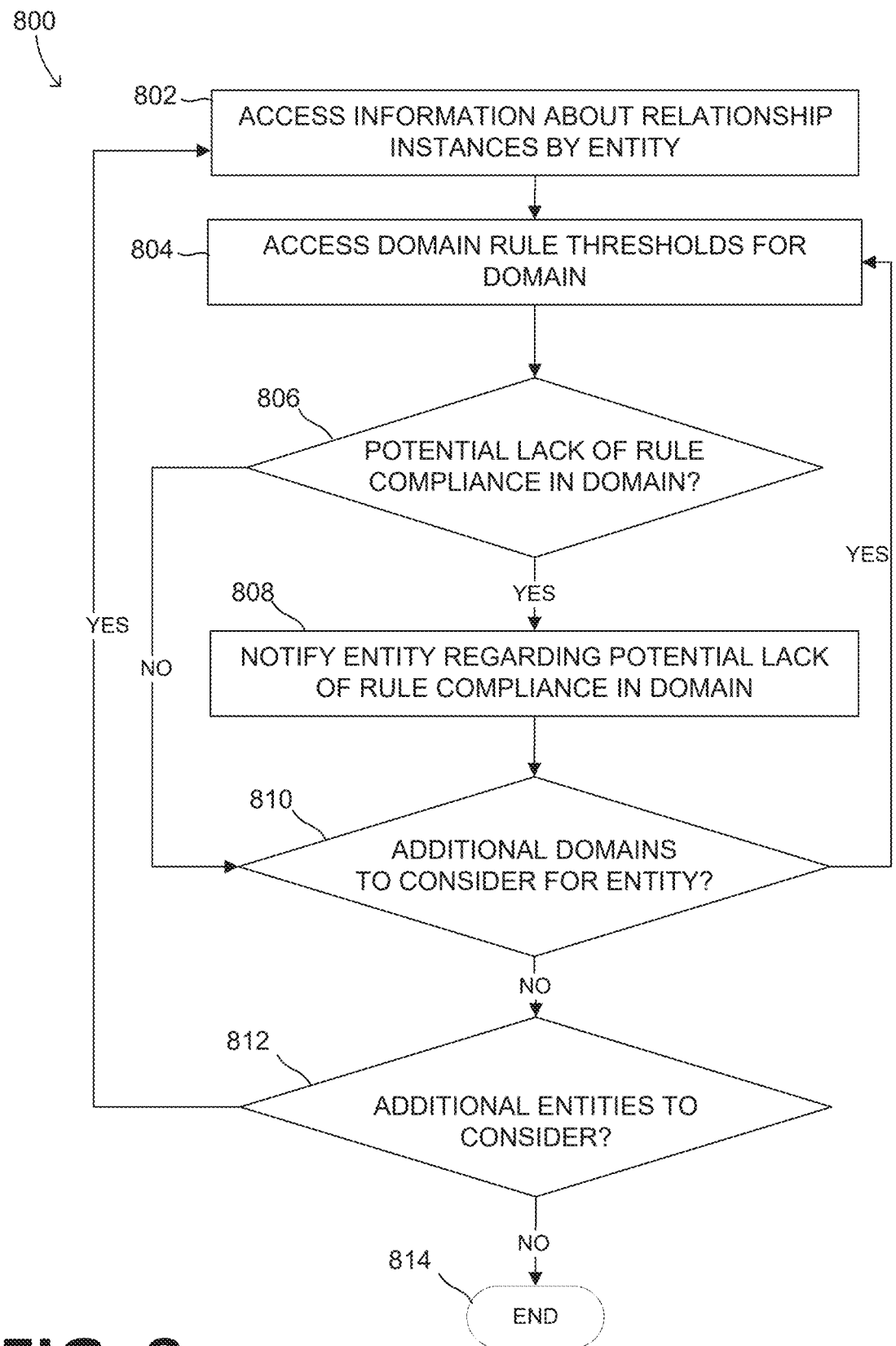
FIG. 8 is a flow diagram of an example process for notifying a plurality of entities whether there is a potential lack of domain rules compliance in a plurality of domains, according to various embodiments of the present disclosure.

FIG. 8 is a flow diagram of an example process 800 for notifying a plurality of entities whether there is a potential lack of domain rules compliance in a plurality of domains, according to various embodiments of the present disclosure.

At 802, the system 100 electronically accesses information about relationship instances of a particular primary entity of a plurality of primary entities.

At 804, the system 100, electronically accesses domain rule thresholds for a domain out of a plurality of domains.

At 806, the system 100 determines whether there exists a potential lack of domain rules compliance of the particular entity in the particular domain based on the accessed information. If it is determined by the system 100 that there exists a potential lack of domain rules compliance of the particular entity in the particular domain based on the accessed information, the process 800 proceeds to 808. If it is determined by the system 100 that there does not exist a potential lack of domain rules compliance of the particular entity in the particular domain based on the accessed information, the process 800 proceeds to 810.

At 808, the system electronically notifies the entity regarding the potential lack of domain rules compliance.

At 810, the system 100 determines whether there are additional domains to consider for the particular entity, such as if the entity has relationship instances associated with an additional domain that has such threshold rules in that additional domain. If it is determined by the system 100 that there are additional domains to consider for the particular entity, then the process proceeds to 804 to access those particular rules for that additional domain. If it is determined by the system 100 that there are no additional domains to consider for the particular entity, then the process proceeds to 812.

At 812, the system 100 determines whether there are additional primary entities to consider, such as when there are additional primary entities that have relationship instances in one or more domains that have such threshold rules in that additional domain. If it is determined by the system 100 that there are additional primary entities to consider, then the process proceeds to 802 to access information about relationship instances by that additional primary entity in a particular domain. If it is determined by the system 100 that there are no additional primary entities to consider, then the process ends at 814.

Figure 9:
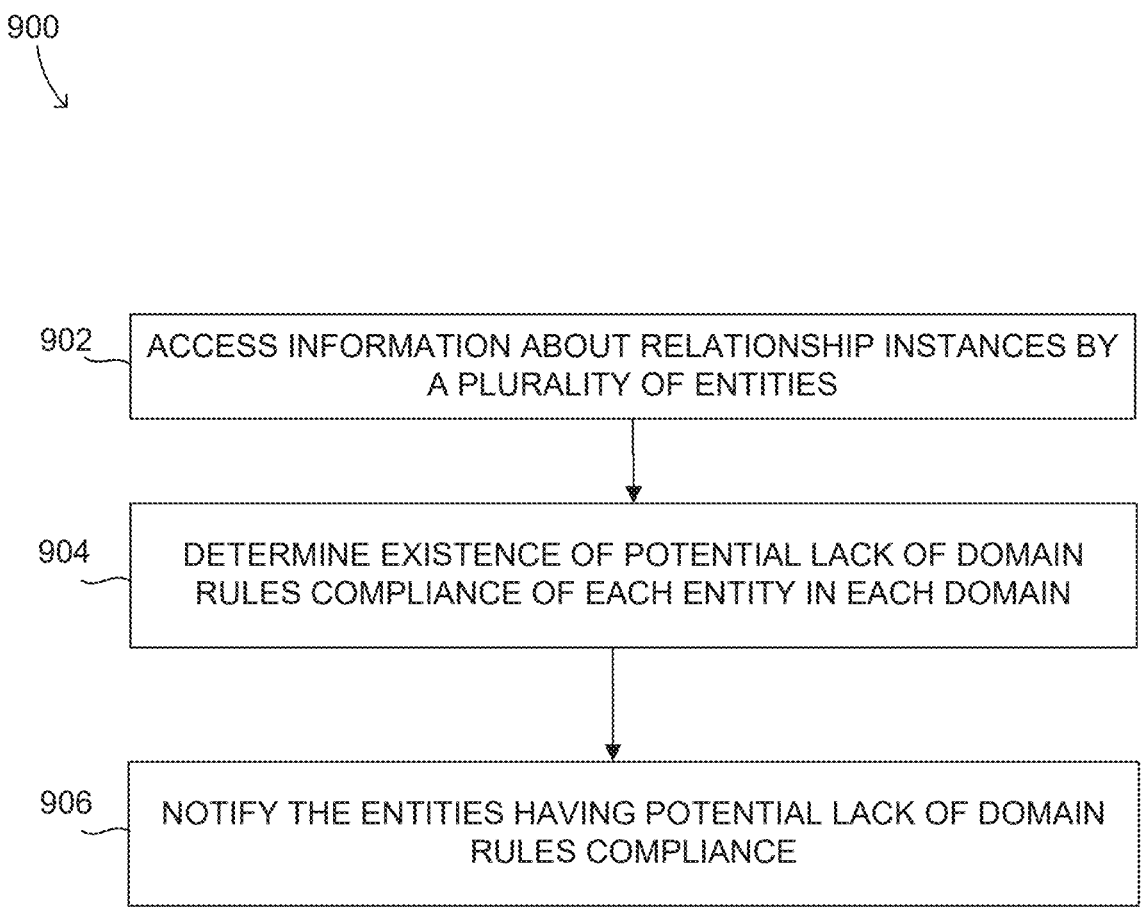
FIG. 9 is a flow diagram of another example process for notifying a plurality of entities whether there is a potential lack of domain rules compliance, according to various embodiments of the present disclosure.

FIG. 9 is a flow diagram of another example process 900 for notifying a plurality of entities whether there is a potential lack of domain rules compliance, according to various embodiments of the present disclosure.

At 902, the system 100 electronically accesses information about relationship instances by a plurality of entities.

At 904, the system 100 determines, for each entity of the plurality of entities, whether there exists a potential lack of domain rules compliance of the entity in each domain of a plurality of domains based on the accessed information.

At 906, the system 100, for each entity of the plurality of entities for which it is determined by the computer system there exists potential lack of domain rules compliance in one or more of the plurality of domains, electronically notifies the entity regarding the potential lack of domain rules compliance.

Returning to FIG. 1, in some embodiments, the system 100 may also obtain the information about relationship instances by the plurality of entities. The system may perform this by, for each entity of the plurality of entities, accessing relationship instance calculations that were performed by the system for the entity for relationship instances associated with one or more of the plurality of domains. For example, the system 100 may monitor relationship instances for the entity in one or more of the plurality of domains. In some embodiments, the system 100 that monitors relationship instances for the entity in particular domains for purposes of determining whether there exists a potential lack of domain rules compliance of the entity may be the same system (or communicate with the same system) that performs per-relationship instance resource production for the entity in various other domains. Thus, moving from determining whether there exists a potential lack of domain rules compliance of the entity in a particular domain to performing per-relationship instance resource production for the entity in that domain may be made seamlessly based on utilizing the same or similar relationship instance monitoring systems. The determining whether there exists a potential lack of domain rules compliance may include comparing the information about the relationship instances by the plurality of entities against stored rules for the plurality of domains. Such stored rules may be about such thresholds in a certain domain.

The comparing of the information about the relationship instances by the plurality of entities against stored rules for the plurality of domains may include aggregating relationship instance data from the information about the relationship instances by the plurality of entities; apportioning the relationship instance data according to their domain to corresponding individual domains of the plurality of domains; generating one or more records of aggregate relationship instances based on the apportioning; and comparing the one or more records of aggregate relationship instances to one or more thresholds regarding relationship instance data for each of the corresponding individual domains based on the apportioning.

Figure 10:
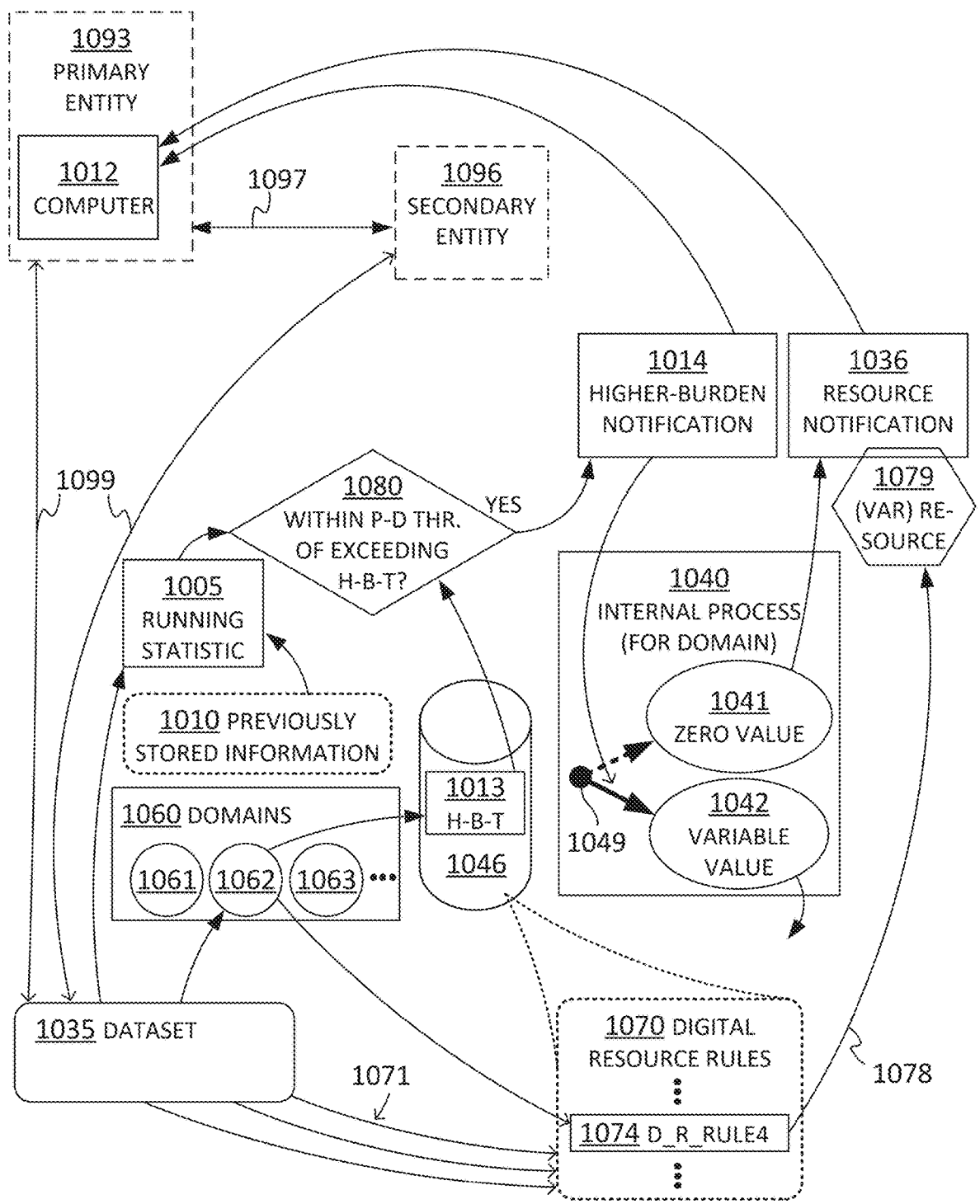
FIG. 10 is a diagram showing sample embodiments for implementing the embodiments of FIG. 1 or FIG. 2.

FIG. 10 is a diagram showing sample embodiments for implementing the embodiments of FIG. 1 and FIG. 2. It will be recognized that elements of FIG. 10 implement at least portions of the service engines 142, 242, the domain rules compliance information generation engine 282, and so on.

A sample primary entity 1093 is shown, which can be as described for the primary entities 119, 210. The primary entity 1093 has a computer 1012, akin to the computer 112, and which is distinct from the computer system of the software service platform 140. A sample secondary entity 1096 is also shown. In this example, the primary entity 1093 has a relationship instance 1097 with the secondary entity 1096.

The primary entity 1093 and/or the secondary entity 1096 may be referred to as simply entities. One of these entities may have one or more attributes. As also described elsewhere, such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, a specific domain that the entity belongs in a context of multiple domains that are defined in terms of the above, and so on.

In some instances, the primary entity 1093 obtains data about the secondary entity 1096, for example as necessary for conducting the relationship instance 1097 with it. This obtained data can be about attributes of the secondary entity 1096, or of the relationship instance 1097. Such data may be received by a computer system about the relationship instance 1097. Such data is shown in the form of a dataset 1035. Sample datasets are shown later in this document. Such data may be received, for example, in the form of a single payload as shown, although that is not necessary. This discussion proceeds in the form of a single dataset 1035 as a single payload for a relationship instance, although that is not necessary.

In embodiments, the dataset 1035 has parameters that can also be called dataset parameters. At least some of the dataset parameters have respective values that can also be called dataset values. The dataset values can be numerical, alphanumeric, Boolean, and so on, as needed for what the parameters characterize. At least one of the dataset values may characterize an attribute of a certain one of the entities 1093 and 1096, as indicated by correspondence arrows 1099.

In embodiments, a domain for the dataset may be identified, from the characterized attribute. This identifying may be performed by one or more associations of the characterized attribute with domains, properties of domains, lists of what domains include, and so on. Sometimes the characterized attribute may even be the name of a domain, such as a component of a mailing address. The identified domain may be associated with the certain entity, which can be the primary entity 1093 or the secondary entity 1096. In the example of FIG. 10, a plurality 1060 of domains can be listed by their names. These domains may include the domains 1061, 1062, 1063, . . . are shown. Of those, the domain 1062 is identified.

A database 1046 may store digital rules about the identified domain 1062, and possibly also about other domains, similarly to what was described for the database 246. These digital rules may implement thresholds. One of these can be a higher-burden threshold (H-B-THR) 1013 for the identified domain 1062.

In embodiments, an internal process 1040 may be performed to produce resources for datasets associated with domains, such as for the identified domain. The internal process 1040 can be part of the resource production engine 253. In embodiments, for a domain, the internal process 1040 may be set up to produce, for datasets relating to the identified domain, a resource having either a) a zero value 1041 or b) a variable value 1042.

The set up of the internal process 1040 can be indicated by a switch 1049, which can point to either one of these as a setting. The setting may be changed, either directly or responsive to conditions being met. In this example, the switch 1049 is shown as set to select the variable value 1042.

Thus a variable value 1042 will be produced by selecting a specific rule and applying it, as shown below.

In embodiments, digital resource rules 1070 are provided, and are sometimes implemented within the database 1046. In this diagram, the digital resource rules 1070 are shown outside the database 1046, as a detail of it. Other elements of the database 1046 may also be shown outside it. In the example of this diagram, only one of the digital resource rules 1070 is shown explicitly, namely a digital resource rule D_R_RULE4 1074, while other such rules are indicated by the vertical dot-dot-dots. These digital resource rules 1070 are digital in that they are implemented for use by software. One or more digital rules may be provided for a domain. Different sets of rules may be provided for different domains.

In embodiments, the stored digital resource rules 1070 may be accessed. These may have been generated by the domain rules compliance information generation engine 282, for instance for the domains 230. They may be stored in the database 246 of the domain rules management component 244.

In embodiments, a certain one of the accessed digital resource rules 1070 may be selected. In this example, the rule D_R_RULE4 1074 is thus selected as the certain digital resource rule. This rule may be thus selected responsive to one or more of the dataset values of the dataset parameters of the dataset 1035, as per the arrows 1071. The selection of this particular rule is indicated also by the fact that an arrow 1078 begins from that rule. The arrow 1078 is described in more detail later in this document. The selected rule may be associated with the identified domain 1062. In fact, the whole set of these digital resource rules 1070 may be associated with the identified domain 1062, while other sets (not shown) may be associated with different domains.

Then a resource for the dataset 1035, such as the (variable) resource 1079 may be produced. The resource may be thus produced by applying the previously selected certain digital resource rule to at least one of the dataset values of the dataset parameters of the dataset 1035. In the example of FIG. 10, the (variable) resource 1079 is produced for the dataset 1035 by applying the certain digital resource rule D_R_RULE4 1074, as indicated by the arrow 1078. The impact of the dataset 1035 in producing the resource 1079 is indicated by at least one of the arrows 1071.

The (variable) resource 1079 may be produced in a number of ways. For instance, at least one of the dataset values can be a numerical base value. In such cases, applying the certain digital resource rule may include performing a mathematical operation on the base value. For example, applying the certain digital resource rule may include multiplying the numerical base value with a number indicated by the certain digital resource rule.

In embodiments a resource notification can be caused to be transmitted. In the example of FIG. 10, a resource notification 1036 can be caused to be transmitted, for example as an answer or other response to the received dataset 1035. The resource notification 1036 can be about the produced resource, its value, and so on. The resource notification 1036, therefore, takes its value either from the zero value 1041, or from the (variable) resource 1079, depending on the setting of the switch 1049. As such, the resource notification 1036 carries a value for the resource regardless of how the resource was produced, i.e. whether set at zero or not.

The resource notification 1036 can be thus transmitted to the primary entity 1093, to their computer 1012, to their UI, and so on. The resource notification 1036 may thus cause a desired image, message, or other such resource notification to appear on the screen, such as within a Graphical User Interface (GUI) and so on. The transmitting of the resource notification 1036 is also seen for the resource 275 in FIG. 2.

FIG. 10 also shows previously stored information 1010, which can be accessed. The previously stored information 1010 can be about previously received datasets for the primary entity 1093 that relate to the identified domain 1062. For instance, the previously stored information 1010 can be the above-described primary entity data 229, which can be accessed by the online service platform 240, whether stored as shown or elsewhere. In some embodiments, the previously received datasets can be stored on the online service platform 240 itself. The previously received datasets may have respective previous dataset values. At least some of the previous dataset values may characterize an attribute of the primary entity or the secondary entity; the attribute could be an address. At least some of the previous dataset values may characterize respective the previous dates of these datasets, and the previous dates can be within a current time period. Detailed examples of such data and time periods are shown later in this document.

The previously stored information 1010 can be accessed on a number of occasions, for instance as was described for when and how the primary entity data 229 can be received by the domain rules compliance information generation engine 282. For example, the previously stored information 1010 may be so received by being accessed. Such accessing can be performed on a periodic basis, and/or in response to the content of database 246 becoming updated, and so on.

FIG. 10 moreover shows that a running statistic 1005 can be computed. The running statistic 1005 may be computed from the dataset 1035 and from the previously stored information 1010 that was accessed. The running statistic 1005 may be for the primary entity and for the current time period, which is of the same time period as the dataset. Sample such running statistics are provided later in this document.

FIG. 10 furthermore shows that a determination 1080 may be made. The determination is whether or not the running statistic 1005 is within a predetermined threshold of meeting or exceeding a higher-burden threshold for the identified domain. This is described in more detail later in this document. Such a higher-burden threshold 1013 may be learned from the database 1046.

FIG. 10 also shows that, if the determination 1080 results in an answer of YES then, a higher-burden notification 1014 can be caused to be communicated to the primary entity 1093, to their computer 1012, to their UI, and so on. The higher-burden notification 1014 can be about changing the internal process 1040 to be set up instead to thus produce a resource having a variable value. In the example of FIG. 10, such changing could be by changing the switch 1049 from pointing to the zero value 1041 to pointing to the variable value 1042, which is a higher burden to produce from the computational point of view.

Figure 11:
FIG. 11 shows sample received datasets according to embodiments, which are improvements in automated computerized systems.

FIG. 11 shows sample datasets 1109, which can be as the dataset 1035 and also previously received datasets, taken together. In this example, the datasets 1109 are shown in the order that they may have been received, and are not necessarily sorted.

The datasets 1109 include a parameter ID, which is an identifier of the dataset. The datasets 1109 also include time values for the dataset. In this example, the time value is shown directly as an applicable time duration, which can be the current time period or a previous time period. These time values here can be for one of three sample time durations, such as DA or DB, or DC. In embodiments, the time value is more detailed than the time period, for instance it includes a date, and even a time, of a relationship instance.

The datasets 1109 are associated with domains. They include dataset parameter that has a value of D1, D2, D3, or D4. These values D1, D2, D3, or D4 may indicate a domain out of a plurality of domains. For instance, these values D1, D2, D3, or D4 may be addresses.

The datasets 1109 also include a parameter BX. The parameter BX has a numerical base value for an aspect of the dataset, which could be the same or different for each dataset. Each dataset may have additional parameters, indicated by the dot-dot-dot.

In some embodiments, it is determined whether or not the running statistic is within the predetermined threshold by first sorting the previously received datasets. Examples are now described.

Figure 12:
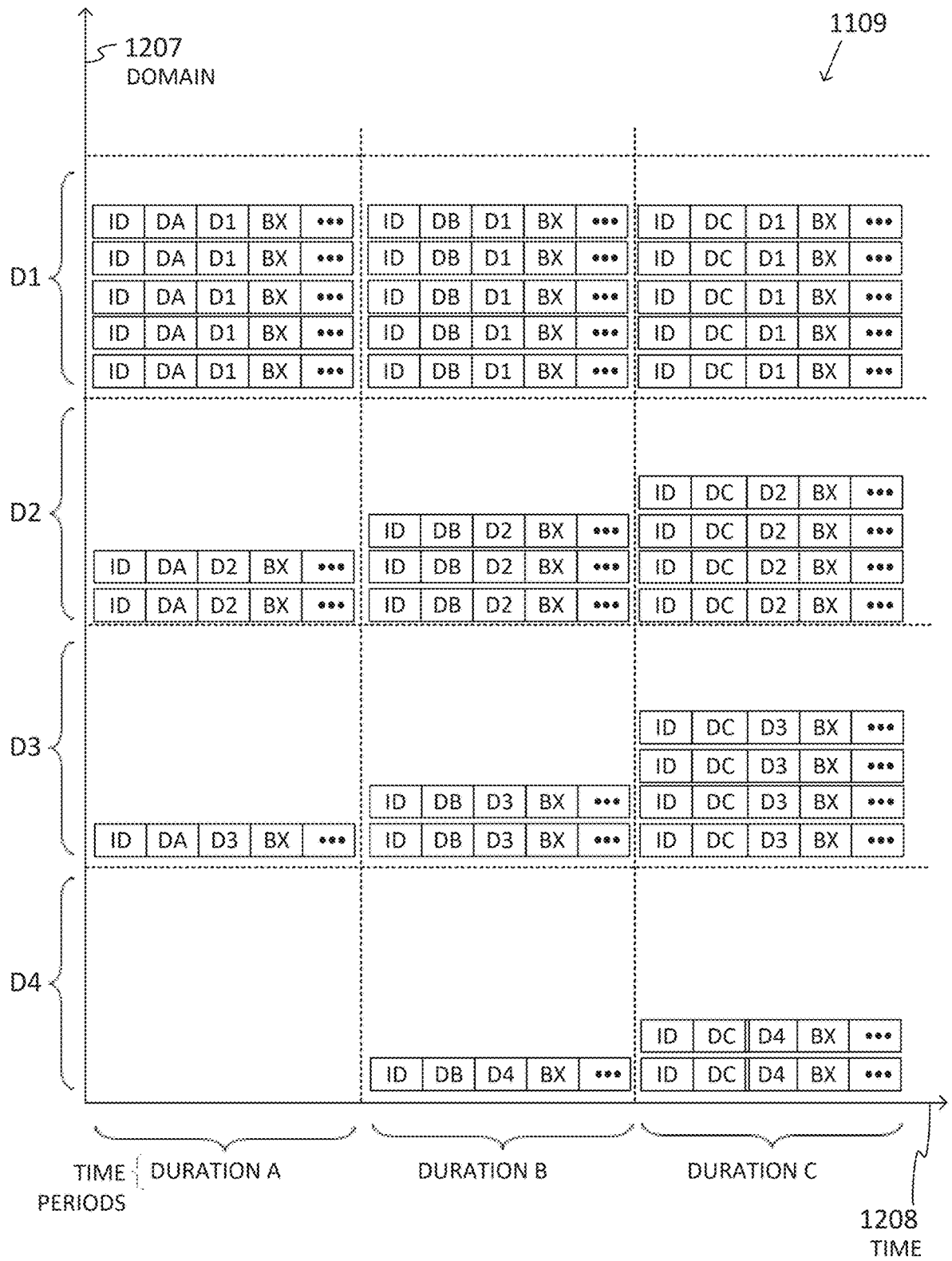
FIG. 12 shows the sample datasets from FIG. 11 after they have been sorted according to embodiments, which are improvements in automated computerized systems.

FIG. 12 shows the sample datasets 1109 of FIG. 11, after they have been sorted such that they are grouped or categorized along a vertical domain axis 1207 and a horizontal time axis 1208. This sorting defines a matrix of cells by domain and by time duration or time period, and datasets are categorized within the cells according to their values. Thus, each cell of the matrix contains the datasets for relationship instances that occurred during a particular time duration or time period, such as a year, and that are associated with a particular domain.

In some embodiments, it is determined whether or not the running statistic meets the higher-burden threshold from only the number of the datasets in a single cell. Examples are now described.

Figure 13:
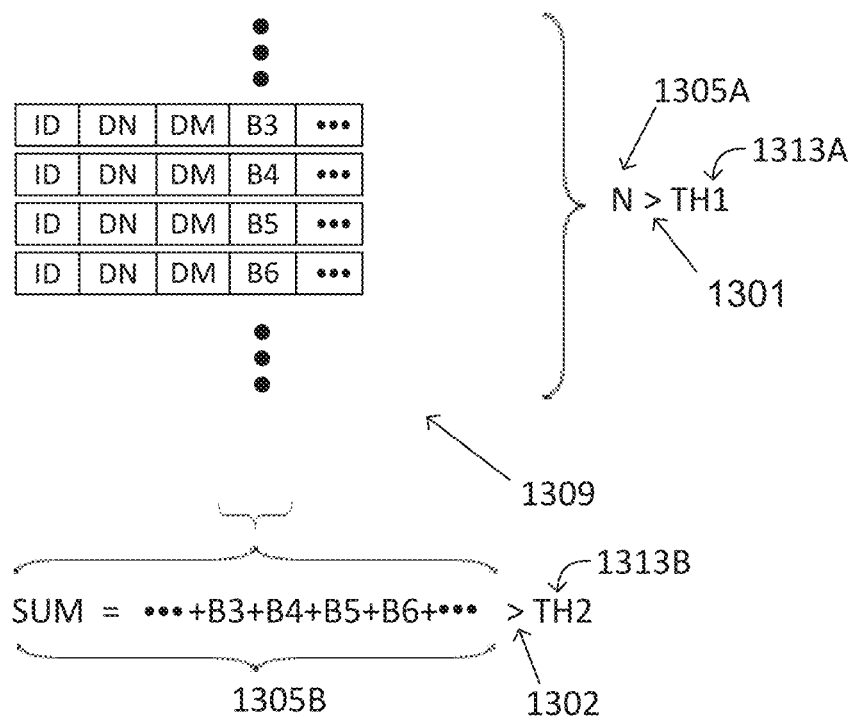
FIG. 13 shows examples of applying sample alignment digital rules to the datasets sorted into a single cell of FIG. 12 according to various embodiments, which are improvements in automated computerized systems.

FIG. 13 shows sample datasets 1309 from a single one of the cells of FIG. 12. These could be datasets of any one of these cells-indeed the datasets 1309 have the same value DN for the domain parameter, and the same value DM for the time duration. What is shown, however, is their different numeric values . . . , B3, B4, B5, B6, . . . for the parameter BX.

In some embodiments, the running statistic 1005 of FIG. 10 is the total number N 1305A of the datasets 1309. In other words, the running statistic 1005 includes a total number of the previously received datasets plus one-which is the latest received one. It is then determined whether that total number N 1305A exceeds a higher-burden threshold, in this case a first threshold TH1 1313A. This is illustrated by an inequality equation 1301, where the total number N 1305A of these datasets 1309 is shown as larger than the first threshold TH1 1313A, in this example.

In some embodiments, the running statistic 1005 of FIG. 10 is the sum 1305B of the numeric values ( . . . , B3, B4, B5, B6 . . . ) of the parameter BX of the datasets 1309. In other words, at least one of the dataset values characterizes a base value, the previously received datasets have respective previous dataset values that characterize respective previous base values, and the running statistic includes a sum 1305B of the previous base values plus the base value. It is then determined whether that sum 1305B exceeds a higher-burden threshold, in this case a second threshold TH2 1313B. This is illustrated by an inequality equation 1302, where the sum 1305B of these values is shown as larger than the second threshold TH2 1313B, in this example.

From the inequalities 1301, 1302 of FIG. 13, it will be appreciated that the sample running statistics of the total number N 1305A and the sum 1305B have discrete values, which become incremented every time one more dataset is added to the datasets 1309. The time evolution of these running statistics is now described.

Figure 14:
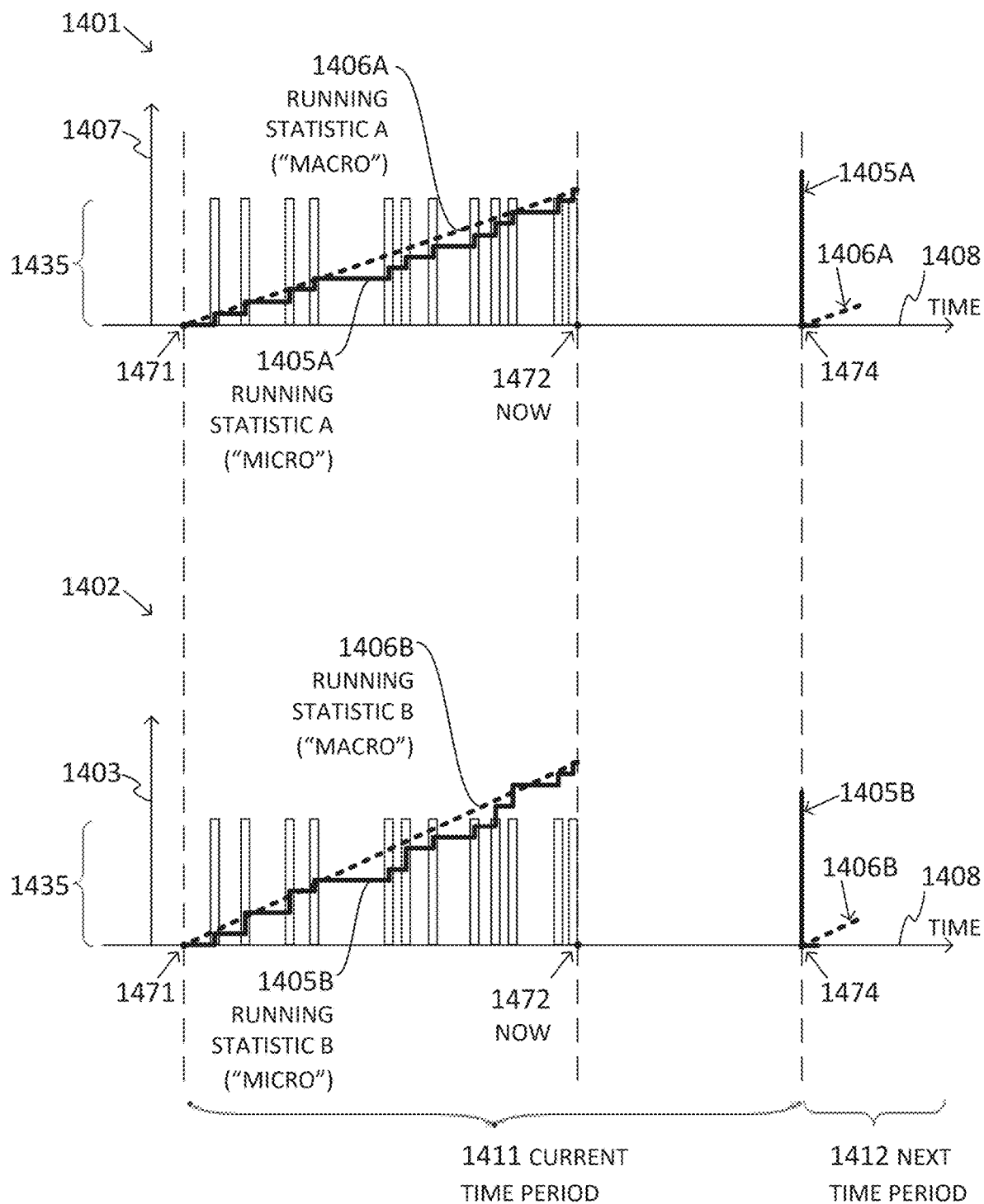
FIG. 14 has timing diagrams for discussing the time evolution and different natures of representation of the sample running statistics of FIG. 13, according to embodiments.

FIG. 14 is provided for discussing the time evolution and different natures of representation of the sample running statistics of FIG. 13. In particular, FIG. 14 has a timing diagram 1401 for the evolution of the total number N 1305A, and a timing diagram 1402 for the evolution of the sum 1305B.

Timing diagram 1401 has a vertical axis 1407 and a horizontal time axis 1408. The time axis 1408 has an intercept at a time 1471, for when a current time period 1411 begins. It also has a time intercept at a time 1472 for a present time that is designated as "NOW" and is within the current time period 1411. It also has an intercept at a time 1474 for when the current time period 1411 is expected to end, and the next time period 1412 is expected to begin.

Timing diagram 1401 also shows individual datasets 1435 as vertical rectangles, at the times they are received. The tall and narrow rectangle notation is chosen conceptually here so as to match the appearance of the dataset 1035 turned to its side, while in fact in the timing diagram 1401 the datasets 1435 should have practically zero length along the time axis 1408, as they are considered received at a time instant.

In the timing diagram 1401, values of a running statistic are plotted against the axes 1407 and 1408. In particular, a thick line 1405A represents the time evolution of the statistic that is the total number N 1305A of FIG. 13. In FIG. 14, the line 1405A starts at the value of 0 at the time 1471, proceeds horizontally while no datasets are received, and increases by one every time one of the datasets 1435 is received. In other words, the line 1405A proceeds stepwise, one step per dataset. The height of each step is the same, but the steps do not necessarily occur at regular time intervals. The stepwise line 1405A ends at the time 1472, which is the last time for which datasets have been received. In fact, in this example, the last dataset is received at the time 1472. It is also known that the stepwise line 1405A will come back down to 0 at the time 1474, when the running statistic will be re-initialized for the next time period 1412.

The stepwise line 1405A represents the "micro" approach of representing the time evolution of the total number N 1305A that is one of the running statistics of FIG. 13. While this is a precise representation, in embodiments it is sometimes advantageous to consider instead a straight-line 1406A representation. In this example, the straight-line 1406A representation begins and ends at the same points as the stepwise line 1405A. The straight-line 1406A representation is more convenient when aggregates of many of the datasets 1435 are considered, and is thus called the "macro" view. Its slope is determined from the entire time period, while in some instances it may be advantageous to consider only the localized slope near the end for predicting when the running statistic will reach a certain point.

Timing diagram 1402 has a vertical axis 1403 and repeats the horizontal time axis 1408 of the timing diagram 1401. In fact, the timing diagram 1402 repeats features of the timing diagram 1401, such as the individual datasets 1435, shown received at the same times.

A thick, stepwise line 1405B represents the time evolution of the sum 1305B that is the other running statistic of FIG. 13. In FIG. 14, the line 1405B starts at the value of 0 at the time 1471, proceeds horizontally while no datasets are received, and increases every time one of the datasets 1435 is received, by the amount of the base value of the latest dataset. That is why the vertical increases are not necessarily equal to each other. The line 1405B also ends at the time 1472, and it will come back down to 0 at the time 1474. In addition, a "macro" straight-line 1406B representation is shown.

Going forward, only the macro notation will be used, but it should be remembered that the micro notation is, strictly speaking, a more accurate one, as these running statistics are discrete numbers.

Figure 15:
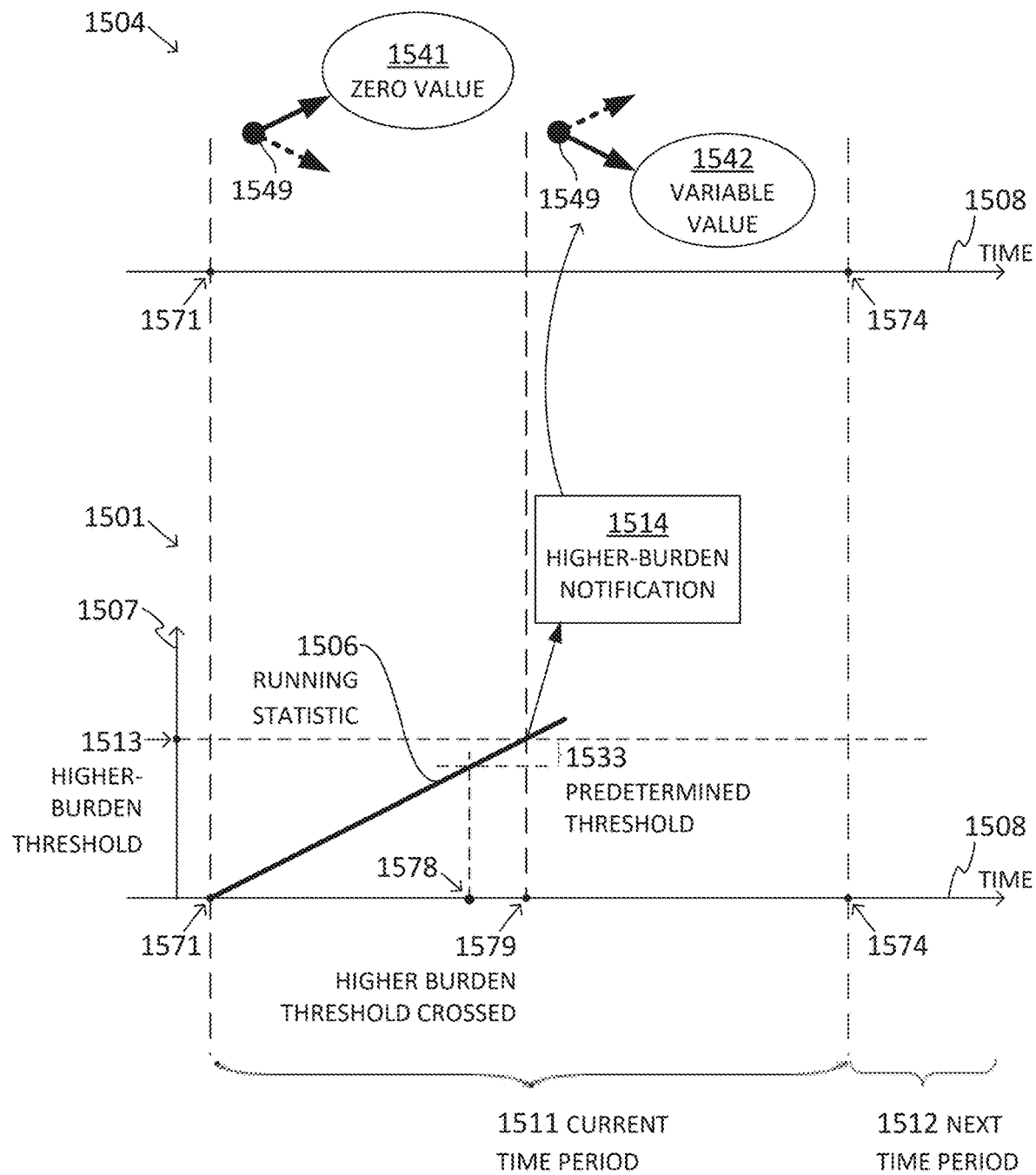
FIG. 15 shows timing diagrams for what may result from the embodiments of FIG. 10.

FIG. 15 shows a timing diagram 1501 and a timing diagram 1504. Timing diagram 1501 has a vertical axis 1507 and a horizontal time axis 1508. The vertical axis 1507 is for values of a running statistic 1506. The running statistic 1506 can be either one of the running statistics described in FIG. 14. The vertical axis 1507 has an intercept at a higher-burden threshold 1513, such as the higher-burden threshold (H-B-THR) 1013 of FIG. 10.

The time axis 1508 has an intercept at a time 1571, for when a current time period 1511 begins. It also has an intercept at a time 1574 for when the current time period 1511 is expected to end, and the next time period 1512 is expected to begin. Moreover, the time axis 1508 has an intercept at a time 1579, which is when the running statistic 1506 crosses the higher-burden threshold 1513. This happens before the ending time 1574 of the current time period 1511. Even before the time 1579, after the time 1578, the running statistic is within a predetermined threshold 1533 of meeting or exceeding the higher-burden threshold 1513. This is the fact that can be determined at the determination 1080 of FIG. 10.

Accordingly, in embodiments, a higher-burden notification 1514 can be caused to be communicated, responsive to determining that the running statistic is within the predetermined threshold 1533. In some cases, the predetermined threshold 1533 is zero, and in fact the higher-burden notification 1514 can be caused to be communicated after the time 1579.

The timing diagram 1504 repeats the horizontal time axis 1508 of the timing diagram 1501. The timing diagram 1504 shows a time evolution of how an internal process is set up, according to a switch 1549. The internal process can be the same as the internal process 1040 described with reference to FIG. 10.

At the beginning time 1571 of the current time period 1511, the internal process is set up to produce, for datasets relating to the domain, a resource having a zero value 1541. This is indicated in FIG. 15 by the switch 1549 pointing with a solid arrow to the zero value 1541, and also pointing by a dashed arrow to nothing.

However, responsive to the higher-burden notification 1514, the internal process can be changed to be set up to produce, for datasets relating to the domain, a resource having a variable value 1542. This is indicated in the timing diagram 1504 by the switch 1549 now pointing with a solid arrow to the variable value 1542, while now a dashed arrow points to nothing. This switching can be implemented by the primary entity 1093 responsive to heeding the higher-burden notification 1514. In other embodiments, the switch is automatic, and performed responsive to determining that the running statistic is within the predetermined threshold 1533, which is zero or a relatively small number, and so on.

Figure 16:
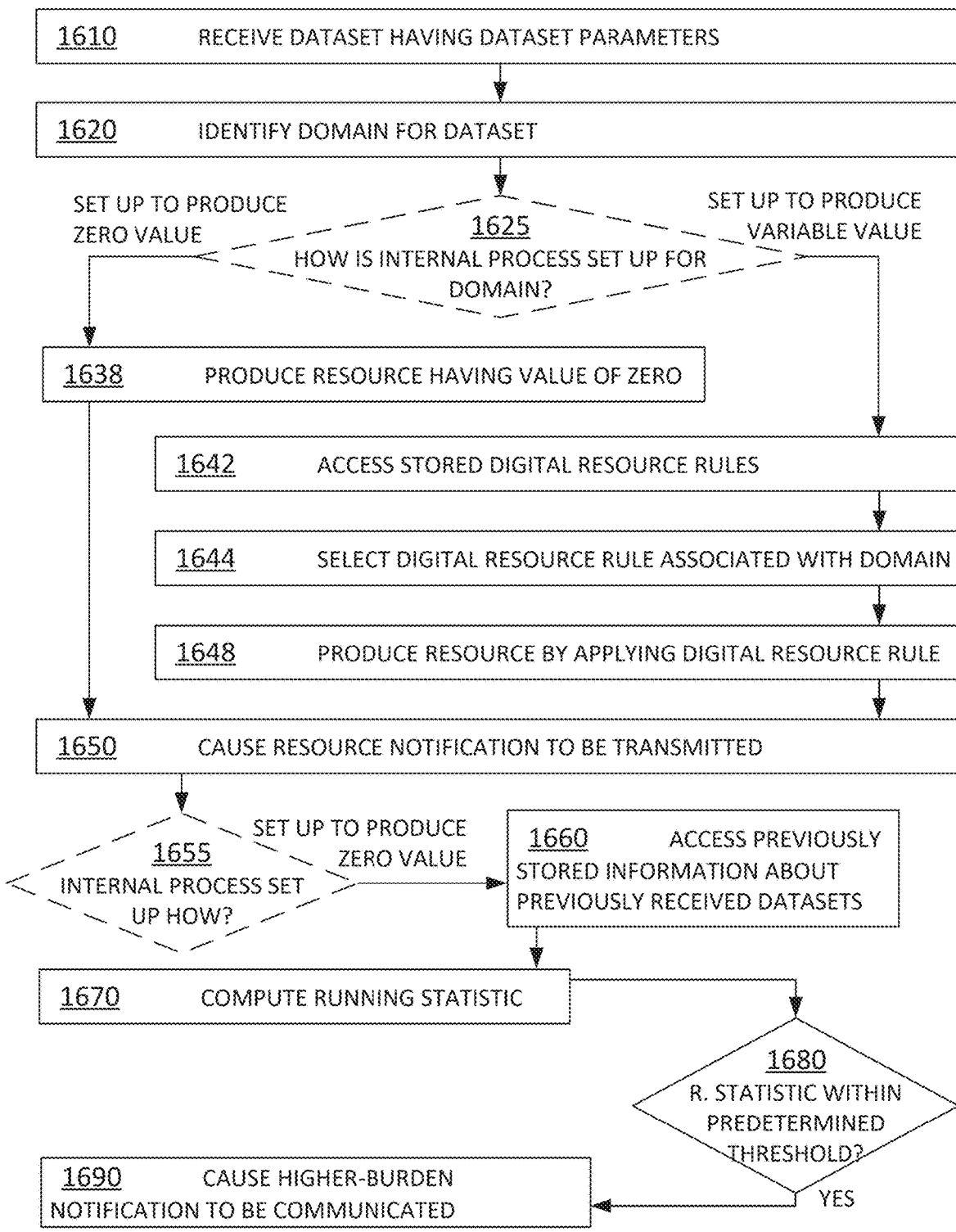
FIG. 16 is a flowchart for illustrating sample methods according to embodiments, which are improvements in automated computerized systems.

FIG. 16 shows a flowchart 1600 for describing methods according to embodiments. According to an operation 1610, a dataset may be received. A sample such dataset is the dataset 1035. The received dataset may have dataset parameters of a relationship instance between a primary entity and a secondary entity, such as the relationship instance 1097 between the primary entity 1093 and the secondary entity 1096. At least some of the dataset parameters have respective dataset values. At least one of the dataset values may characterize an attribute of the secondary entity. At least one of the dataset values may characterize a date of the relationship instance, and the date may be within a current time period.

According to another operation 1620, a domain may be identified from the characterized attribute of the secondary entity. The domain may be identified for the dataset. The domain may be identified out of a plurality of domains. For example, this can be as described for FIG. 10, where the domain 1062 is identified out of the plurality 1060 of domains.

According to an optional decision operation 1625, it may be detected how an internal process, such as the internal process 1040, is set up to produce resources for datasets associated with the identified domain. The decision operation 1625 may be performed as a lookup of a flag, or an established logical path, and so on. The decision operation 1625 is characterized here as optional, in that it need not be performed explicitly, for instance if it is part of an established logical path. What can be performed explicitly is the subsequent production of a resource according to how the internal process 1040 is set up, per the below.

According to another operation 1638, a resource having a value of zero may be produced for the dataset, responsive to an internal process for the identified domain being set up to produce a resource having a zero value. Such an internal process is, for example, the internal process 1040.

Else, responsive to the internal process being set up to produce for the dataset in the identified domain a resource having a variable value, according to another operation 1642, stored digital resource rules may be accessed. For instance, the stored digital resource rules 1070 may be accessed. Then, according to another operation 1644, a certain one of the accessed digital resource rules may be selected responsive to one or more of the dataset values. The selected digital resource rule may be associated with the identified domain. In the example of FIG. 10, the digital resource rule 1074 D_R_RULE4 was thus selected. Then, according to another operation 1648, a resource for the dataset may be produced by the computer system applying the certain digital resource rule to at least one of the dataset values. This can be performed as indicated for the (variable) resource 1079.

Regardless of whether the resource was produced by the operation 1638 or by the operations 1642, 1644, 1648 then, according to another operation 1650, a resource notification can be caused to be transmitted to one of an output device and another device. In some embodiments, the output device or the other device is a computer of the primary entity, such as the computer 112, the computer 1012, and so on. In some embodiments, the output device or the other device is a computer working on behalf of the primary entity, such as a computer in the ERP system 121, 221, and so on. The resource notification can be generated as described for the resource notification 1036. The resource notification can be about an aspect of the produced resource.

According to another optional decision operation 1655, it may be detected how the internal process is set up to produce a resource for a dataset in the identified domain. This operation 1655 is similar to the operation 1625, and may be performed similarly or differently, depending on planning and operational context. The operation 1655 may be initiated similarly to how accessing the previously stored information 1010 was initiated, or by a user, by a calendar operation, by another condition being met, and so on.

If at the operation 1655 it is detected that the internal process is set up for datasets in the identified domain to produce a resource for the dataset having a zero value, then execution may proceed to another operation 1660. Else, after the operation 1655, execution may proceed to a different operation, within or outside the flowchart 1600.

According to the operation 1660, previously stored information may be accessed. This previously stored information can be as described for the previously stored information 1010.

According to another operation 1670, a running statistic may be computed, for instance as described for the running statistics 1005, 1305A, 1305B.

According to another operation 1680, it may be determined whether or not the running statistic of the operation 1670 is within a predetermined threshold of meeting or exceeding a higher-burden threshold for the identified domain. This operation can be performed as described for the determination 1080. Such was also plotted with reference to the timing diagram 1501, for the running statistic 1506 being within a predetermined threshold 1533 of meeting or exceeding a higher-burden threshold 1513.

If at the operation 1680 the answer is YES then, according to another operation 1690, a higher-burden notification can be caused to be communicated to a computer of the primary entity, such as the computer 112, the computer 1012, and so on. Such was also seen in FIG. 15, with the higher-burden notification 1514. The higher-burden notification can be about changing the internal process to be set up instead to thus produce a resource having a variable value. Such was also seen in the timing diagram 1504, where the higher-burden notification 1514 is about changing the internal process—indicated by the switch 1549—to be set up instead to thus produce a resource having a variable value 1542.

Second Embodiments

As mentioned above, in second embodiments an Online Service Provider (OSP) may help the primary entity altogether avoid undertaking the higher burden, or at least avoid a penalty of it. In such embodiments the Online Service Provider (OSP) monitors a running statistic of incoming datasets of an entity in relation to a higher-burden threshold of a domain identified from plurality of domains, for notifying the entity of rare opportunity to avoid negative consequences due to the running statistic reaching the higher-burden threshold late within a current time period. Embodiments are now described in more detail.

Figure 17:
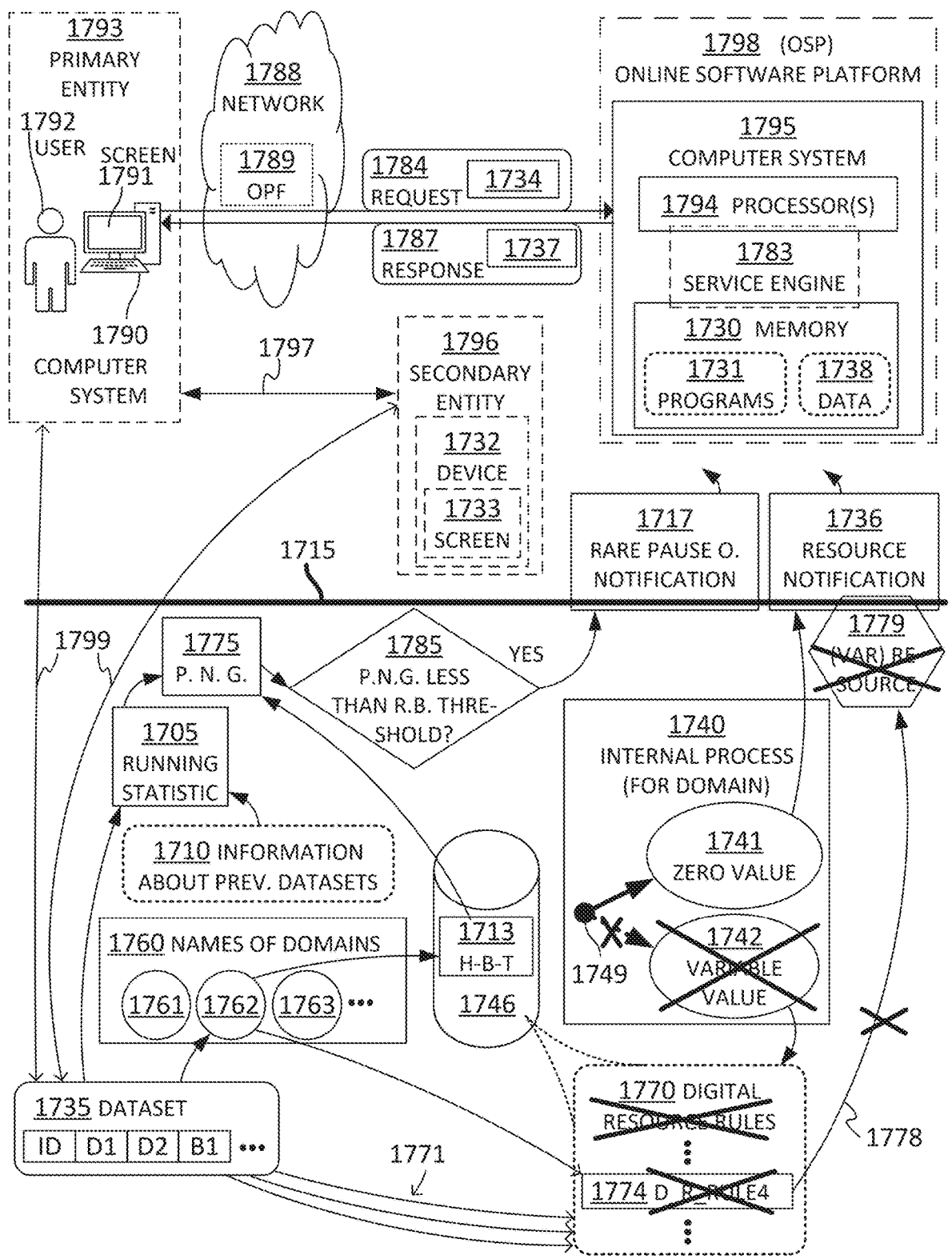
FIG. 17 is a diagram showing sample aspects of embodiments, which are improvements in automated computerized systems.

FIG. 17 is a diagram showing sample aspects of additional embodiments. it will be recognized that many of the elements and operations of FIG. 17 can be similar, in fact often identical, to respective elements and operations described earlier in this document. In fact, often similar reference numerals are used, although that is not binding in what they mean in each case.

A thick horizontal line 1715 separates FIG. 17, although not completely or rigorously. Above the line 1715 are shown elements with emphasis mostly on entities, components, their relationships, and their interactions, while below the line 1715 are shown elements with emphasis mostly on processing of data that takes place often within one or more of the components that are shown above the line 1715.

Above the line 1715, a sample computer system 1795 according to embodiments is shown. The computer system 1795 has one or more processors 1794 and a memory 1730. The memory 1730 stores programs 1731 and data 1738. The one or more processors 1794 and the memory 1730 of the computer system 1795 thus implement a service engine 1783.

The computer system 1795 can be located in "the cloud." In fact, the computer system 1795 may optionally be implemented as part of an Online Software Platform (OSP) 1798. The computer system 1795 can be configured to perform one or more predefined services, for example via operations of the service engine 1783. Such services can be searches, determinations, computations, verifications, notifications, the transmission of specialized information, including data that effectuates payments, the generation and transmission of documents, the online accessing of other systems to effect registrations, and so on, including what is described in this document. Such services can be provided in the form of Software as a Service (SaaS). As such, the OSP 1798 can be an online service provider.

A user 1792 may be standalone. The user 1792 may use a computer system 1790 that has a screen 1791, on which User Interfaces (UIs) may be shown. In embodiments, the user 1792 and the computer system 1790 are considered part of a primary entity 1793, which could be an organization, an institution, and so on. In such instances, the user 1792 can be an agent of the primary entity 1793, and even within a physical site of the entity 1793, although that is not necessary. In embodiments, the computer system 1790 or other device of the user 1792 can be client devices for the computer system 1795. The user 1792 or the primary entity 1793 can be clients for the OSP 1798. For instance, the user 1792 may log into the computer system 1795 by using credentials, such as a user name, a password, a token, and so on.

The computer system 1790 may access the computer system 1795 via a communications network 1788, such as the internet. In particular, the entities and associated systems of FIG. 17 may communicate via physical and logical channels of the communications network 1788. For example, information may be communicated as data using the Internet Protocol (IP) suite over a packet-switched network such as the Internet or other packet-switched network, which may be included as part of the communications network 1788. The communications network 1788 may include many different types of computer networks and communication media, including those used by various different physical and logical channels of communication, now known or later developed. Non-limiting media and communication channel examples include one or more, or any operable combination of: fiber optic systems, satellite systems, cable systems, microwave systems, Asynchronous Transfer Mode ("ATM") systems, frame relay systems, Digital Subscriber Line ("DSL") systems, Radio Frequency ("RF") systems, telephone systems, cellular systems, other wireless systems, and the Internet. In various embodiments the communications network 1788 can be or include any type of network, such as a Local Area Network (LAN), a Metropolitan Area Network (MAN), a Wide Area Network (WAN), or the internet. Accordingly, from certain perspectives, the OSP 1798 is in the cloud.

Accessing, downloading and/or uploading, and so on may be permitted among these computer systems. Such can be performed, for instance, with manually uploading files, like spreadsheet files, etc. Such can also be performed automatically as shown in the example of FIG. 17, with systems exchanging requests and responses.

Moreover, in some embodiments, data from the computer system 1790 and/or from the computer system 1795 may be stored in an Online Processing Facility (OPF) 1789 that can run software applications, perform operations, and so on. In such embodiments, requests and responses may be exchanged with the OPF 1789, downloading or uploading may involve the OPF 1789, and so on. In such embodiments, the computer system 1790 and any devices of the OPF 1789 can be considered to be remote devices, at least from the perspective of the computer system 1795.

In embodiments, the user 1792 and/or the primary entity 1793 have instances of relationships with secondary entities. Only one such secondary entity 1796 is shown. The secondary entity 1796 can be an organization, a person, and so on. In some embodiments, the secondary entity 1796 has a device 1732, which can be an electronic device such as a cellphone, tablet, laptop, computer system and so on. The device 1732 may have a screen 1733. In this example, the primary entity 1793 has a relationship instance 1797 with the secondary entity 1796. In fact, the secondary entity 1796 may have used a device such as the device 1732 to create the relationship instance 1797. The primary entity 1793 and/or the secondary entity 1796 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, a specific domain that the entity belongs in a context of multiple domains that are defined in terms of the above, and so on.

In some instances, the user 1792 and/or the primary entity 1793 obtain data about one or more secondary entities, for example as necessary for conducting the relationship instances with them. The obtained data can be about attributes of the entities, or of the relationship instances.

In embodiments, the computer system 1795 receives one or more datasets. A sample received dataset 1735 is shown below the line 1715. The dataset 1735 may be received by the computer system 1795 in a number of ways. In some embodiments, one or more requests may be received by the computer system 1795 via a network. In this example, a request 1784 is received by the computer system 1795 via the communications network 1788. The request 1784 has been transmitted by the remote computer system 1790. The received one or more requests can carry payloads. In this example, the request 1784 carries a payload 1734. In such embodiments, the one or more payloads may be parsed by the computer system 1795 to extract the dataset. In this example, the payload 1734 can be parsed by the computer system 1795 to extract the dataset 1735. In this example the single payload 1734 encodes the entire dataset 1735, but that is not required. In fact, a dataset can be received from the payloads of multiple requests. In such cases, a single payload may encode only a portion of the dataset. And, of course, the payload of a single request may encode multiple datasets. Additional computers may be involved with the communications network 1788, some beyond the control of the user 1792 or of the OSP 1798, and some within such control.

In embodiments, the dataset 1735 has parameters that can also be called dataset parameters. At least some of the dataset parameters have respective values that can also be called dataset values. The dataset values can be numerical, alphanumeric, Boolean, and so on, as needed for what the parameters characterize. For example, the value of an identity parameter ID may indicate an identity of the dataset 1735, so as to differentiate it from other such datasets. At least one of the dataset values may characterize an attribute of a certain one of the entities 1793 and 1796, as indicated by correspondence arrows 1799. For instance, a parameter D1 may have the value of a name of the certain entity, a parameter D2 may have a value of relevant data of the entity, and so on. Plus, an optional dataset parameter B1 may have a numerical base value. The base value B1 can be for an aspect of the dataset, and so on. The aspect of the dataset may be the aspect of a value that characterizes the attribute, an aspect of the reason that the dataset was created in the first place, an aspect of the relationship instance 1797, and so on. The dataset 1735 may further have additional dataset parameters, as indicated by the horizontal dot-dot-dot in the right side of the dataset 1735. In embodiments, the dataset values characterize attributes of both the primary entity 1793 and the secondary entity 1796, but that is not required.

In embodiments, the computer system 1795 may identify, from the characterized attribute, a domain for the dataset. In the example of FIG. 17, a plurality of domain names 1760 are indicated. The domain names 1760 may include the domain names 1761, 1762, 1763, . . . . Of those, the domain name 1762 is identified. This identifying may be performed by one or more associations of the characterized attribute with domains, properties of domains, lists of what domains include, and so on. Sometimes the characterized attribute may even be the name of a domain, such as a component of a mailing address. The identified domain may be associated with the certain entity, which can be the primary entity 1793 or the secondary entity 1796.

A database 1746 may store digital rules about the identified domain name 1762, and possibly also about other domain names, similarly to what was described for the database 1046. These digital rules may implement thresholds. One of these can be a higher-burden threshold (H-B-THR) 1713 for the identified domain 1762. It will be understood that there can be one such threshold for each statistic.

In embodiments, an internal process 1740 may be performed to produce resources for datasets for domains, such for as the identified domain, meaning for the domain that was identified by its name. The internal process 1740 can be as the internal process 1040. In embodiments, for a domain, the internal process 1740 may be set up to produce, for datasets relating to the identified domain, a resource having either a) a zero value 1741 or b) a variable value 1742.

The setting up can be indicated by a switch 1749, which can point to either one of these values. The setting may be changed, either directly by actions of the user 1792, or automatically responsive to conditions being met. In this example, the switch 1749 is shown to select the zero value 1741. Thus, a zero value 1741 will be produced.

In embodiments, digital resource rules 1770 are provided for use by the OSP 1798. These are sometimes implemented within the database 1746. In the example of this diagram, only one sample digital resource rule is shown explicitly, namely rule D_R_RULE4 1774, while other such rules are indicated by the vertical dot-dot-dots. These rules 1770 are digital in that they are implemented for use by software. For example, these rules 1770 may be implemented within the programs 1731 and/or the data 1738. The data portion of these rules 1770 may alternately be stored in memories, local or in other places that can be accessed by the computer system 1795. The storing can be in the form of a spreadsheet, a database, etc. One or more digital rules may be provided for a domain. Different sets of rules may be provided for different domains.

In the example of FIG. 17, the digital resource rules 1770 are not being used, and thus are shown as crossed out. This is because the switch 1749 is not shown to select the variable value 1742. As such, additional elements in FIG. 17 are also shown as crossed out.

Even though some elements are shown as crossed out, for completeness, more embodiments are described for if the switch 1749 would instead be shown to select the variable value 1742. Responsive to that, the computer system 1795 would be accessing the stored digital resource rules 1770 of the domain that was identified. Then the computer system 1795 would be selecting a certain one of the accessed digital resource rules 1770. In this example, the rule D_R_RULE4 1774 would be thus selected as the certain digital resource rule. The computer system 1795 would be thus selecting the certain rule D_R_RULE4 1774 responsive to one or more of the dataset values of the dataset parameters of the dataset 1735, as per the arrows 1771. The selection of this particular rule is indicated also by the fact that an arrow 1778 begins from that rule. The selected rule would be associated with the identified domain. In fact, the whole set of these rules 1770 could be associated with the identified domain, while other sets (not shown) may be associated with different domains. Then the computer system 1795 would produce a resource for the dataset 1735, such as the variable resource 1779. The computer system 1795 would thus produce the resource by applying the certain digital resource rule, which was previously selected, responsive to at least one of the dataset values of the dataset parameters of the dataset 1735. In the example of FIG. 17, the resource 1779 would be produced for the dataset 1735 by the computer system 1795 applying the certain digital resource rule D_R_RULE4 1774, as indicated by the arrow 1778. The impact of the dataset 1735 in producing the resource 1779 is indicated by at least one of the arrows 1771. The resource that would be produced this way can be a document, a determination, a computational result, etc., made, created or prepared for the user 1792, and/or the primary entity 1793, and/or the secondary entity 1796, etc. As such, in some embodiments, the resource would be produced by processing and/or a computation. In some embodiments, therefore, the resource would be produced on the basis of a characterized attribute of the primary entity 1793 and/or the secondary entity 1796.

The variable resource 1779 could be produced in a number of ways. For instance, at least one of the dataset values can be a numerical base value, e.g. 26, as mentioned above. In such cases, applying the certain digital resource rule may include performing a mathematical operation on the base value B1. For example, applying the certain digital resource rule could include multiplying the numerical base value B1 with a number indicated by the certain digital resource rule. Examples of small such numbers include 0.015, 0.03, 0.05, and so on, but the numbers need not be small or only positive. Such a number can be indicated directly by the certain rule, or be stored in a place indicated by the certain rule, or by the dataset 1735, and so on.

In embodiments, a resource notification can be caused to be transmitted, e.g. via the communications network 1788, by the computer system 1795. In the example of FIG. 17, a resource notification 1736 can be caused to be transmitted by the computer system 1795, for example as an answer or other response to the received dataset 1735.

The resource notification can be about an aspect of the resource, and possibly not about the whole resource. Or, the resource notification can be about the whole resource. That is why the (variable) resource 1779 is not depicted in FIG. 17 as being entirely with the resource notification 1736. In particular, the resource notification 1736 may inform about the aspect of the resource 1779, namely that it has been determined, or where it can be found, or what it is, or a portion of its content, or a value of it, or a statistic of the value, or a rounded version of the value, and so on. Of course, the planning should be such that the recipient of the resource notification 1736 is able to parse what it is being provided, use it properly, and so on. The resource notification 1736 takes its value either from the zero value 1741, or from the (variable) resource 1779, depending on the setting of the switch 1749. As such, the resource notification 1736 carries a value for the resource regardless of how the resource was produced, i.e. whether set at zero or not.

The resource notification 1736 can be transmitted to one of an output device and another device. The output device may be the screen of a local user or a remote user. The resource notification 1736 may thus cause a desired image, message, or other such resource notification to appear on the screen, such as within a Graphical User Interface (GUI) and so on. The other device can be the remote device, from which the dataset 1735 was received, as in the example of FIG. 17. In particular, the computer system 1795 may cause the resource notification 1736 to be communicated by being encoded as a payload 1737, which is carried by a response 1787. The response 1787 may be transmitted via the communications network 1788 responsive to the received request 1784. The response 1787 may be transmitted to the computer system 1790, or to the OPF 1789, and so on. As such, the other device can be the computer system 1790, or the OPF 1789, or the screen 1791 of the user 1792, and so on. In this example the single payload 1737 encodes the entire resource notification 1736, but that is not required. Similarly with what is written above about encoding datasets in payloads, the resource notification 1736 instead may be provided via two or more payloads, or in other cases the resource notification 1736 and at least one other resource notification may be included in the same single payload. Along with the aspect of the resource 1779, it can be advantageous to embed in the payload 1737 the identity parameter (ID) and/or one or more parameters of the dataset 1735. This will help the recipient correlate the response 1787 to the request 1784, and therefore match the received aspect of the resource 1779 as the answer or other response to the appropriate dataset.

As seen above, the computer system 1790, the computer system 1795, and possibly also the OPF 1789 may exchange requests and responses. Such can be implemented with a number of different architectures. Two sample such architectures are now described with reference to the computer systems 1790 and 1795 only.

The digital resource rules 1770 include the rule D_R_RULE4 1774 that is eventually selected and applied. In some embodiments, the rules 1770 are implemented by simple rules. A simple rule has a single condition ("P"), and a single consequent ("Q"). As a result of an initial search, then, the digital resource rule D_R_RULE4 1774 is selected, and then its consequent is applied to produce the resource.

In some embodiments, the rules 1770 further include additional digital resource rules that select that digital resource rule D_R_RULE4 1774 in the first place, for ultimately applying it. In such embodiments, the rules 1770 can be implemented as simple rules or as complex rules. Complex rules may have more than one conditions, and/or more than one consequents. Complex rules may be implemented as individual single rules with complex coding. Alternatively, a complex rule may be implemented in part by more than one simpler individual rules, which can have hierarchical relationships among them, e.g. from one rule's application or execution leading to another, and so on. As a result of the initial search, then, rules are found which, when applied, select that certain rule in the first place.

A number of examples are possible for how to recognize that a certain condition of a certain digital rule is met by at least one of the values of a parameter of the dataset. For instance, the certain condition could define a boundary of a region that is within a space. The region could be geometric, and even be within a larger space. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the parameters of the dataset 1735 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

FIG. 17 also shows previously stored information 1710, which can be accessed. The previously stored information 1710 can be about previously received datasets for the primary entity 1793 that relate to the identified domain 1762. The previously stored information 1710 can be as described above for the previously stored information 1010, and can be stored as described above, and/or in the OPF 1789. The previously received datasets may have respective previous dataset values. At least some of the previous dataset values may characterize an attribute of the primary entity or the secondary entity; the attribute could be an address. At least some of the previous dataset values may characterize respective the previous dates of these datasets, and the previous dates can be within a current time period. Detailed examples of such datasets are given in FIG. 11 and FIG. 12 of this document. The previously stored information 1710 can be accessed on a number of occasions, for instance as was described for when and how the previously stored information 1010 is accessed.

FIG. 17 moreover shows that a running statistic 1705 can be computed. The running statistic 1705 may be computed from the dataset 1735 and from the previously stored information 1710 that was accessed. The running statistic 1705 may be for the primary entity 1793 and for the current time period, which is of the same time period as the dataset 1735. Sample such running statistics are described in FIG. 13 and FIG. 14 of this document.

FIG. 17 additionally shows that a prospective net gain 1775 may be estimated. The prospective net gain 1775 may be estimated when the running statistic 1705 is less than the higher-burden threshold 1713 for the identified domain 1762. The prospective net gain 1775 is what is expected to result in the current time period due to the running statistic 1705 reaching the higher-burden threshold 1713, which creates the prospect of a retroactive burden. Ways to estimate the prospective net gain are given later in this document. After the running statistic 1705 exceeds the higher-burden threshold 1713 it is too late, because the prospective net gain 1775 becomes meaningless since the retroactive burden is no longer a prospect but has vested.

FIG. 17 furthermore shows that a determination 1785 may be made. The determination can be whether or not the prospective net gain 1775 is less than a retroactive burden threshold. The determination can be made in a number of ways. One such way is to estimate the prospective net gain 1775 as a number, by reducing its components to numbers and then subtracting them. And, the retroactive burden threshold can be a number that is set to zero or a relatively small number, for comparing to the prospective net gain 1775.

FIG. 17 also shows that, if the determination 1785 results in an answer of YES then, a rare pause opportunity notification 1717 can be caused to be communicated to the remote device that sent the dataset, or to a device of the primary entity 1793 such as to their computer system 1790 that has the screen 1791, and so on. Otherwise, the rare pause opportunity notification might not be caused to be thus communicated. It will be understood that, wholly equivalently, this operation could be set up to take place if the determination 1785 results in an answer of NO instead YES, depending on how the relationship between the prospective net gain and the retroactive burden threshold is set up.

The rare pause opportunity notification 1717 can be about issuing computer commands from the remote device to prevent activity that generates and sends datasets with dataset parameters that have dataset values characterizing the attribute of the certain entity and a date that is within the current time period. Upon receipt of the rare pause opportunity notification 1717, the user 1792 may decide whether to act upon the advice of the notification 1717 and pause the generation of the datasets until after the current time period passes. To act, the user 1792 may issue such computer commands to any functionality that controls the activity which generates and sends datasets, such as to the OPF 1789. As a result, the running statistic 1705 will not reach the higher-burden threshold 1713.

Examples are now given as to how the prospective net gain 1775 may be estimated.

Figure 18:
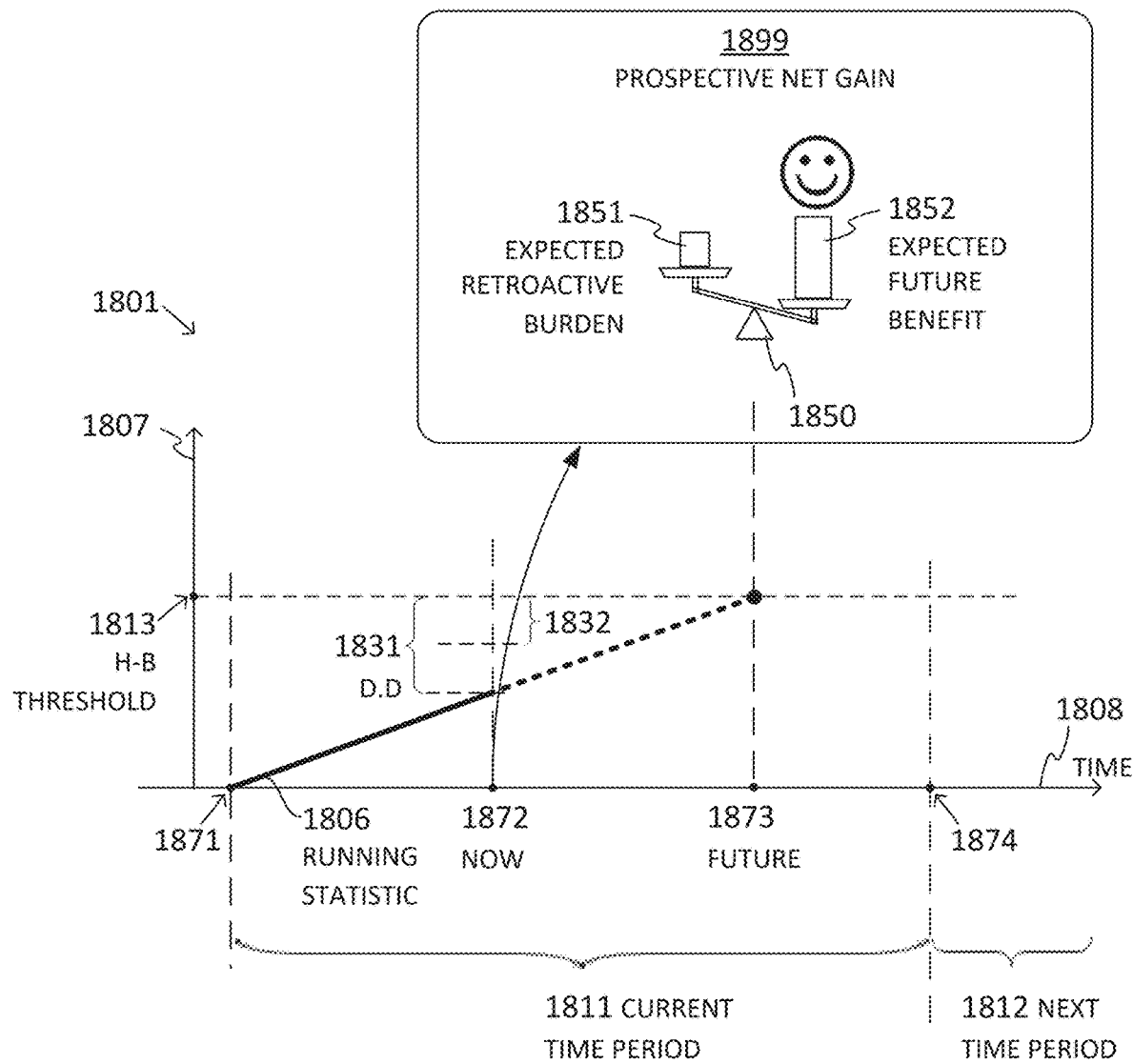
FIG. 18 shows a timing diagram for a first scenario that may result from the embodiments of FIG. 17, where a prospective net gain is desirable.

FIG. 18 shows a timing diagram 1801 for a first scenario of estimating the prospective net gain of FIG. 17. The timing diagram 1801 has a vertical axis 1807 and a horizontal time axis 1808. The vertical axis 1807 has an intercept for the higher-burden threshold 1813 for the identified domain.

The time axis 1808 has an intercept at a time 1871, for when a current time period 1811 begins. It also has a time intercept at a time 1872 for a present time that is designated as "NOW" and is within the current time period 1811. It also has an intercept at a time 1874 for when the current time period 1811 will end, and the next time period 1812 will begin.

The timing diagram 1801 also shows the time evolution of a running statistic 1806, using the macro view of FIG. 14. At the time 1871, the running statistic 1806 starts at zero. At the time 1872, which is the current or present or now, the running statistic 1806 has a non-zero value that is less than the higher-burden threshold 1813.

At the current time 1872, it is not known whether or not the running statistic 1806 will reach the higher-burden threshold 1813 before the current time period 1811 is expected to end, i.e. before the time 1874. Accordingly, a projection is made. The projection is made, in this example, by a linear extrapolation of the running statistic 1806 until it reaches the higher-burden threshold 1813. Such projections may use other known data, for instance slopes from running statistics from other domains for otherwise similar datasets, and so on.

In the timing diagram 1801, it is discovered from the extrapolation that the running statistic 1806 is expected to reach the higher-burden threshold 1813 at a time 1873 in the future. It is observed that the time 1873 occurs before the time 1874, and therefore within the current time period 1811.

Then, at the present time 1872, a prospective net gain 1899 is estimated for the future time 1873. The prospective net gain 1899 is what is expected to result within the current time period due to the running statistic 1806 reaching the higher-burden threshold 1813.

There are different embodiments for estimating the prospective net gain. In some embodiments, the prospective net gain is determined by weighing—metaphorically speaking—the expected benefits against the expected burdens when the running statistic reaches the higher-burden threshold. This weighing is shown in FIG. 18 with a scale 1850 that weighs an expected future benefit 1852 against an expected retroactive burden 1851. Briefly, and in this example, the larger expected future benefit 1852 outweighs the expected retroactive burden 1851, and so the prospective net gain 1899 is positive, which is also indicated by a smiling emoji.

In some of these embodiments, optional additional operations include a) estimating, by the computer system, an expected future benefit that is thus expected to result within the current time period, and b) estimating, by the computer system, an expected retroactive burden that is thus expected to result within the current time period. These estimations may be implemented so as to produce simple numbers. In such embodiments, the prospective net gain can be estimated from a difference of the expected future benefit and the expected retroactive burden. In other words, the prospective net gain may be estimated by subtraction. Examples are now described.

Figure 19:
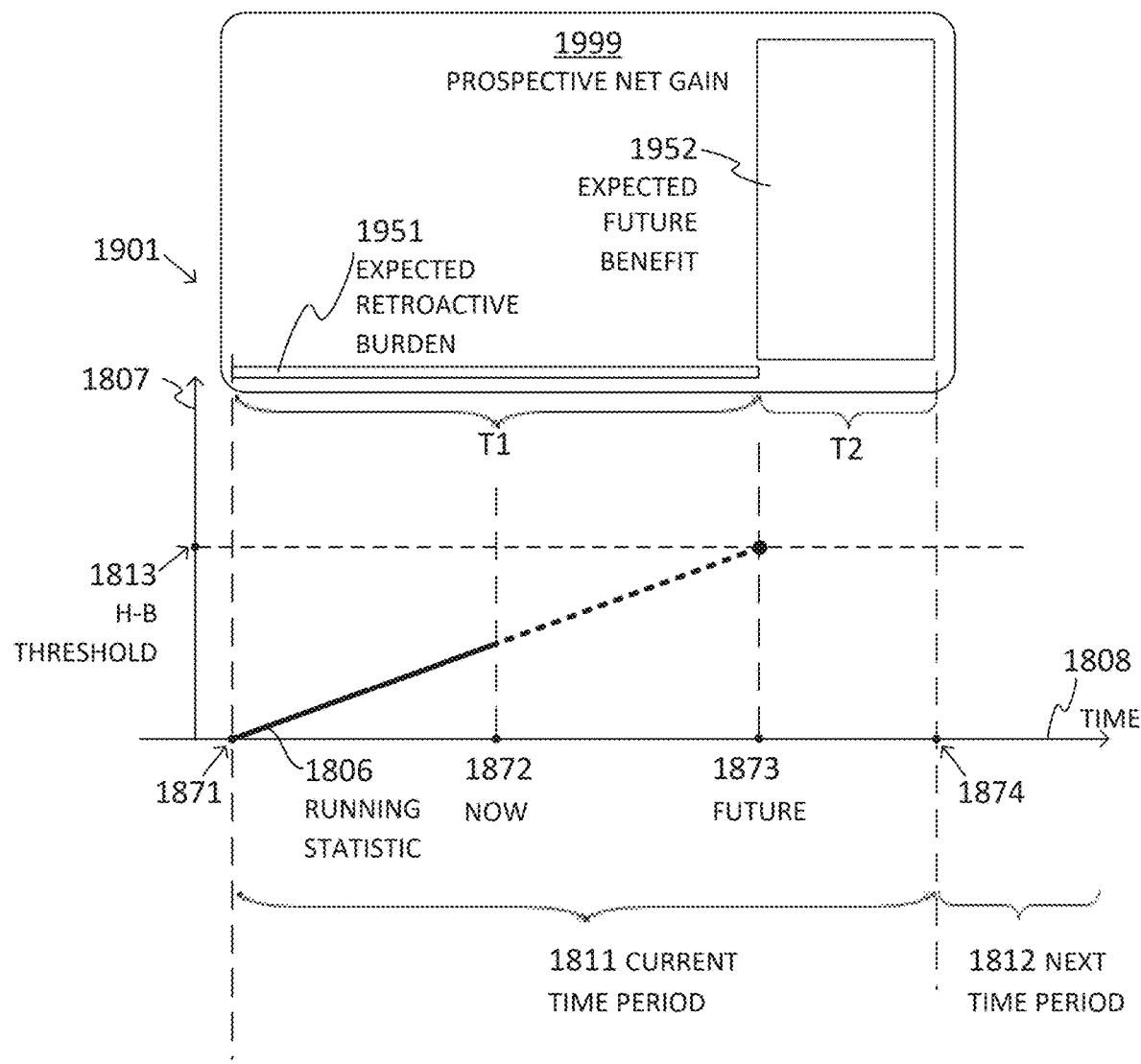
FIG. 19 repeats aspects of FIG. 18, and further shows representative components for a sample estimation of a prospective net gain, according to embodiments.

FIG. 19 is a timing diagram 1901, which repeats many aspects of the timing diagram 1801 of FIG. 18. FIG. 19 further shows representative components for a sample estimation of a prospective net gain 1999. These components include an expected retroactive burden 1951 and an expected future benefit 1952. These components are shown as rectangles, whose areas are to be compared.

In some embodiments, the expected retroactive burden 1951 actually starts at zero at the time 1871, and remains zero until the future time 1873. After that future time 1873, however, the expected retroactive burden 1951 becomes retroactive, as if it were always due. In such embodiments, the expected retroactive burden can be estimated from how much time is projected to have passed in the current time period, when the running statistic reaches the higher-burden threshold. In the example of FIG. 19, the expected retroactive burden 1951 is estimated as the area of the rectangle, from a first multiple times how much time has passed within the current time period. The first multiple is the height of the rectangle, and it could be small. The time that will have passed is the width of the rectangle, and is the duration between the time 1871 and the time 1873. The time that has passed is a proxy for how many datasets have been received so far, or the sum of their base values, and so on. Of course, there are other, more accurate ways for these estimations to be exact, but this representation is given for explaining this at a high level.

The width of the expected retroactive burden 1951 corresponds to the time that has passed, and is longer, the later time 1873 occurs. The question, then, becomes whether the expected retroactive burden 1951 can be outweighed by the expected future benefit 1952, occurring after the future time 1873 and before the time 1874.

In some embodiments, the expected future benefit is estimated from how much time is projected to be left in the current time period, when the running statistic reaches the higher-burden threshold. In the example of FIG. 19, the expected future benefit 1952 is estimated as the area of the rectangle, from a second multiple times how much time will be left in the current time period. The second multiple is the height of the rectangle, and it can be substantially larger than the first multiple. The time that is left in the current time period is the width of the rectangle, and is the duration between the time 1873 and the time 1874. The time that is left is a proxy for how many datasets are expected to be received in that time, or the sum of their base values, and so on. The later the time 1873 occurs within the current time period, the lesser the expected future benefit 1952 is.

As a result, in the scenario of FIG. 18 and FIG. 19, the prospective net gain is positive. Additional scenarios are now described.

Figure 20:
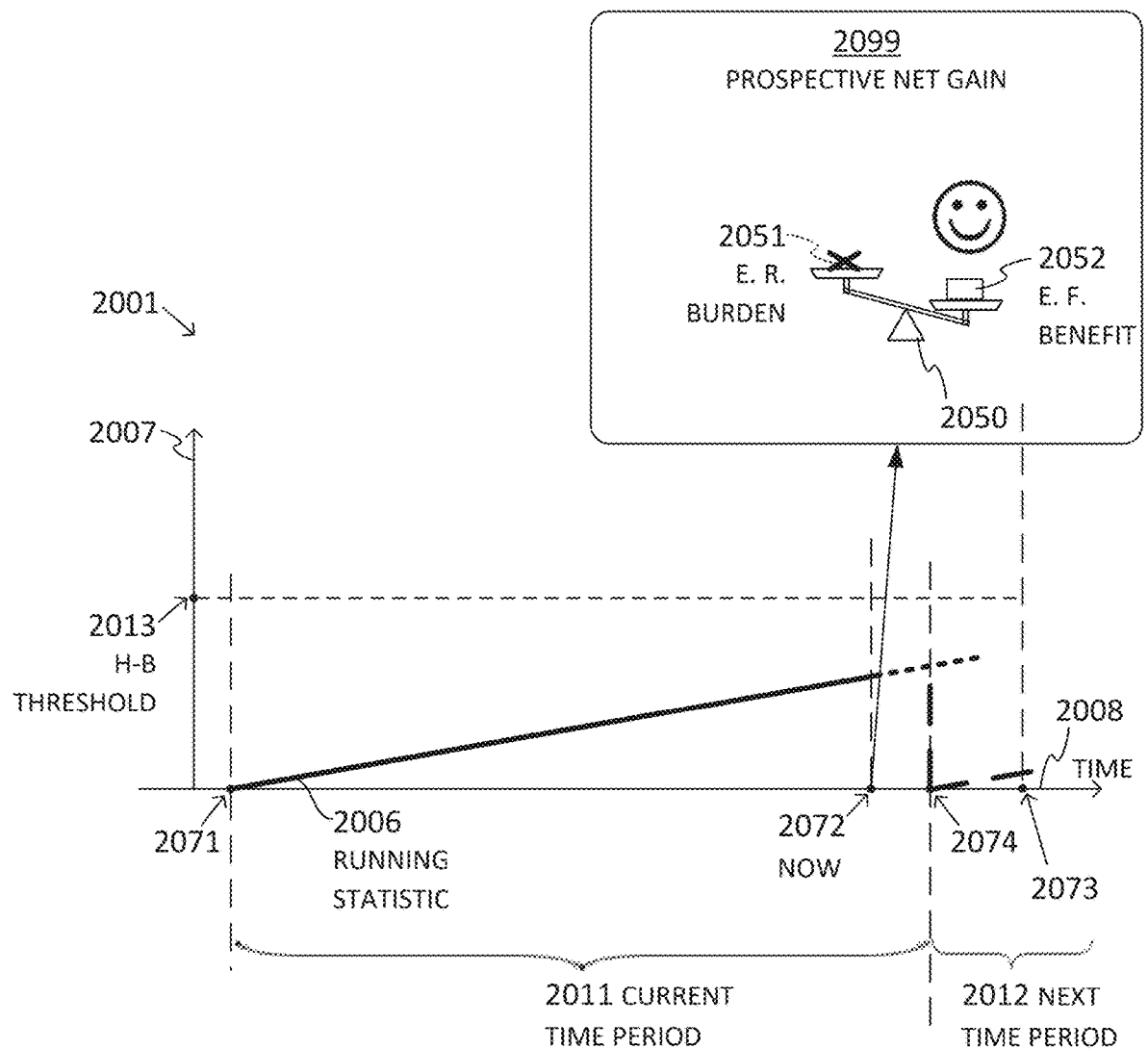
FIG. 20 shows a timing diagram for a second scenario that may result from the embodiments of FIG. 17, where a prospective net gain is desirable.

FIG. 20 shows a timing diagram 2001 for a second scenario of estimating the prospective net gain of FIG. 17. The timing diagram 2001 is similar to the timing diagram 1801 of FIG. 18. In particular, the timing diagram 2001 has a vertical axis 2007 with an intercept for the higher-burden threshold 2013 for the identified domain. The timing diagram 2001 also has a horizontal time axis 2008 with intercepts at times 2071, 2074 for a current time period 2011, which is followed by a next time period 2012.

The timing diagram 2001 shows a plot of the time evolution of a running statistic 2006, which has a substantially lesser slope than the running statistic 1806. A now time 2072 is later in the current time period that the now time 1872. At the now time 1872, the plot is extrapolated, and it is observed that *the present line* of the running statistic 2006 is projected to reach the higher-burden threshold 2013 after the current time period 2011, perhaps at a future time 2073. But it is meaningless to work with that projection, because it is known that the running statistic 2006 will be re-initialized at zero when the next time period 2012 begins at the time 2074.

Then, at the present time 2072, a prospective net gain 2099 is estimated for the future time 2073. The estimation is shown by a scale 2050. Since the higher-burden threshold 2013 will not be reached during the current time period 2011, there will be no expected retroactive burden 2051 within the current time period 2011, which is why it is shown crossed-out. In fact, that is why the prospective net gain is considered only for the current time period. The expected future benefit 2052 is small because little time is left in the current time period 2011, but even that is outweighed by nothing. Therefore, the prospective net gain 2099 is positive, which is also indicated by a smiling emoji.

Figure 21:
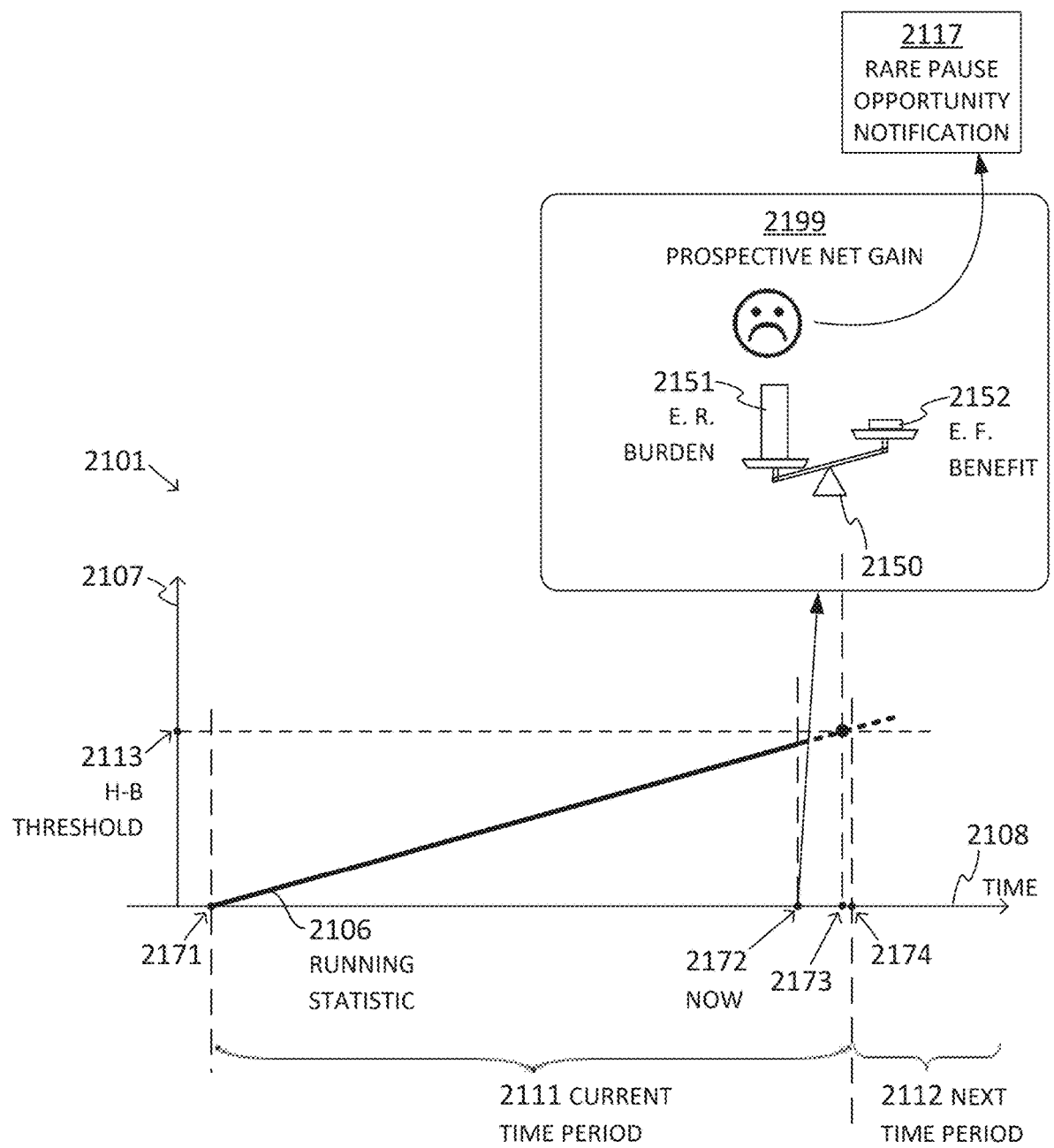
FIG. 21 shows a timing diagram for a third scenario that may result from the embodiments of FIG. 17, where a prospective net gain is not desirable, and a rare pause opportunity notification can be caused to be transmitted.

FIG. 21 shows a timing diagram 2101 for a third scenario of estimating the prospective net gain of FIG. 17. The timing diagram 2101 is similar to the timing diagram 1801 of FIG. 18. In particular, the timing diagram 2101 has a vertical axis 2107 with an intercept for the higher-burden threshold 2113 for the identified domain. The timing diagram 2101 also has a horizontal time axis 2108 with intercepts at times 2171, 2174 for a current time period 2111, which is followed by a next time period 2112.

The timing diagram 2101 shows a plot of the time evolution of a running statistic 2106, which has a slope between the slopes of the running statistics 1806 and 2006.

At a now time 2172, the plot is extrapolated, and it is observed that the running statistic 2106 is projected to reach the higher-burden threshold 2113 at a future time 2173, which is very late within the current time period 2111.

Then, at the present time 2172, a prospective net gain 2199 is estimated for the future time 2173. The estimation is shown by a scale 2150. An expected retroactive burden 2151 is high, because it integrates almost the entire current time period 2111. An expected future benefit 2152 is small, because little time is left in the current time period 2111. Therefore, the prospective net gain 2199 is negative, which is also indicated by an unhappy emoji. As such, a rare pause opportunity notification 2117 can be caused to be transmitted.

An additional aspect of this rare occurrence is how little time there is to react. That time is from the now time 2172 until before the future time 2173, and potentially even less because the future time 2173 is only an estimate, a projection, and may actually come sooner. A human user, left to their own devices and without the computation and the rare pause opportunity notification 2117 by a computer, might never catch this in time, and may become saddled with the expected retroactive burden 2151.

Figure 22:
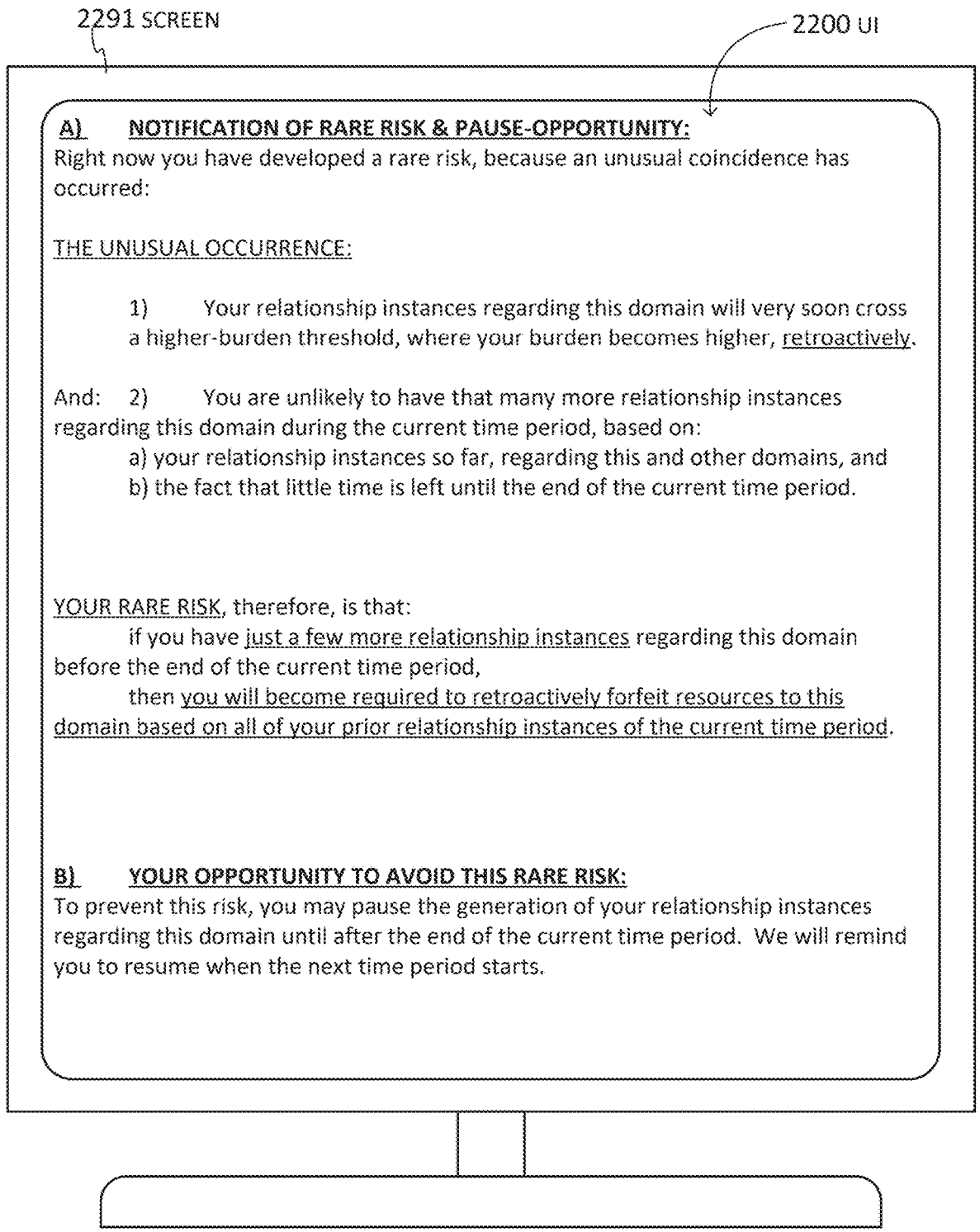
FIG. 22 is a sample view of a User Interface (UI) that communicates a rare pause opportunity notification in a scenario such as that of FIG. 21, according to an embodiment.

FIG. 22 is a sample view of a User Interface (UI) 2200, shown on a screen 2291. The UI 2200 describes a sample notification of a rare risk, which supplies words to what was illustrated by the outcome of the scale 2150. The UI 2200 also describes a pause opportunity to avoid the risk. The pause opportunity is the opportunity of the primary entity to stop the activity that generates datasets until after the end of the current period. This way, the unfavorable prospective net gain 2199 can be avoided. An example is now described.

Figure 23:
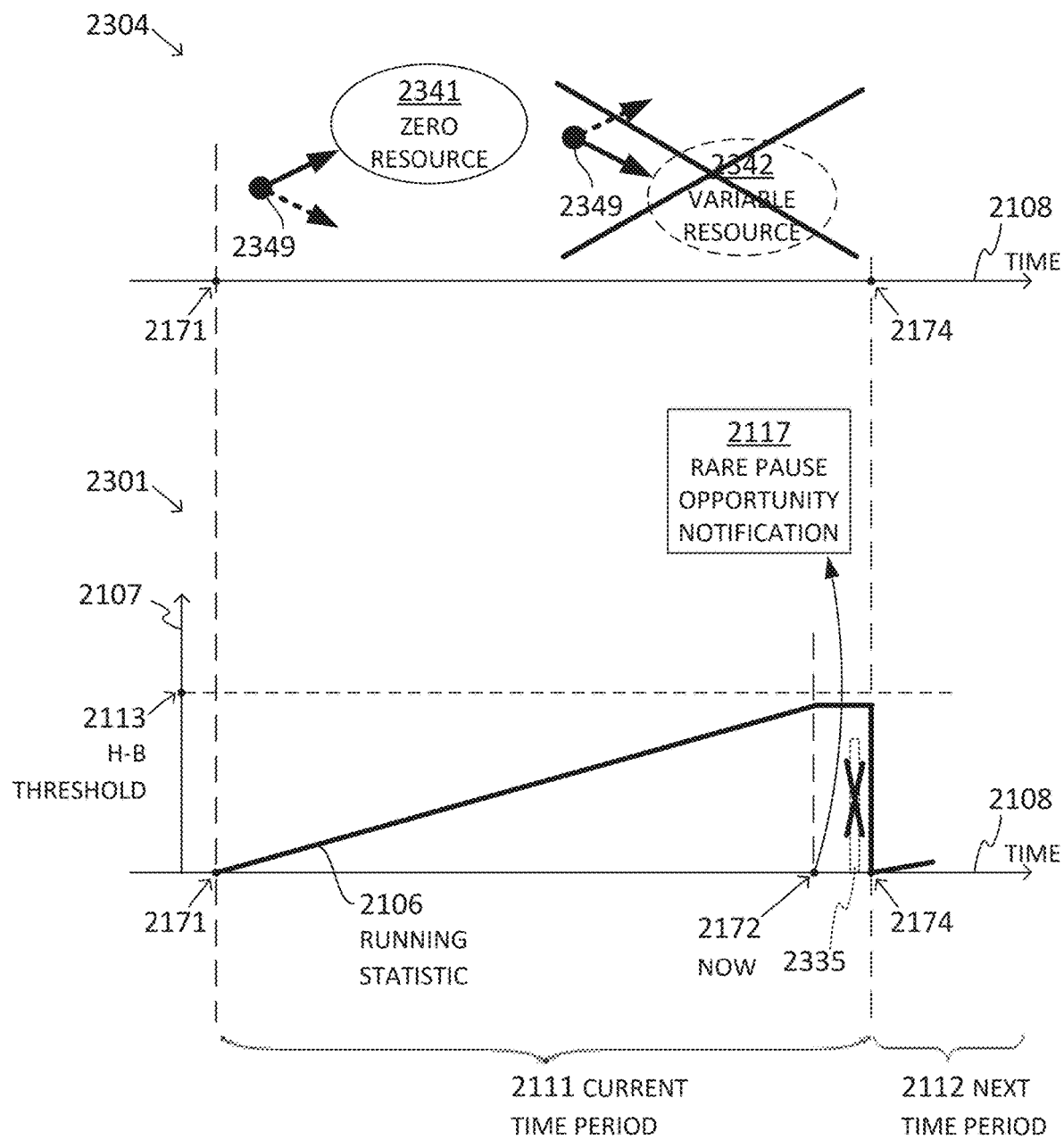
FIG. 23 has a timing diagram that shows how the running statistic of FIG. 21 could evolve, if the rare pause opportunity notification is acted upon and the higher-burden threshold is thus not reached within the current time period, according to embodiments.

FIG. 23 shows a timing diagram 2301, which repeats many aspects of the timing diagram 2101 of FIG. 21, where the rare pause opportunity notification 2117 has been given, and acted upon. Then, shortly after the time 2172, datasets stop being received until the time 2174, which is the end of the current time period 2111. In fact a sample dataset 2335 is shown when it would have been received, but it is crossed out—it has been sacrificed to avoid a relatively high retroactive burden.

Shortly after the time 2172, the running statistic 2106 continues as a horizontal line, and therefore remains under the higher-burden threshold 2113. As such, the higher-burden threshold 2113 is never reached within the current time period 2111. Then, at the time 2174, the running statistic 2106 returns to zero for the next time period 2112.

FIG. 23 also shows a timing diagram 2304, which is meant to be contrasted with the timing diagram 1504 of FIG. 15.

The timing diagram 2304 repeats the horizontal time axis 2108 of the timing diagram 2301. The timing diagram 2304 shows a time evolution of how an internal process is set up, according to a switch 2349. The internal process can be the same as the internal process 1740 described with reference to FIG. 17.

At the beginning time 2171, the internal process is set up to produce, for datasets relating to the domain, a resource having a zero value 2341. Since the higher-burden threshold 2113 was never reached, the internal process is not changed during the current time period 2111. The internal process does not become changed later to be set up to produce, for datasets relating to the domain, a resource having a variable value 2342. This lack of change is indicated in FIG. 23 by such the changed switch 2349 and the variable value 2342 being crossed out.

The prospective net gain 1899, 2099, 2199 may be estimated on a number of occasions. In some embodiments, the prospective net gain is estimated responsive to producing the resource. There may be a high cost of calculations, however.

In some embodiments, the prospective net gain is estimated only after a certain portion of the current time period has passed. The certain portion can be, for instance, the half-way point of the three-quarter way point of the time period. That is on the theory that prospective net gain would be very positive for times before that.

In some embodiments, the prospective net gain is estimated only after the running statistic reaches a threshold fraction of the higher-burden threshold. For instance, the threshold fraction can be 80% or 90% of the higher-burden threshold. In some instances, the running statistic may be known anyway for knowing when to provide the higher-burden notification 1014.

Referring back to FIG. 18, in some embodiments, computer operations further include computing a diminishing difference between the running statistic and the higher-burden threshold. A sample diminishing difference 1831 is indicated, although this operation would likely be performed later in the current time period 1811 than is suggested by the fast slope of the running statistic 1806. Such computer operations could further include determining whether or not the diminishing difference is within a margin threshold. A sample margin threshold 1832 is indicated. In such embodiments, the prospective net gain is estimated responsive to the diminishing difference being within the margin threshold.

Figure 24:
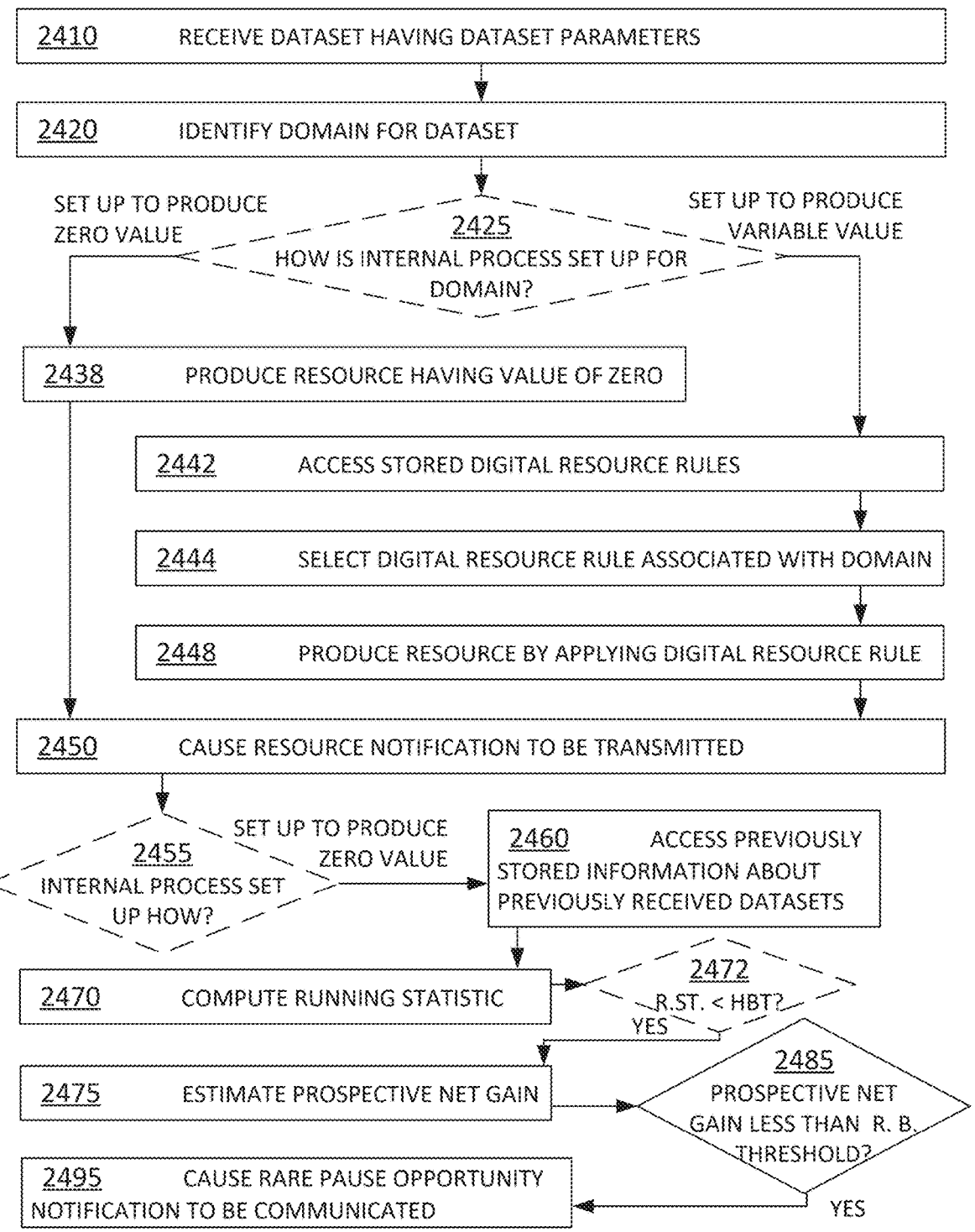
FIG. 24 is a flowchart for illustrating sample methods according to embodiments, which are improvements in automated computerized systems.

FIG. 24 shows a flowchart 2400 for describing methods according to embodiments. In embodiments, many of the individual operations of the flowchart 2400 are similar to operations of the flowchart 1600 of FIG. 16.

According to an operation 2410, a dataset may be received. A sample such dataset is the dataset 1735. The received dataset may have dataset parameters of a relationship instance between a primary entity and a secondary entity, such as the relationship instance 1797 between the primary entity 1793 and the secondary entity 1796. At least some of the dataset parameters have respective dataset values. At least one of the dataset values may characterize an attribute of the secondary entity. At least one of the dataset values may characterize a date of the relationship instance, and the date may be within a current time period.

According to another operation 2420, a domain may be identified from the characterized attribute of the secondary entity. The domain may be identified for the dataset. The domain may be identified out of a plurality of domains. For example, this can be as described for FIG. 17, where the domain 1762 is identified out of the plurality of domain names 1760.

According to an optional decision operation 2425, it may be detected how an internal process, such as the internal process 1740, is set up to produce resources for datasets associated with the identified domain. The decision operation 2425 may be performed as a lookup of a flag, or an established logical path, and so on. The decision operation 2425 is characterized here as optional, in that it need not be performed explicitly. What can be performed explicitly is the subsequent production of a resource according to how the internal process 1740 is set up, per the below.

According to another operation 2438, a resource having a value of zero may be produced for the dataset, responsive to an internal process for the identified domain being set up to produce a resource having a zero value. Such an internal process is, for example, the internal process 1740.

Else, responsive to the internal process being set up to produce for the dataset in the identified domain a resource having a variable value, according to another operation 2442, stored digital resource rules may be accessed. This does not happen in the example of FIG. 17. Nevertheless, if it were to happen, the stored digital resource rules 1770 could be accessed. Then, according to another operation 2444, a certain one of the accessed digital resource rules could be selected responsive to one or more of the dataset values. The selected digital resource rule could be associated with the identified domain. Then, according to another operation 2448, a resource for the dataset could be produced by the computer system applying the certain digital resource rule to at least one of the dataset values, as indicated for the (variable) resource 1779.

Regardless of whether the resource was produced by the operation 2438 or by the operations 2442, 2444, 2448 then, according to another operation 2450, a resource notification can be caused to be transmitted to one of an output device and another device. In some embodiments, the output device or the other device is a computer of the primary entity 1793, such as the computer system 1790. In some embodiments, the output device or the other device is a computer working on behalf of the primary entity, such as a computer in the OPF 1789, and so on. The resource notification can be generated as described for the resource notification 1736. The resource notification can be about an aspect of the produced resource.

According to another optional decision operation 2455, it may be detected how the internal process is set up to produce a resource for a dataset in the identified domain. This operation 2455 is similar to the operation 1655, and may be performed similarly or differently, depending on context. The operation 2455 may be initiated similarly to how accessing the previously stored information 1710 was initiated, or by a user, by a calendar operation, by another condition being met, and so on.

If at the operation 2455 it is detected that the internal process is set up for datasets in the identified domain to produce a resource for the dataset having a zero value, then execution may proceed to another operation 2460. Else, after the operation 2455, execution may proceed to another operation, within or outside the flowchart 2400.

According to the operation 2460, previously stored information may be accessed. This previously stored information can be as described for the previously stored information 1710.

According to another operation 2470, a running statistic may be computed. Examples are the running statistics 1005, 1305A, 1305B, 1705, 1806, 2006, 2106.

According to another optional decision operation 2472, it may be determined whether the running statistic of the operation 2470 is less than a higher-burden threshold for the identified domain. Examples are the higher-burden thresholds 1013, 1313A, 1313B, 1513, 1713, 1813, 2013, 2113.

If at the operation 2472 it is detected that the running statistic is indeed less than a higher-burden threshold then execution may proceed to another operation 2475. Else, after the operation 2472, execution may proceed to another operation, within or outside the flowchart 2400.

According to the operation 2475, a prospective net gain may be estimated. The prospective net gain, for instance the prospective net gain 1775, is one that may result within the current time period due to the running statistic reaching the higher-burden threshold. Sample scenarios were given in FIGS. 18-21.

According to another operation 2485, it may be determined whether or not the prospective net gain is less than a retroactive burden threshold. If the answer is YES, then according to another operation 2495, a rare pause opportunity notification can be caused to be communicated to a device of the primary entity, such as the computer system 1790. Previously are described sample rare pause opportunity notifications 1717, 2117, and in FIG. 22. Otherwise, execution may return to another operation, such as waiting for another dataset, or waiting for a certain time instance within the current time period, when the operation 2475 would be repeated within the current time period. More accurate and actionable results could be expected at the time. Where the estimation is repeated, computer operations may further include a) estimating again, by the computer system and when the running statistic is less than a higher-burden threshold for the identified domain, an updated prospective net gain that is expected to result within the current time period due to the running statistic reaching the higher-burden threshold, b) determining again whether or not the updated prospective net gain is less than the retroactive burden threshold, and c) causing, responsive to determining that the updated prospective net gain is less than the retroactive burden threshold, the rare pause opportunity notification to be thus communicated.

In some embodiments, a resume notification can be caused to be communicated about the domain to a device of the primary entity, responsive to the current time period passing. The resume notification can be about reversing the pause, namely it can be about issuing computer commands from the remote device to resume activity that generates and sends datasets with dataset parameters that have dataset values characterizing the attribute of the certain entity.

Details about Computer Systems

FIG. 25 is a block diagram showing more details of a computer 112 of an example primary entity 119 of FIG. 1, with reference to the communication network 194 and the software service platform 140, according to various embodiments of the present disclosure. It will be recognized that similar components are described for the computer system 1795.

FIG. 25 shows primary entity 119 of FIG. 1, along with more sample details for computer 112. Computer 112 may be a desktop computer, a laptop computer, a tablet computer, a mobile phone, and so on.

Computer 112 includes a processor 2514. Computer 112 also includes a system bus 2532 that is coupled to processor 2514. System bus 2532 can be used by processor 2514 to control and/or communicate with other components of computer 112.

Computer 112 additionally includes a network interface 2534 that is coupled to system bus 2532. Network interface 2534 can be implemented by a hardware network interface, such as a network interface card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on. Network interface 2534 can access network 194.

Also shown is an optional domain rules compliance client 2582. Domain rules compliance client 2582 is optional in that it need not be provided; indeed, in some embodiments nothing is originated from computer 112, and all checking and any resulting notifications are originated by platform 140. In this embodiment, domain rules compliance client 2582 resides in system memory 2548, which may comprise computer-executable instructions executed by processor 2514 to invoke or otherwise obtain services of the software service platform 140 provided by the service engine 142 running on server computer 141 of the software service platform 140. For example, the domain rules compliance client 2582 may obtain and/or invoke the software service platform 140 to generate and/or transmit domain rules compliance data 180. In some embodiments, the domain rules compliance client 2582 may generate a user interface for and/or provide access to an account associated with the primary entity 119 through which the domain rules compliance data 180 for the primary entity 119 may be accessible by the primary entity 119 via the computer 112. For example, updated information regarding the potential lack of domain rules compliance of the primary entity 119 may be displayed via the domain rules compliance client 2582 on a user interface associated with the account and/or the domain rules compliance client 2582. The domain rules compliance client 2582 may, in various embodiments, be part of or integrated with the browser 2581. In other embodiments, the browser 2581 may be or perform the operations of the domain rules compliance client 2582, for example, when the software service platform 140 provides web-based services.

In some embodiments where it is indeed provided, the domain rules compliance client 2582 may communicate and/or obtain services of ERP applications (e.g., ERP system 121), accounting applications, ecommerce applications and/or other applications remote from or resident on the computer 112. For example, the domain rules compliance client 2582 may cause ERP system 121 to transmit a request or other information to the software service platform 140 that invokes services of the software service platform 140 to be provided to the domain rules compliance client 2582 and/or ERP system 121. For example, such information may include information indicative of one or more various conditions being satisfied, including, but not limited to, one or more of: a detected change or update to stored digital rules about thresholds in a certain domain; a detected change or update to a base amount of relationship instance data of the primary entity 119 that are associated with a certain domain; a detected change or update to a number of relationship instances of the primary entity 119 that are associated with a certain domain; that one or more thresholds are being met or being exceeded, for instance within a predetermined threshold for being so met or exceeded; and conditions indicated by stored preferences of primary entity 119 and conditions indicated by stored preferences of primary entity 119. As another example, the domain rules compliance client 2582 may request, or cause ERP system 121 to request, relationship instance data regarding relationship instance data of the primary entity 119 from the ERP system 121, accounting applications, ecommerce applications and/or other applications for purposes of transmitting such relationship instance data to the software service platform 140, such that the software service platform 140 can use such data to determine potential lack of domain rules compliance in various domains for the primary entity 119. In yet other embodiments, ERP system 121 originates transmitting a request or transmitting of other information on behalf of primary entity 119.

Computer 112 further includes a video adapter 2511, which is also coupled to system bus 2532. Video adapter 2511 may be able to drive and/or support a screen 2521 that is used by user 192 together with computer 112.

In addition to screen 2521, other peripheral input/output (I/O) devices that may be used together with computer 112 include a keyboard 2522, a mouse 2523, a media tray 2524 and a printer 2525. Media tray 2524 may include storage devices such as CD-ROM drives, multi-media interfaces, and so on. Computer 112 moreover includes an I/O interface 2528 connected to these peripheral I/O devices as shown, for the purpose of communicating with them. In this example these connections are direct. Alternately, one or more of these connections may take place via universal serial bus (USB) ports 2529 of computer 112, to which I/O interface 2528 is also connected.

Computer 112 moreover includes a bus bridge 2516 coupled to system bus 2532, and an input/output (I/O) bus 2536. I/O bus 2536 is coupled to bus bridge 2516 and to I/O interface 2528.

Computer 112 also includes various memory components. A non-volatile memory component is a hard drive 2544. Computer 112 further includes a hard drive interface 2542 that is coupled to hard drive 2544 and system bus 2532.

Additional memory components are in a system memory 2548, which is also coupled to system bus 2532. System memory includes volatile memory including, but not limited to, cache memory, registers and buffers. In embodiments, data from hard drive 2544 populates registers of the volatile memory of system memory 2548.

Sample system memory 2548 has a software architecture that uses a stack of layers, with each layer providing a particular functionality. In this example the layers include—starting from the bottom—an operating system (OS) 2550, libraries 2560, frameworks/middleware 2570 and application programs 2580. Other software architectures may include less, more or different layers. For example, a presentation layer may also be included. For another example, some mobile or special purpose operating systems may not provide a frameworks/middleware 2570.

OS 2550 may manage hardware resources and provide common services. Libraries 2560 provide a common infrastructure that is used by applications 2580 and/or other components and/or layers. Libraries 2560 provide functionality that allows other software components to perform tasks in an easier fashion than to interface directly with the specific underlying functionality of OS 2550. Libraries 2560 may include system libraries 2561, such as a C standard library. System libraries 2561 may provide functions such as memory allocation functions, string manipulation functions, mathematical functions, and the like.

In addition, libraries 2560 may include API libraries 2562 and other libraries 2563. API libraries 2562 may include media libraries, such as libraries to support presentation and manipulation of various media formats such as MPREG4, H.264, MP3, AAC, AMR, JPG, and PNG. API libraries 2562 may also include graphics libraries, for instance an OpenGL framework that may be used to render 2D and 3D in a graphic content on screen 2521. API libraries 2562 may further include database libraries, for instance SQLite, which may support various relational database functions. API libraries 2562 may additionally include web libraries, for instance WebKit, which may support web browsing functionality.

Frameworks/middleware 2570 may provide a higher-level common infrastructure that may be used by applications 2580 and/or other software components/modules. For example, frameworks/middleware 2570 may provide various graphic user interface (GUI) functions, high-level resource management, high-level location services, and so forth. Frameworks/middleware 2570 may provide a broad spectrum of other APIs that may be used by applications 2580 and/or other software components/modules, some of which may be specific to OS 2550 or to a platform.

Application programs 2580 are also known more simply as applications and apps. One such app is a browser 2581. Browser 2581 is an example of a renderer, which includes program modules and instructions that enable computer 112, to exchange network messages with network 194 using hypertext transfer protocol (HTTP) messaging.

Other such applications 2580 may include a contacts application, a book reader application, a location application, a media application, a messaging application, and so on. Applications 2580 may be developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. Applications 2580 may use built-in functions of OS 2550, libraries 2560, and frameworks/middleware 2570 to create user interfaces for user 192 to interact with.

The hardware elements depicted in computer 112 are not intended to be exhaustive. Rather, they are representative, for highlighting essential components that can be used with embodiments.

Instructions for performing any of the methods or functions described herein may be stored, completely or partially, within the memory components of server computer 141, computer 112, etc. These memory components include the indicated memory components, plus cache memory within the processors such as processor 2514. Accordingly, these memory components are examples of machine-readable media.

In this context, "machine-readable medium" or "computer-readable medium" refers to a component, device or other tangible media able to store instructions and data temporarily or permanently and may include, but is not limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing.

The term "machine-readable medium" or "computer-readable medium" should be taken to include a single medium or multiple media (e.g., a centralized or distributed database, or associated caches and servers) able to store instructions that a machine such as a processor can store, erase, or read and execute. The term "machine-readable medium" or "computer-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Processor 2514, as well as the processor of server computer 141, is a physical circuit that manipulates physical quantities representing data values. The manipulation can be according to control signals, which can be known as commands, op codes, machine code, etc. The manipulation can produce corresponding output signals that are applied to operate a machine. As such, a processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

Much of what is described for the computer 112 is also applicable for the computer system 1795, the server computer 141, the computer systems in online service platform 240, and the computer system 1795. In all such cases, a computer system includes at least one or more processors and a non-transitory computer-readable storage medium. The medium has stored thereon instructions which, when executed by the one or more processors, are designed to result in the operations described for the computer systems. In embodiments, the medium is configured to store instructions which, when executed by the one or more processors of the computer system, are programmed to cause the computer system to perform the operations described.

A hardware component such as a processor may also include programmable logic or circuitry that is temporarily configured by software to perform certain operations. For example, a hardware component may include software executed by a general-purpose processor or other programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources.

These and other variations, modifications, additions, and improvements fall within a scope of embodiments of the present disclosure as represented by the appended claims. The specification and drawings are, accordingly, to be regarded in an illustrative rather than a restrictive sense.

OPERATIONAL EXAMPLES—USE CASES

The above-mentioned embodiments have one or more uses. Aspects presented below may be implemented as was described above for similar aspects. It will be recognized that drawings are used for the use cases that are similar to the previously described drawings. In fact, elements described in the previously described drawings are now shown replaced by their respective use cases elements. Even more, but not all of these aspects even have reference numerals that are similar to the above, for ease of explanation.

Figure 26:
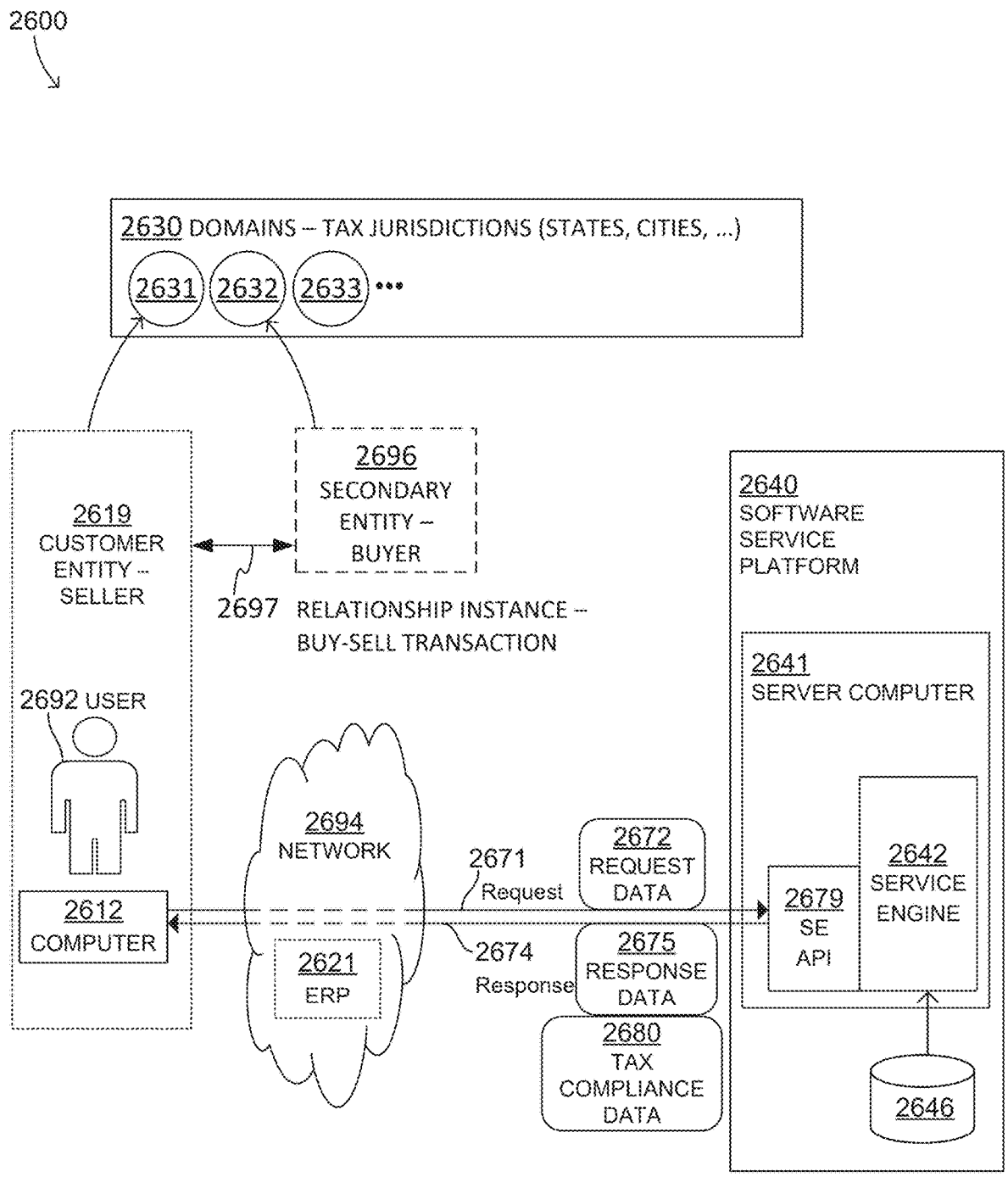
FIG. 26 is a block diagram showing an example configuration of a system, in a use case of the first embodiments of the present disclosure.

Referring to FIG. 26, when businesses make, sell, or buy goods, they are required by law to compute the amounts of money they must remit as taxes to various tax jurisdictions, and then remit these amounts to the tax jurisdictions. If they fail to accurately report and remit taxes, they may be subject to audits and fines—and ignorance of the law is not an excuse.

Businesses generally collect information relating to their operations, such as by using enterprise resource planning ("ERP") software applications and accounting applications. ERP applications manage information relating to a business's activities, such as sales, resource management, production, inventory management, delivery, billing, and so on. Accounting applications manage a business's accounting information, such as purchase orders, sales invoices, payroll, accounts payable, accounts receivable, and so on. ERP applications, accounting applications, ecommerce applications and other conventionally used applications fail to provide accurate, reliable per-jurisdiction tax compliance information in a timely and efficient manner according to the various different rules in various different tax jurisdictions. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities-if the seller cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome for the amounts of money involved. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes can be considered trust-fund taxes, meaning that the management of a company may be held personally liable for the unpaid sales tax.

To solve the above technical problems, disclosed herein is a method comprising: updating, by a computer system, stored rules for a certain one of a plurality of tax jurisdictions, the stored rules being about establishing nexus for purposes of remitting transaction tax in the certain tax jurisdiction; comparing, by the computer system, stored information about goods or services sold by an entity in the certain tax jurisdiction against the updated stored rules for the certain tax jurisdiction; generating, by the computer system, information regarding potential lack of tax compliance of the entity for the certain tax jurisdiction based on the comparison; and transmitting, by the computer system over a network, to a client computing device associated with the entity, a notification about the generation of the information.

Also, disclosed herein is a system comprising at least one processor and a memory coupled to the at least one processor. The memory stores instructions that, when executed by the at least one processor, cause the system to perform operations comprising: updating, by a computer system, stored rules for a certain one of a plurality of tax jurisdictions, the stored rules being about establishing nexus for purposes of remitting transaction tax in the certain tax jurisdiction; comparing, by the computer system, stored information about goods or services sold by an entity in the certain tax jurisdiction against the updated stored rules for the certain tax jurisdiction; generating, by the computer system, information regarding potential lack of tax compliance of the entity for the certain tax jurisdiction based on the comparison; and transmitting, by the computer system, to a client computing device associated with the entity over a network a notification about the generation of the information.

Also disclosed herein is a non-transitory computer-readable storage medium having computer-executable instructions stored thereon that, when executed by at least one processor, cause the at least one processor to perform operations comprising: updating, by a computer system, stored rules for a certain one of a plurality of tax jurisdictions, the stored rules being about establishing nexus for purposes of remitting transaction tax in the certain tax jurisdiction; comparing, by the computer system, stored information about goods or services sold by an entity in the certain tax jurisdiction against the updated stored rules for the certain tax jurisdiction; generating, by the computer system, information regarding potential lack of tax compliance of the entity for the certain tax jurisdiction based on the comparison; and transmitting, by the computer system, to a client computing device associated with the entity over a network a notification about the generation of the information.

Also disclosed herein is a method comprising: electronically accessing, by a computer system, information about goods or services sold by a plurality of entities; determining, by the computer system, for each entity of the plurality of entities, whether there exists a potential lack of transaction tax compliance of the entity in each tax jurisdiction of a plurality of tax jurisdictions based on the accessed information; and for each entity of the plurality of entities for which it is determined by the computer system there exists potential lack of tax compliance in one or more of the plurality of tax jurisdictions, electronically notifying the entity regarding the potential lack of tax compliance.

Also disclosed herein is another system comprising at least one processor and a memory coupled to the at least one processor. The memory stores instructions that, when executed by the at least one processor, cause the system to perform operations comprising: electronically accessing information about goods or services sold by a plurality of entities; determining for each entity of the plurality of entities, whether there exists a potential lack of transaction tax compliance of the entity in each tax jurisdiction of a plurality of tax jurisdictions based on the accessed information; and for each entity of the plurality of entities for which it is determined by a computer system there exists potential lack of tax compliance in one or more of the plurality of tax jurisdictions, electronically notifying the entity regarding the potential lack of tax compliance.

Also disclosed herein is a non-transitory computer-readable storage medium having computer-executable instructions stored thereon that, when executed by at least one processor, cause a system to perform operations comprising: electronically accessing information about goods or services sold by a plurality of entities; determining, for each entity of the plurality of entities, whether there exists a potential lack of transaction tax compliance of the entity in each tax jurisdiction of a plurality of tax jurisdictions based on the accessed information; and for each entity of the plurality of entities for which it is determined by a computer system there exists potential lack of tax compliance in one or more of the plurality of tax jurisdictions, electronically notifying the entity regarding the potential lack of tax compliance.

There are many types of taxes for businesses. Such taxes include sales tax, use tax, excise tax, value-added tax, industry-specific taxes, cross-border taxes, and so on (collectively referred to herein as "transaction taxes"). Further, for a single transaction, taxes may be due to more than one tax jurisdiction, such as different states, localities within the states, counties, cities, municipalities, etc.

Determining the taxes due is often very complex. There are over 10,000 tax jurisdictions in the US, and almost 10 million taxability rules related to various products and services. Complexities in determining the sales tax due may arise from the location of the buyer, the seller, a distributor, etc. For example, some state and local authorities tax have origin-based rules, which means that a sales tax is charged from the seller's location; other state and local authorities tax have destination-based rules, which means that a sales tax is charged from the buyer's location. Additional complexities arise from the fact that different tax jurisdictions charge different percentage rates. These different tax jurisdictions can be different states, counties, cities, municipalities, special taxing jurisdictions, and so on.

In addition to calculating the cost of the tax, sellers of goods and services are subjected to many requirements about the taxes they must collect and remit. In particular, a seller must determine whether, and when, they must collect and remit transaction taxes in each tax jurisdiction. For example, for each state, a seller may need to register with that state's taxing agency, set up internal processes for collecting sales tax in accordance with the tax rules of the state, keep records for the collected sales tax, file reports with the state, and finally pay the tax to the state. In the U.S., retailers must have some kind of presence in a state before that state can require that retailer to collect and remit sales tax from buyers in that state. With the Supreme Court ruling in the South Dakota v. Wayfair case, not only does physical presence (such as a location, employee or inventory), but "economic" presence in a state may create sales tax nexus. In other words, due to the Wayfair ruling, even if a retailer does not have a physical presence in a state, if the retailer passes a state's economic threshold, for example, for total revenue or number of transactions in that state, the retailer is legally obligated to collect and remit sales tax to that state. However, different states have different thresholds for determining whether there is an economic nexus, which provides a problem for retailers in determining whether they are compliant with the tax rules in various jurisdictions, especially when the retailers have ever-changing total revenue and numbers of transactions in various different jurisdictions.

Determining tax compliance under such circumstances for multiple retailers in various different jurisdictions according to the various different rules for the different tax jurisdictions and communicating such information to the retailers or other entities in real-time or near real time as transactions are occurring and nexus rules are changing presents a technical problem in order to do so in a timely and efficient manner over computer networks and in a way that integrates well into existing technical environments in which tax assistance is provided. The present disclosure provides systems and methods that solve this technical problem by increasing the speed, efficiency and accuracy of such specialized software platforms and computer networks.

Tax jurisdictions are defined mainly by geography, and therefore can promulgate tax rules for domains. Such tax jurisdictions are use cases of domains, tax rules are use cases of rules for domains, and tax rule compliance is a use case of domain rule compliance. Operational examples and sample use cases of embodiments include situations where geographic subdivisions are use cases of domains. For instance, US States, cities, and so on can be examples of domains.

Operational examples and sample use cases are possible where the attribute of an entity in a dataset is any one of the entity's name, type of entity, a physical location such as an address, a contact information element, an affiliation, a characterization of another entity, a characterization by another entity, an association or relationship with another entity (general or specific instances), an asset of the entity, a declaration by or on behalf of the entity, and so on. Different resources may be produced in such instances, and so on.

Use cases of embodiments, therefore include where the primary entity is a seller, the primary entity data is correspondingly seller data, primary entity profile is seller profile, and so on. Same with the secondary entity being a buyer, and so on. States are tax jurisdictions. They require the computation and payment of sales tax for sales transactions. Data about sales transactions are use cases for datasets of relationship instances.

Producing resources is a use case of computing a sales tax for a transaction. Being excused from having to produce resources is a use case of economic nexus, as described above for the Wayfair case. The running statistics can track, in a current year, the number of sales and their volume, meaning the total amount sold. Where nexus is not reached by other means, economic nexus may be reached anyway if the number of sales (datasets) and/or the volume of sales (total amount sold) exceeds a threshold within a current period, which is typically a year. As such, economic nexus represents a higher burden, and its threshold represents a higher burden threshold.

FIG. 26 is a block diagram showing an example configuration of a system 2600 working with a new service engine 2642 that generates tax compliance data 2680, in a use case of embodiments of the present disclosure. Elements of FIG. 26 can be examples of use cases of analogous elements in FIG. 1.

A sample customer entity 2619 can be a seller. The customer entity 2619 includes a computer 2612, and a user 2692 who may use computer 2612. Both could be located within a physical site of the customer entity 2619, but that is not necessary. In addition, a sample secondary entity 2696 is shown, which has at least one attribute. A use case of such an attribute is a component of an address. A geographic state 2632 may be identifiable from the address component, from among a plurality 2630 of geographic states. In this example, the plurality 2630 includes states 2631, 2632, 2633, . . . , and can be the fifty states of the US. In fact, the customer entity 2619 may have its own address, which is a use case of the attribute, from which the different state 2631 is identifiable.

The secondary entity 2696 can be a buyer, and may have a sample relationship instance 2697, such as a buy-sell transaction, with the customer entity 2619. Buy-sell transactions are examples of relationship instances in use cases of embodiments. Accordingly, a date associated with the relationship instance 2697 can be the date of the buy-sell transaction 2697. Because the states of the states of the seller 2619 and the buyer 2696 are different, the buy-sell transaction 2697 is an out-of-state transaction. More details about computer 2612 are provided with reference to FIG. 25. As seen elsewhere in this document, dataset may characterize the buy-sell transaction 2697.

In this example, a network 2694 is a communications network. Network 2694 can be any type of network, such as a local area network (LAN), a metropolitan area network (MAN), a wide area network (WAN), or the internet. In some embodiments, network 2694 is considered to be the cloud. An Enterprise Resource Planning (ERP) system 2621 may also be within network 2694, if it is the cloud, or accessible by computer 2612 via network 2694.

In this example, a software service platform 2640 is implemented by a server computer 2641 and a database 2646 storing data. Software service platform 2640 can be implemented in the cloud, on the premises of a provider, in a combination of the two, and so on. Of course, additional server computers may be used for a single service, for example in a peer-to-peer configuration, with the operations of the service distributed among them. The server computers can be located at a single geographic location or be distributed across multiple locations. Similarly, additional databases may be used for the service, and so on.

Server computer 2641 is configured, by software, to implement a service engine 2642. Service engine 2642 is configured, in embodiments, to perform a predefined service. The service can be a computation, a search, a verification, a registration, a payment, a notification, generation of specialized information and so on. According to various embodiments of the present disclosure, the service may be determining or generating information about potential lack of tax compliance of customer entity 2619 in various jurisdictions based on rules about establishing nexus for purposes of remitting transaction tax in the jurisdictions and/or transmitting a notification about the generation of the information. In some embodiments, the transmission of such information may alert the customer entity 2619 of the potential lack of tax compliance. The tax compliance data 2680 may be or include such information about potential lack of tax compliance.

In the context of FIG. 26, user 2692 desires the service, and may even pay for it. User 2692 uses computer 2612 to access network 2694 and, from network 2694, to access software service platform 2640. It will be appreciated that, in some contexts, service engine 2642 performs cloud computing and is provided as software as a service (SaaS). Moreover, computer 2612 can be viewed as a client computer from the perspective of software service platform 2640.

The service of service engine 2642 can be performed responsive to service engine 2642 being properly invoked. While being performed, the service may use data from database 2646.

Server computer 2641 further hosts a service engine (SE) Application Programming Interface (API) 2679. In some embodiments, SE API 2679 is configured to invoke service engine 2642 to perform its service, when properly requested. In various embodiments, service engine 2642 may perform its service without invocation by SE API 2679. For example, service engine 2642 may also or instead automatically invoke itself to perform the applicable service periodically and/or in response to one or more various conditions being satisfied, including, but not limited to, one or more of: a detected change or update to stored rules about establishing nexus for purposes of remitting transaction tax in a certain tax jurisdiction; a detected change or update to a monetary amount of sales of the customer entity 2619 that are associated with a certain tax jurisdiction; a detected change or update to a volume of sales transactions of the customer entity 2619 that are associated with a certain tax jurisdiction; one or more thresholds being met, within a predetermined threshold of being met, or being exceeded regarding sales associated with establishing nexus for purposes of remitting transaction tax in a certain tax jurisdiction; and conditions indicated by stored preferences of customer entity 2619.

SE API 2679 is configured to receive a request 2671, which is shown as an arrow. Request 2671 may be transmitted via network 2694. Request 2671 may have been ultimately caused to be generated by computer 2612, for example as operated by user 2692. In some embodiments, request 2671 is transmitted via network 2694 directly to SE API 2679. In other embodiments, computer 2612 causes ERP system 2621 to transmit request 2671. In yet other embodiments, ERP system 2621 originates request 2671 on behalf of customer entity 2619.

Request 2671 may also include associated request data 2672. When SE API 2679 receives request 2671 with its request data 2672, it invokes service engine 2642. When thus invoked, service engine 2642 may perform its service using request data 2672. In response, SE API 2679 can be configured to transmit a response 2674, also shown as an arrow. Response 2674 may include response data 2675 that arises out of the service, such as a computed result, a confirmation, and so on. Response 2674 can be transmitted back to the sender of request 2671, or as otherwise directed. In some embodiments, the request 2671 may be automatically generated and transmitted, such as by the ERP system 2621 and/or computer 2612 in response to one or more various conditions being satisfied, including, but not limited to, one or more of: a detected change or update to stored rules about establishing nexus for purposes of remitting transaction tax in a certain tax jurisdiction; a detected change or update to a monetary amount of sales of the customer entity 2619 that are associated with a certain tax jurisdiction; a detected change or update to a volume of sales transactions of the customer entity 2619 that are associated with a certain tax jurisdiction; one or more thresholds being met, within a predetermined threshold of being met, or being exceeded regarding sales associated with establishing nexus for purposes of remitting transaction tax in a certain tax jurisdiction; and conditions indicated by stored preferences of customer entity 2619.

In response to such a request being automatically generated, or in response to the service engine 2642 invoking itself, the service engine 2642 may generate and/or transmit tax compliance data 2680. For example, tax compliance data 2680 may be or include information about potential lack of tax compliance of customer entity 2619 in various jurisdictions based on rules about establishing nexus for purposes of remitting transaction tax in the jurisdictions and/or a notification about the generation of the information. In an example embodiment, the tax compliance data 2680 may be or include an alert or other notification that alerts the customer entity 2619 entity of the potential lack of tax compliance. In some embodiments, the tax compliance data 2680 may be used to update information regarding the potential lack of tax compliance for a certain tax jurisdiction within an account associated with the customer entity 2619. The account associated with the customer entity 2619 may be accessible by the customer entity 2619 via a client computing device, for example, the computer 2612, wherein the updated information regarding the potential lack of tax compliance is for display on a user interface associated with the account. Such a user interface may, in various embodiments, be a user interface of the server computer 2641, computer 2612, and/or a computer in ERP system 2621, and so on. Furthermore, the account associated with the customer entity 2619 may be managed, stored and/or accessible by the server computer 2641, computer 2612, and/or a computer in ERP system 2621, and so on.

Figure 27:
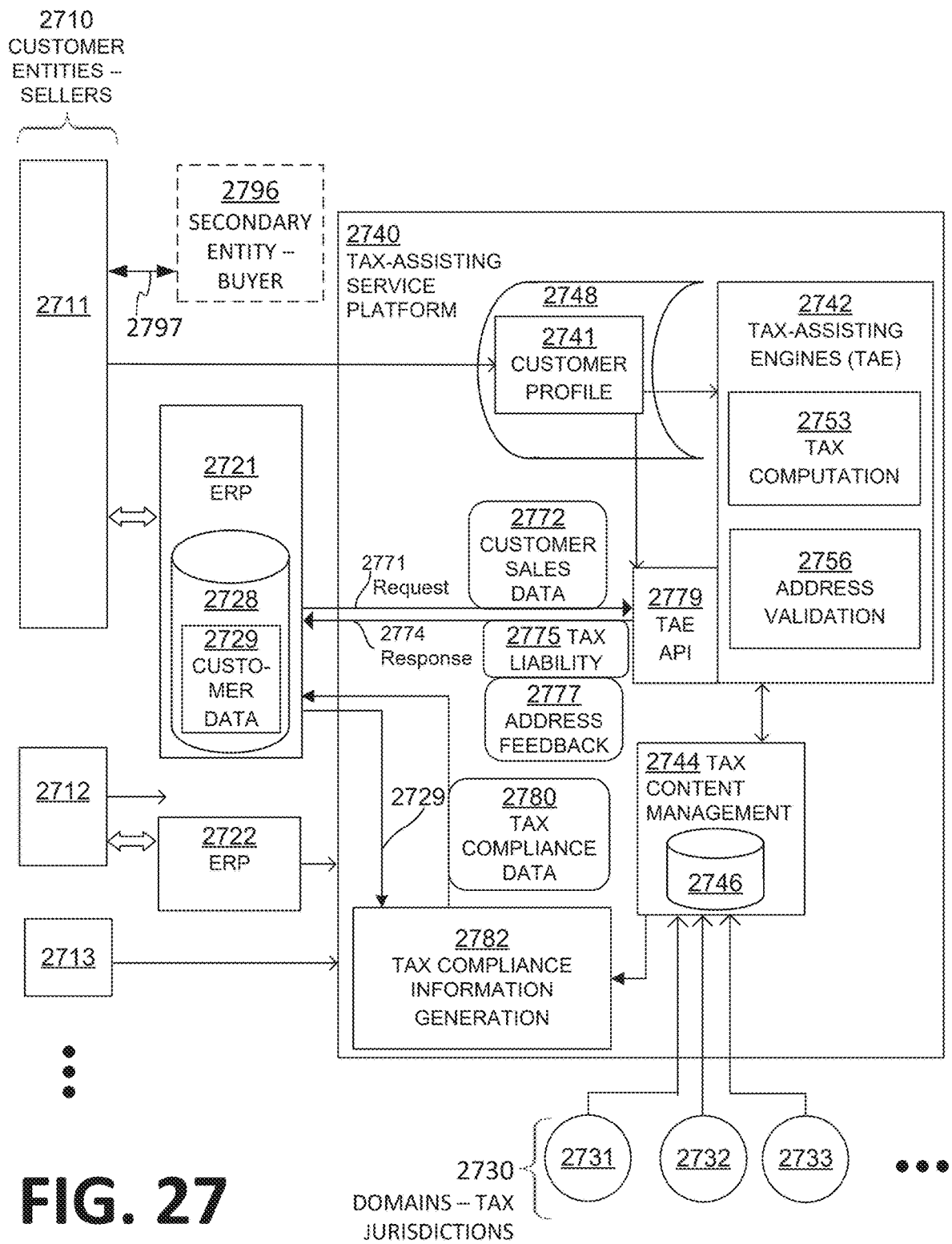
FIG. 27 is a block diagram showing an example software architecture working with a tax compliance information generation engine, in a use case of the first embodiments of the present disclosure.

FIG. 27 is a block diagram showing an example software architecture working with a tax compliance information generation engine 2782, in a use case of embodiments of the present disclosure. Elements of FIG. 27 can be examples of use cases of analogous elements in FIG. 26. At the bottom right, a plurality 2730 of tax jurisdictions of geographic entities, includes sample tax jurisdictions 2731, 2732, 2733, . . . . These are use cases of the domains 230.

In this example, a software-implemented tax-assisting service platform 2740 is configured to provide tax-related services. The tax-assisting service platform 2740 is a use case of the online service platform 240. These services may include determining potential lack of tax compliance in various different jurisdictions for the customer entities 2710, generating information regarding potential lack of tax compliance of the entity for the various tax jurisdictions, and/or transmitting one or more notifications about the generation of the information. For example, such a notification may be a notification to a particular customer entity 2711 that there is a potential lack of tax compliance of that customer entity 2711 in a certain tax jurisdiction. In some embodiments, these services may also include performing tax calculations and performing address validation for customer entities 2710, which can be sellers. Any one of sample customer entities 2711, 2712, 2713, . . . may be as described for customer entity 2619. In addition, a sample secondary entity 2796 is shown, which has at least one attribute. A use case of such an attribute is a component of an address. Similarly with FIG. 26, a geographic state, and therefore a tax jurisdiction 2732 may be identifiable from the attribute, from among the plurality 2730 of tax jurisdictions, even though this identification is not reflected by an arrow in FIG. 27, as it was in FIG. 26. In addition, the customer entity 2711 may have its own address, from which the different tax jurisdiction 2731 can be similarly identifiable.

The secondary entity 2796 can be a buyer, and may have a sample relationship instance 2797 with the sample customer entity 2711. The relationship instance 2797 can really be a buy-sell transaction 2797. Accordingly, a date associated with the relationship instance 2797 can be the date of the buy-sell transaction 2797. These customer entities 2710 may access a software-implemented tax-assisting service platform 2740, for receiving its tax-related services.

Aspects of FIG. 27 may be implemented by components described and shown elsewhere in this document, for example with reference to FIG. 25 and FIG. 26. For instance, in some embodiments, customer entities 2710 access tax-assisting service platform 2740 fully directly, for example as is shown for customer entity 2713. In other embodiments, this accessing is performed at least in part indirectly, for example by using Enterprise Resource Planning (ERP) systems 2721, 2722. In this example, ERP system 2721 has a database 2728 that stores customer data 2729 of customer entity 2711, such as sales data or other transaction data. For example, such sales data may be used by the tax compliance information generation engine 2782 data to determine potential lack of tax compliance in the various tax jurisdictions 2730 for the customer entities 2710. In this example, tax-assisting service platform 2740 includes a database 2748, and customer entity 2711 has stored their own customer profile 2741 in database 2748.

Tax-assisting service platform 2740 includes a tax content management component 2744 for use by TAE 2742 and the tax compliance information generation engine 2782. Tax content management component 2744 is a use case of domain rules management component 244. Tax content management component 2744 may receive tax information from one or more of the tax jurisdictions 2730. Tax content management component 2744 includes a database 2746 for storing the received tax information in the form of tax rules, rates, exemptions, etc. For example, the database 2746 may store rules about establishing nexus for purposes of remitting transaction tax in the various tax jurisdictions 2730. In some embodiments, such rules are rules about meeting or exceeding one or more thresholds regarding sales over a period of time.

Tax-assisting service platform 2740 includes tax-assisting engines (TAE) 2742. The tax-assisting engines TAE 2742 are use cases of the service-assisting engines (SAE) 242. In some embodiments, TAE 2742 includes a tax computation engine 2753, and even an address validation engine 2756. The tax computation engine 2753 is a use case of the resource production engine 253.

In this example, tax-assisting engines 2742 may be invoked via a TAE Application Programming Interface (API) 2779. The TAE API 2779 is a use case of the SAE API 279. Only one TAE API 2779 is shown implemented here, while multiple ones may be implemented instead, for example one for invoking each of tax computation engine 2753 and address validation engine 2756. In this example, TAE API 2779 is configured to receive a request 2771 or other information from ERP 2721. Request 2771 has data 2772 of customer entity 2711. Data 2772 may be looked up from customer data 2729 in database 2728. In various embodiments, data 2772 may also or instead be transmitted to one or more of the tax-assisting engines 2742 in response to a request from the respective tax-assisting engine. In some embodiments, data 2772 may also or instead be pushed to one or more of the tax-assisting engines 2742 from one or more of the customer entities 2710 and/or ERP system 2721, such as in response to the customer data 2729 being updated or changed, or on a periodic basis. In response to receiving request 2771 with its data 2772, TAE API 2779 invokes one of tax-assisting engines 2742 to perform its service. Then, TAE API 2779 is configured to transmit a response 2774. Response 2774 can be transmitted back to the sender of request 2771, or otherwise.

In some embodiments, customer data 2729 may be received by the tax compliance information generation engine 2782 from one or more of the customer entities 2710 and/or ERP system 2721. The customer data 2729 may be so received by being accessed, for example on a periodic basis or in response to the content of database 2746 becoming updated, as described later in this document. Or, the customer data 2729 may be so received by being pushed, such as in response to the customer data 2729 being updated or changed, or on a periodic basis. Or, this process may start, for example periodically, from the tax compliance client B282 if provided. In response to receiving the customer data 2729, the tax compliance information generation engine 2782 may perform its service and send the tax compliance data 2780. The tax compliance data 2780 may be transmitted back to the sender of the customer data 2729, to a corresponding customer entity 2710, or otherwise. In various embodiments, the tax compliance information generation engine 2782 may also or instead automatically invoke itself to perform the applicable service in response to one or more various conditions being satisfied, including, but not limited to, one or more of: a detected change or update to stored rules about establishing nexus for purposes of remitting transaction tax in a certain tax jurisdiction of tax jurisdictions 2730; a detected change or update to a monetary amount of sales, that are associated with a certain tax jurisdiction of tax jurisdictions 2730, of one or more of the customer entities 2710; a detected change or update to a volume of sales transactions, that are associated with a certain tax jurisdiction of tax jurisdictions 2730, of one or more of the customer entities 2710; one or more thresholds being met, within a predetermined threshold of being met, or being exceeded regarding sales associated with establishing nexus for purposes of one or more of the customer entities 2710 remitting transaction tax in a certain tax jurisdiction of tax jurisdictions 2730; and conditions indicated by stored preferences of one or more of the customer entities 2710. For example, such stored rules, including the thresholds, may be stored in the database 2746 of the tax content management component 2744 and accessible by the tax compliance information generation engine 2782. Also, records of the sales transactions for the customer entities 2710 may comprise and/or be part of the customer data 2729 and transmitted to the tax compliance information generation engine 2782. The stored preferences of one or more of the customer entities 2710 may also comprise and/or be part of the customer data 2729 and transmitted to the tax compliance information generation engine 2782.

In some embodiments, the customer data 2729 may be automatically transmitted to the tax compliance information generation engine 2782, such as by the ERP system 2721 and/or one or more of the customer entities 2710 in response to one or more various conditions being satisfied, including, but not limited to, one or more of: a detected change or update to stored rules about establishing nexus for purposes of remitting transaction tax in a certain tax jurisdiction of tax jurisdictions 2730; a detected change or update to a monetary amount of sales, that are associated with a certain tax jurisdiction of tax jurisdictions 2730, of one or more of the customer entities 2710; a detected change or update to a volume of sales transactions, that are associated with a certain tax jurisdiction of tax jurisdictions 2730, of one or more of the customer entities 2710; one or more thresholds being met, within a predetermined threshold of being met, or being exceeded regarding sales associated with establishing nexus for purposes of one or more of the customer entities 2710 remitting transaction tax in a certain tax jurisdiction of tax jurisdictions 2730; and conditions indicated by stored preferences of one or more of the customer entities 2710.

In response to the customer data 2729 being automatically transmitted to the tax compliance information generation engine 2782, or in response to the tax compliance information generation engine 2782 invoking itself when certain conditions are satisfied, the tax compliance information generation engine 2782 may generate and/or transmit tax compliance data 2780 based on received customer data 2729. For example, tax compliance data 2780 may be or include information about potential lack of tax compliance of one or more customer entities 2710 in various jurisdictions 2730 based on rules about establishing nexus for purposes of remitting transaction tax in the jurisdictions. Also, tax compliance data 2780 may be or include a notification about the generation of the information. In an example embodiment, the tax compliance data 2780 may be or include an alert or other notification that alerts one or more of the customer entities 2710 of the potential lack of tax compliance in one or more of the tax jurisdictions 2730. For example, the tax compliance information generation engine 2782 may periodically, or upon the customer data 2729 being updated, receive customer sales data that consists or is included in the customer data 2729 regarding sales of customer entity 2711 in one or more of tax jurisdictions 2730. The tax compliance information generation engine 2782 may then compare the sales data of the customer data 2729 against rules stored in database 2746 which are about establishing nexus for purposes of remitting transaction tax in each of the tax jurisdictions 2730. If, for example, based on the sales data included in the customer data 2729, the tax compliance information generation engine 2782 determines that the volume of sales transactions of customer entity 2711 meet, are within a predetermined threshold of meeting, or exceed a threshold indicated by the rules regarding establishing an economic nexus for tax jurisdiction 2731, then the tax compliance information generation engine 2782 may transmit a notification to customer entity 2711 that there is a potential lack of tax compliance for customer entity 2711 in tax jurisdiction 2731. This notification may be, or be part of the tax compliance data 2780. In various embodiments, the tax compliance information generation engine 2782 may perform such a service based on monitoring updates to the rules stored in database 2746 and monitoring the sales data of the customer data 2729 for each of the customer entities 2710 for each of the tax jurisdictions 2730 without needing to receive a specific request for such a service.

In some embodiments, the tax compliance data 2780 may be used to update information regarding the potential lack of tax compliance for one or more of the tax jurisdictions 2730 within an account associated with the one or more customer entities 2710. For example, an account associated with the customer entity 2711 may be associated with or include customer profile 2741 and accessible by the customer entity 2711 via the tax-assisting service platform 2740, wherein the updated information regarding the potential lack of tax compliance is for display on a user interface associated with the account. Furthermore, the account associated with the customer entity 2711 may be managed, stored and/or accessible by the customer entity 2711, the tax-assisting service platform 2740, and/or the ERP system 2721.

If tax computation engine 2753 is invoked by request 2771, it may calculate a tax liability of an amount of tax due, based on data 2772. The tax liability is a use case of the produced resource. In that case, response 2774 includes a component of a tax liability 2775 that indicates the calculated amount.

If address validation engine 2756 is thus invoked by request 2771, it may perform an address-validation process, based on data 2772. In that case, response 2774 includes a component of an address feedback 2777. The latter can be a message that an address is valid, or not, or propose a different address.

In some embodiments, tax-assisting service platform 2740 may perform a variety of services in addition to what is described above. For one example, tax-assisting service platform 2740 may accumulate and store customer sales data 2772.

In another example, tax-assisting engines 2742 and/or the tax compliance information generation engine 2782 may further include one or more additional engines and/or functional components than are shown in the example of FIG. 27. Such additional engines and/or functional components, upon being invoked, can perform additional tax-related services, such as: a) register one or more of customer entities 2710 with one or more appropriate tax jurisdictions 2730, b) generate tax returns, which are use cases of the resource-due reports, i.e., prepare forms for filing by customer entities 2710, c) file electronically such returns with the appropriate ones of tax jurisdiction(s) 2730, and so on. In some embodiments, one or more of such services may be performed by the TAE 2742 and/or the tax compliance information generation engine 2782 for one or more of the customer entities 2710, or a notification may be transmitted to one or more of the customer entities 2710 that such services are available or recommended, in response to a determination by the tax compliance information generation engine 2782 that there exists a potential lack of tax compliance for the one or more of the customer entities 2710.

Figure 28:
FIG. 28 shows sample received datasets in a use case of embodiments where the datasets represent sales transactions in different tax jurisdictions.

FIG. 28 shows sample received datasets 2809 in a use case of embodiments. The datasets 2809 include data corresponding to buy-sell transactions. In this example, the datasets 2809 are shown as they may have been received, and are not necessarily sorted. It will be recognized that the datasets 2809 are use cases of the datasets 1109.

The datasets 2809 include individual values for parameter value ID, which is an identifier of the dataset. They also include a parameter with a time value for the dataset. In this example, the time value is shown directly as a value for the calendar year in which the transaction occurred; it has one of the values 18, 19 and 20, for the calendar years (CYs) 2018, 2019 and 2020. In use cases, the time value is more detailed than the year, for instance it includes a date, and even a time, of a sale transaction.

The datasets 2809 are associated with domains—in this use case tax jurisdictions. They include parameter ST for the state of the buyer. In this example, the parameter ST has one of the values IL (Illinois), CA (California), NY (New York) and NJ (New Jersey).

The datasets 2809 also include a parameter BX. The parameter BX has a numerical base value for the sale price. Each dataset may have additional parameters, indicated by the dot-dot-dot.

In some embodiments, the received datasets are sorted, grouped or otherwise filtered so as to determine whether or not an economic nexus condition of the tax jurisdiction is met, or is within a predetermined threshold of being met. Examples are now described.

Figure 29:
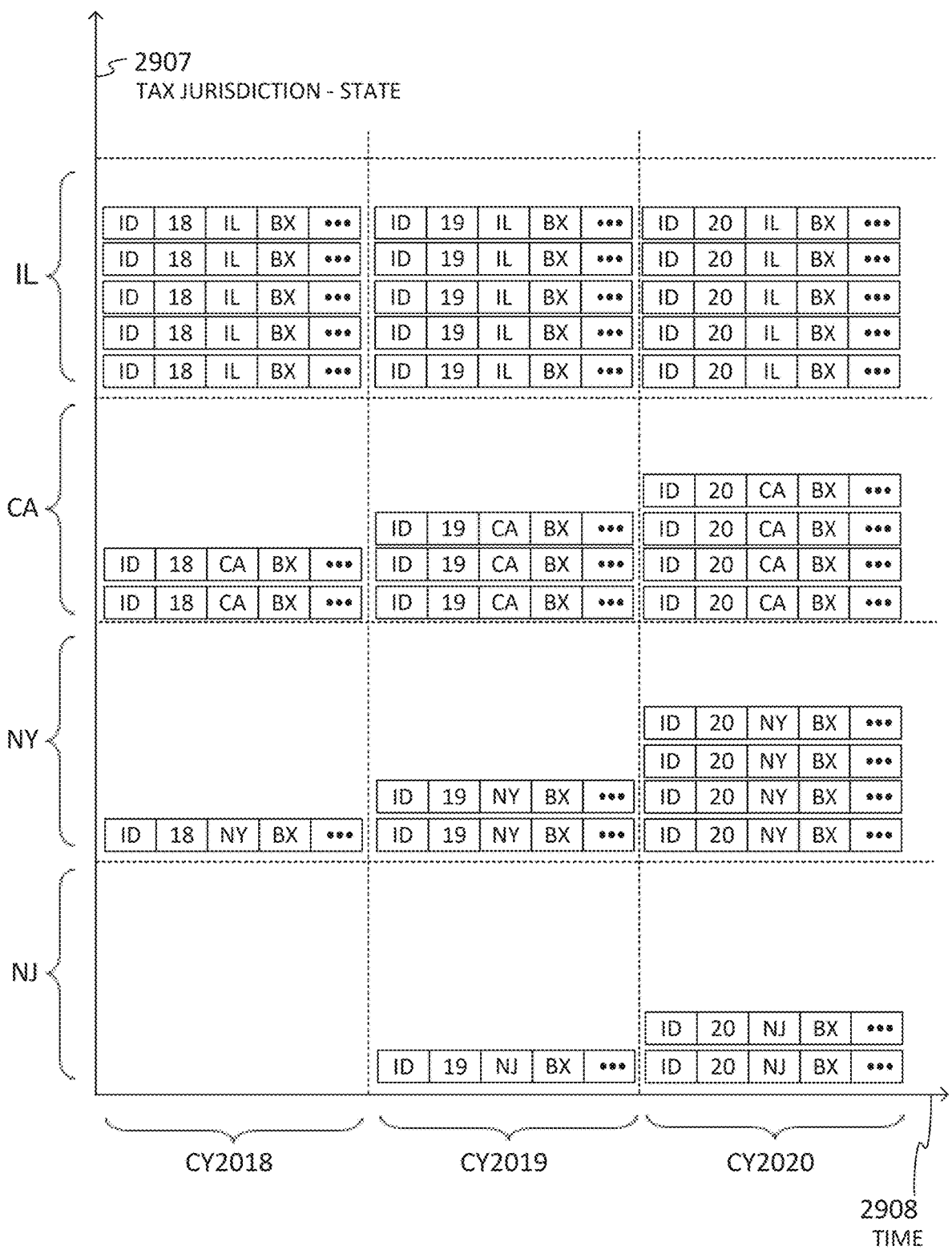
FIG. 29 shows the sample datasets of FIG. 28 after they have been sorted in a use case of embodiments.

FIG. 29 shows the sample datasets of FIG. 28, after they have been sorted such that they are grouped or categorized along a vertical domain axis 2907 for the states, and a horizontal time axis 2908. This sorting defines a matrix of cells by tax jurisdiction and by calendar year, and the datasets with the buy-sell transactions are categorized within the cells. The sorting indicates which sale transactions are taxable by which state and during which calendar year.

In some embodiments, it is determined whether or not an economic nexus condition of the tax jurisdiction is met from only the datasets of a single cell. Examples are now described.

Figure 30:
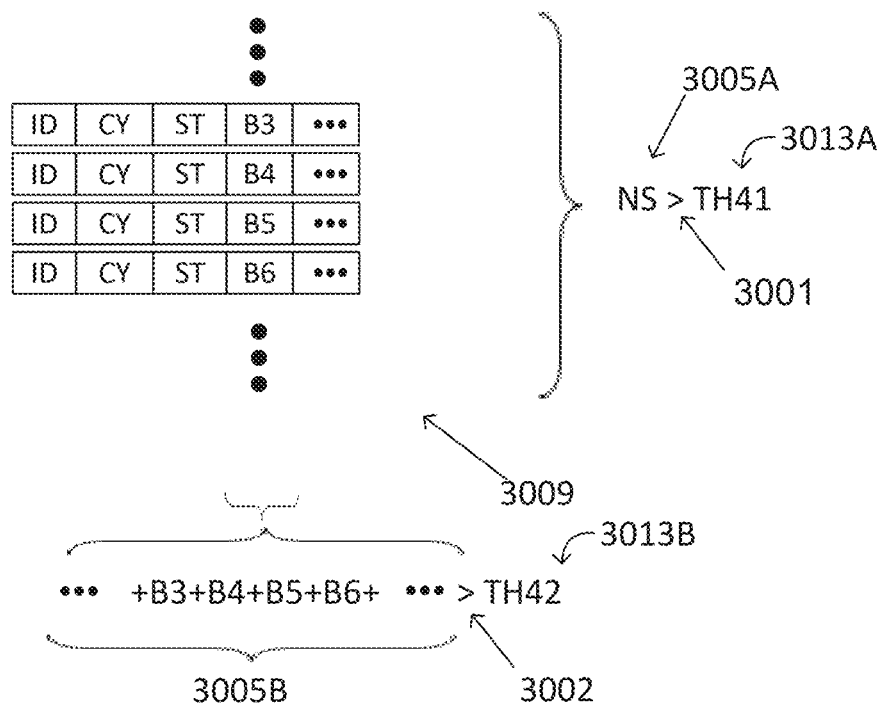
FIG. 30 shows examples of applying sample tax rules to the datasets sorted into a single cell of FIG. 29 in a use case of embodiments.

FIG. 30 shows sample datasets 3009 from a single one of the cells of FIG. 29. These could be the datasets of any one of these cells-indeed the datasets 3009 have a generic date value CY, and a generic tax jurisdiction value ST. What is shown, however, is their different numeric values . . . , 27, 31, 32, 33, . . . for the sales price parameter BX.

In some embodiments, the economic nexus condition is met if the number of the sales, i.e. of the datasets 3009, exceeds a first threshold. This is illustrated by an inequality equation 3001, where the number NS 3005A of these datasets 3009 is shown as larger than a first threshold TH41 3013A. For instance, the number of sales in the tax jurisdiction during the calendar year is more than a threshold number, such as 200. Conversely, the economic nexus condition is not met if the inequality equation 3001 is not met.

In some embodiments, the economic nexus condition is met if the sum of the numeric values of the parameter BX of the datasets 3009 exceeds a second threshold. This is illustrated by an inequality equation 3002, where the sum of these values 3005B is shown as larger than a second threshold TH42 3013B. For instance, the total sales in the tax jurisdiction during the calendar year is more than a certain amount. Conversely, the economic nexus condition is not met if the inequality equation 3001 is not met.

In addition, the economic nexus condition can be met if only one of these conditions apply, or both, and so on.

Figure 31:
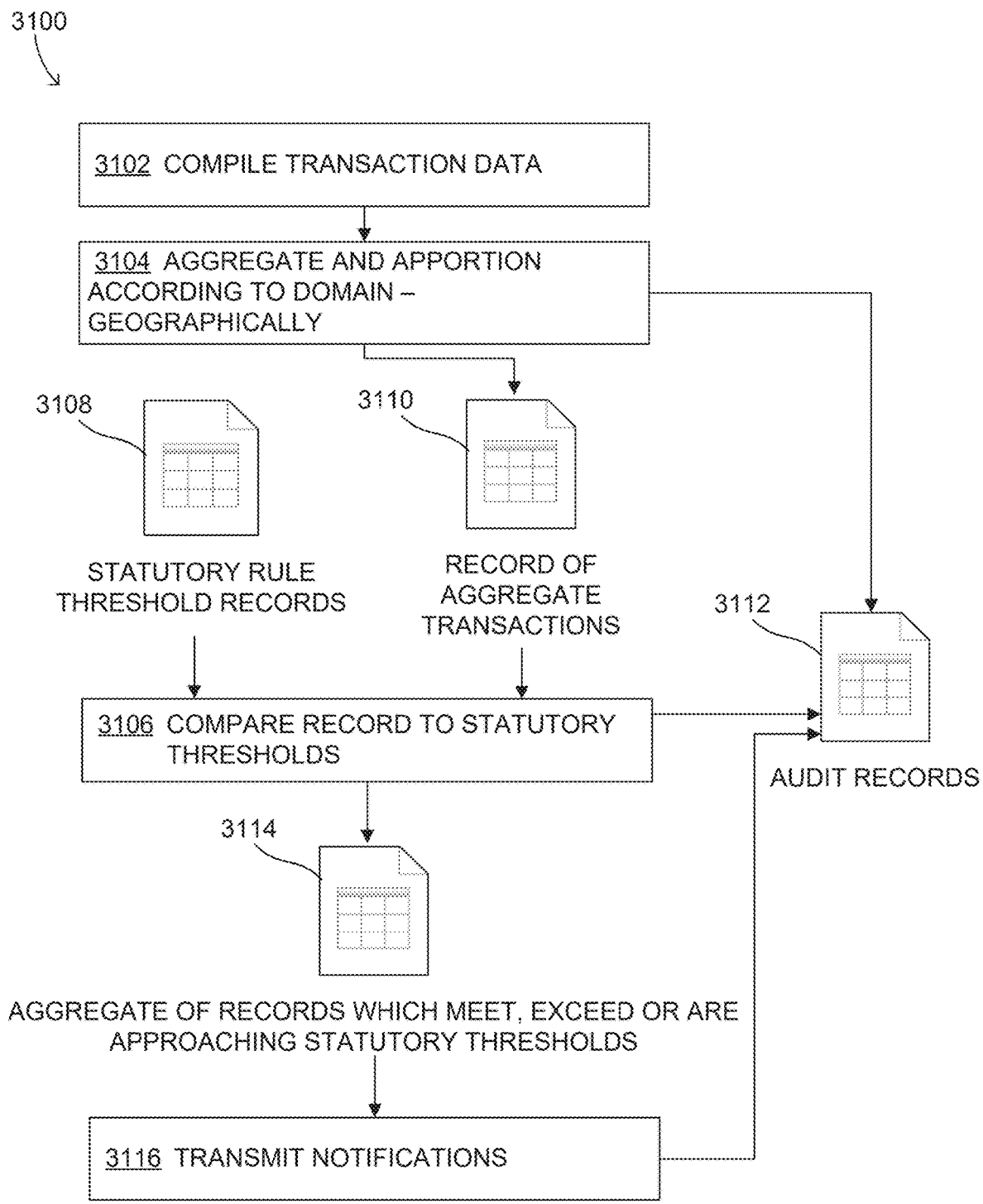
FIG. 31 is a flow diagram of an example process and corresponding data flow for transmitting notifications about information regarding potential lack of tax compliance, in a use case of embodiments of the present disclosure.

FIG. 31 is a flow diagram of an example process 3100 and corresponding data flow for transmitting notifications about information regarding potential lack of tax compliance, in a use case of embodiments of the present disclosure. Elements of FIG. 31 can be examples of use cases of analogous elements in FIG. 3.

At 3102, the tax compliance information generation engine 2782 of FIG. 27 may compile transaction data of customer entities, such as customer entities 2710 of FIG. 27. Data of such transactions, such as sales data, are use cases of relationship instance data in use cases of embodiments. For example, such transaction data may include data representing, for each of the customer entities 2710, a monetary amount of sales (e.g., revenue) associated with one or more of the tax jurisdictions 2730 and/or a volume of sales transactions (e.g., number of sales transactions) associated with one or more of the tax jurisdictions 2730. The tax compliance information generation engine 2782 may compile such data from one or more sources, including, but not limited to, data customer data 2729 from database 2728 and/or ERP system 2722 of FIG. 27.

At 3104, the tax compliance information generation engine 2782 may aggregate and apportion geographically the compiled transaction data to produce a record of aggregate transactions 3110. For example, to produce the record of aggregate transactions 3110, all sales made by customer entity 2711 of FIG. 27 over a specific period of time to purchasers in Texas may be apportioned to Texas for customer entity 2711 and all sales made by customer entity 2712 of FIG. 27 over a specific period of time to purchasers in Rhode Island may be apportioned to Rhode Island for customer entity 2712. Such data may be organized by total revenue and/or total transactions geographically per jurisdiction and per customer entity. Such data may also be organized according to other criteria, including, but not limited to: type of goods, products or services sold; exempt goods, products or services; date of transaction, which is the date of the relationship instance; evaluation period; location goods shipped to; location of seller; location of buyer and type of transaction. The tax compliance information generation engine 2782 may change the compiling, including organization, of such data based on corresponding changing rules, about establishing nexus for purposes of remitting transaction tax in the plurality of tax jurisdictions 2730. Such rules may include economic nexus requirements, for each jurisdiction and the tax compliance information generation engine 2782 may monitor such changes in the rules for each jurisdiction and update the rules accordingly. For example, the tax compliance information generation engine 2782 may access the rules from one or more sources, including, but not limited to, tax jurisdictions 2730 of FIG. 27. Such rules and corresponding updates may be stored in database 2746.

At 3106 the tax compliance information generation engine 2782 may compare the record of aggregate transactions 3110 for one or more customer entities 2730 to updated rules about establishing nexus for purposes of remitting transaction tax in the plurality of tax jurisdictions, which may include statutory rule threshold records 3108 that include rules regarding a monetary amount of sales that are associated with each of various tax jurisdictions and/or a volume of sales transactions that are associated with each of various tax jurisdictions. The statutory rule threshold records 3108 are use cases of the domain rule threshold records 308. Below are some examples of such rules for a sample group of individual tax jurisdictions in the U.S.

Idaho
    Effective date: Jun. 1, 2019
    Included transactions: Cumulative gross receipts from sales including taxable products and taxable services delivered into the state
    Treatment of exempt transactions: Exempt sales and exempt services are included in the threshold count
    Trigger: Sales only
    Sales/transactions threshold: $100,000
    Evaluation period: Threshold applies to the current or preceding calendar year New Mexico
    Effective date: Jul. 1, 2019
    Included transactions: Taxable gross receipts from taxable sales, taxable services, leases, and licenses of products, and sales of licenses and services of licenses for use of real property sourced to the state.
    Treatment of exempt transactions: Exempt sales and exempt services are not included in the threshold count
    Trigger: Sales only
    Sales/transactions threshold: $100,000
    Evaluation period: Threshold applies to the previous calendar year Rhode Island
    Effective date: Jul. 1, 2019
    Included transactions: Sales of tangible personal property, prewritten computer software, and vendor-hosted prewritten software delivered electronically or by load and leave, and/or taxable services
    Treatment of exempt transactions: Exempt sales are included but exempt services are not included in the threshold count
    Trigger: Sales or transactions
    Sales/transactions threshold: $100,000 or 200 transactions
    Evaluation period: Threshold applies to the preceding calendar year Texas
    Effective date: Oct. 1, 2019
    Included transactions: Sales of products and taxable services into the state
    Treatment of exempt transactions: Exempt sales and exempt services are included in the threshold count.
    Trigger: Sales only Sales/transactions threshold: $500,000
    Evaluation period: Threshold applies to the previous 12-months, with the initial 12 calendar months beginning Jul. 1, 2018 through Jun. 30, 2019

Virginia
    Effective date: Jul. 1, 2019
    Included transactions: Gross revenue from retail sales and taxable services into the state
    Treatment of exempt transactions: Exempt sales and exempt services are not included in the threshold count.
    Trigger: Sales or transactions
    Sales/transactions threshold: $100,000 or 200 transactions
    Evaluation period: Threshold applies to the current or previous calendar year For example, the tax compliance information generation engine 2782 may find in the record of aggregate transactions 3110 that customer entity 2711 has total sales of $550,000 of products and taxable services into Texas in the 12 months beginning Jul. 1, 2018 through Jun. 30, 2019. The tax compliance information generation engine 2782 may then search the statutory rule threshold records 3108 and find that the statutory threshold for Texas is $500,000. The statutory thresholds for establishing economic nexus are use cases for the domain rule thresholds. The tax compliance information generation engine 2782 may then compare the $550,000 in total sales into Texas for customer entity 2711 to the statutory threshold for Texas of $500,000 and record that it exceeds this statutory threshold for Texas. The tax compliance information generation engine 2782 may perform such comparisons for various different customer entities 2710 for various different jurisdictions 2730. For example, the tax compliance information generation engine 2782 may find in the record of aggregate transactions 3110 that customer entity 2712 has a total of 185 transactions for sales of tangible personal property into Rhode Island in the preceding calendar year. The tax compliance information generation engine 2782 may then search the statutory rule threshold records 3108 and find that the statutory threshold for Rhode Island is $100,000 total sales or 200 transactions. The tax compliance information generation engine 2782 may then compare the learned total number of 185 transactions apportioned to Rhode Island for customer entity 2712 to the statutory threshold for Rhode Island of 200 transactions and record that it is approaching this statutory threshold for Rhode Island (e.g., within a threshold number of 20 transactions of the 200 transaction threshold). Other thresholds may be used to determine whether the statutory threshold is being approached and such thresholds may be selectable by the customer entity and/or the tax compliance information generation engine 2782.

The comparison may include comparison of data representing various different other or additional criteria, which may, in some embodiments, be indicated by or otherwise based on the particular rules for specific jurisdictions including, but not limited to: type of goods, products or services sold; exempt goods, products or services; date of transaction; evaluation period; location goods shipped to; location of seller; location of buyer and type of transaction.

Based on such comparison, the tax compliance information generation engine 2782 may determine which records of the record of aggregate transactions apportioned geographically include transactions that meet, are within a predetermined threshold of meeting, and/or exceed one or more thresholds regarding sales for one or more of the corresponding individual tax jurisdiction associated with the geographical area. For example, the tax compliance information generation engine 2782 may generate an aggregate of records which meet, exceed or are approaching statutory thresholds 3114 for each jurisdiction for each customer entity. Also, in some embodiments, the tax compliance information generation engine 2782 may first check the statutory rule threshold records 3108 and then compare against the record of aggregate transactions 3110 to determine whether there are any records which meet, are within a predetermined threshold of meeting, and/or exceed one or more thresholds.

At 3116, the tax compliance information generation engine 2782 may then transmit corresponding notifications to each of the customer entities which, according to the aggregate of records, have transactions that meet, exceed or are approaching statutory thresholds for one or more of the corresponding individual tax jurisdiction. For example, the notification may indicate to the customer entity that there is a potential lack of tax compliance of the entity for the specific corresponding tax jurisdictions.

In the present example, the tax compliance information generation engine 2782 may transmit a notification to customer entity 2711 indicating that there is a potential lack of tax compliance in Texas based on the result of the comparison by the tax compliance information generation engine 2782 that indicates customer entity 2711 exceeds the statutory threshold of $500,000 in total sales for the preceding 12 month period in Texas. Also, the tax compliance information generation engine 2782 may transmit a notification to customer entity 2712 indicating that there is a potential lack of tax compliance approaching in Rhode Island based on the result of the comparison by the tax compliance information generation engine 2782 that indicates customer entity 2712 is approaching (e.g., within a threshold number of 20 transactions) the statutory threshold for Rhode Island for total number of transactions in the preceding calendar year.

Whether, when and how to receive notifications and which thresholds to use may be selectable by the individual customer entity and/or tax compliance information generation engine 2782. In various embodiments, such selectable features may include selectable items for amounts for sales revenue, number of transactions, number of jurisdictions, specific jurisdictions, types of transactions, periods of time, time of year, time of month, "notice and report" thresholds, etc. For example, particular customer entity 2711 may select to receive notifications when customer entity 2711 is within a selectable $20,000 threshold of meeting any statutory threshold for any jurisdiction. Other customer entities may select to receive notifications only when the threshold for a particular jurisdiction is met or exceeded. Notifications may be transmitted or initiated by various electronic techniques, including, but not limited to: email, updates to user accounts, text messages, automated phone calls, chat messages, web-based messages, desktop computer alerts, pop-up messages or alerts, mobile device messages, mobile device applications, etc. In some embodiments, a message may be electronically initiated by the tax compliance information generation engine 2782 to be sent by mail or courier to an address selected by the customer entity. In some embodiments, the notifications do not indicate there is a potential lack of tax liability, but just that there is a notification available for the customer entity and may include instructions or a link for receiving or otherwise accessing further information, including information regarding potential lack of tax compliance. In some embodiments, the notification regarding potential lack of tax compliance may include or provide access to a notification regarding a potential lack of tax compliance regarding reporting, collecting, and/or remitting transaction taxes for individual jurisdictions.

Such notifications may also include some or all of the results and underlying data involved in the comparison of the record of aggregate transactions 3110 to updated rules, and which transactions of the customer entity caused the determination of potential lack of tax compliance. Additionally, audit records 3112 of the aggregation and apportionment of transaction data 3104, the comparison to statutory thresholds 3106 and the transmission of notifications 3116 may be generated and stored by the tax compliance information generation engine 2782, and may also be accessible by the corresponding customer entities 2710 and/or the ERP system 2722.

Figure 32:
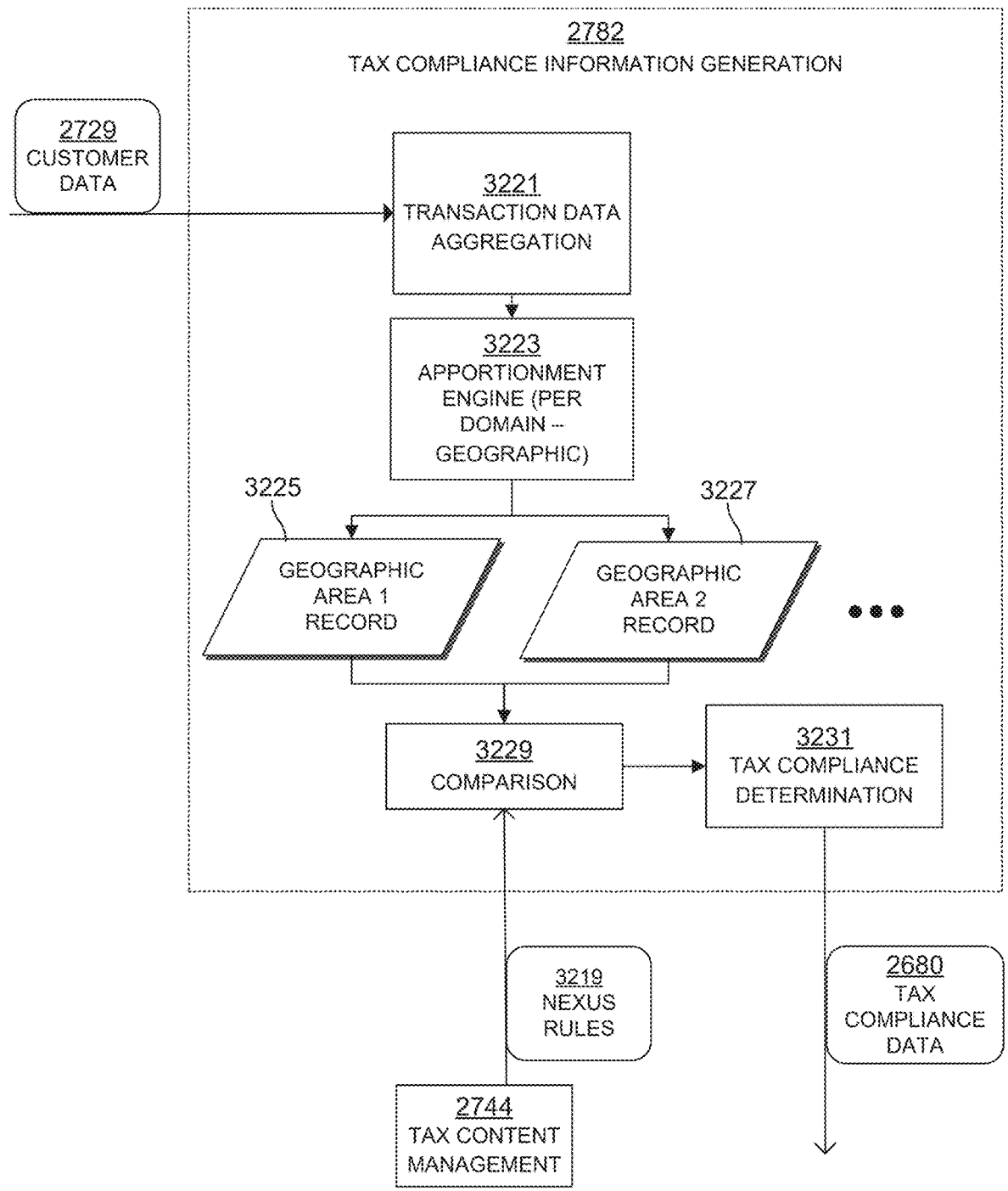
FIG. 32 is a block diagram showing more details of a tax compliance information generation engine of FIG. 27, in a use case of embodiments of the present disclosure.

FIG. 32 is a block diagram showing more details of a tax compliance information generation engine 2782 of FIG. 27, in a use case of embodiments of the present disclosure. Elements of FIG. 32 can be examples of use cases of analogous elements in FIG. 4.

Shown is a transaction data aggregation engine 3221 that may receive the customer sales data 2772. For example, the transaction data aggregation engine 3221 may compile transaction data of customer entities from customer sales data 2772, such as customer entities 2710 of FIG. 27. For example, such transaction data may include data representing, for each of the customer entities 2710, a monetary amount of sales (e.g., revenue) associated with one or more of the tax jurisdictions 2730 and/or a volume of sales transactions (e.g., number of sales transactions) associated with one or more of the tax jurisdictions 2730. Transaction data aggregation engine 3221 may receive the customer sales data 2772 and compile such data from one or more sources, including, but not limited to, data customer data 2729 from database 2728 and/or ERP system 2722 of FIG. 27.

Shown coupled to the transaction data aggregation engine 3221 is apportionment engine 3223 that may aggregate and apportion geographically the compiled transaction data from the transaction data aggregation engine 3221, to produce a record of transactions apportioned to each geographic region, which may each correspond to one or more individual tax jurisdictions. For example, transactions of a particular customer entity that occurred in (e.g., are for products that were shipped to) or are otherwise associated with geographic area 1 according to the rules for establishing nexus for the tax jurisdiction associated with geographic area 1 may be assigned, grouped or otherwise apportioned to geographic area 1 record 3225. Similarly, transactions of a particular customer entity that are associated with geographic area 2 according to the rules for establishing nexus for the tax jurisdiction associated with geographic area 2, may be assigned, grouped or otherwise apportioned to geographic area 2 record 3227, and so on. For example, the geographic area 1 record 3225, geographic area 2 record 3227, etc., may comprise the record of aggregate transactions 3110 of FIG. 31. In some embodiments, there may be a geographic area record of transactions in each tax jurisdiction in the U.S. (e.g., for each state of the U.S.) that has a requirement for establishing nexus for purposes of remitting transaction tax in that jurisdiction.

Shown as receiving the geographic apportionment records (e.g., geographic area 1 record 3225, geographic area 2 record 3227, etc.) from the apportionment engine 3223 is the comparison engine 3229. The comparison engine 3229 may compare the geographic apportionment records for one or more customer entities 2710 to updated nexus rules 3219 about establishing nexus for purposes of remitting transaction tax in the plurality of tax jurisdictions, which may include statutory rule threshold records from tax content management component 2744. For example, the statutory rule threshold records from tax content management component 2744 may include nexus rules 3219 regarding a monetary amount of sales that are associated with each of various tax jurisdictions and/or a volume of sales transactions that are associated with each of various tax jurisdictions.

Shown coupled to the comparison engine 3229 is a tax compliance determination engine 3231. The tax compliance determination engine 3231 is a use case of the domain rules compliance determination engine 431. Based on such comparison made by the comparison engine 3229, the tax compliance determination engine 3231 may determine which records of the geographic apportionment records (e.g., geographic area 1 record 3225, geographic area 2 record 3227, etc.) include transactions that meet, are within a predetermined threshold of meeting, and/or exceed one or more thresholds regarding sales for the corresponding individual tax jurisdiction associated with the geographical area. For example, based on such comparison made by the comparison engine 3229, the tax compliance determination engine 3231 may find that the records of geographic area 1 record 3225 for a particular customer entity exceed the threshold number of transactions in the applicable time period for the tax jurisdiction associated with geographic area 1. The tax compliance determination engine 3231 may then determine there is a potential lack of tax compliance of the particular customer entity in the tax jurisdiction associated with geographic area 1 based on this finding. The tax compliance determination engine 3231 may then generate tax compliance data 2780, which, for example, may be, include, or reference notifications to individual customer entities indicating potential lack of tax compliance in various jurisdictions.

Figure 33:
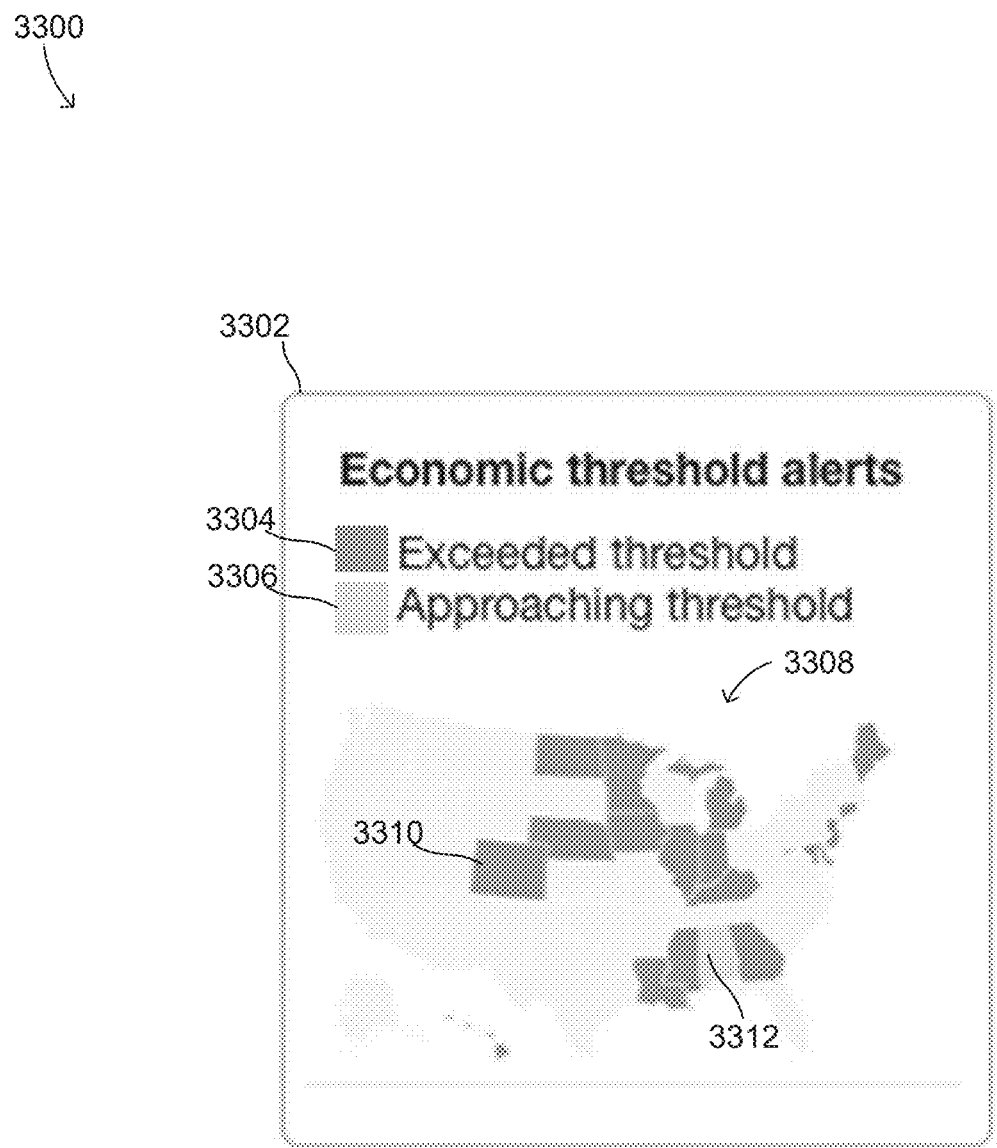
FIG. 33 depicts an example user interface showing example notifications about information regarding potential lack of tax compliance, in a use case of embodiments of the present disclosure.

FIG. 33 depicts an example user interface 3300 showing example notifications about information regarding potential lack of tax compliance, in a use case of embodiments of the present disclosure.

User interface 3300 includes a user interface screen 3302 showing an example of information regarding potential lack of tax compliance of a particular customer entity (e.g., customer entity 2713 of FIG. 27) for various tax jurisdictions. The user interface may include and/or represent tax compliance data 2780. Shown is a map 3308 of the U.S. having U.S. states highlighted in which the customer entity 2713 has a potential lack of tax compliance, for example, as determined by the tax compliance determination engine 3231 of the tax compliance information generation engine 2782. In some embodiments, the states may be color coded or otherwise differently highlighted or marked to indicate whether a threshold for establishing nexus for purposes of remitting transaction tax in that state is being approached or has been exceeded. For example, the user interface screen 3302 indicates that states for which the customer entity 2713 has exceeded a threshold of that state for establishing nexus are colored dark gray 3304 on the map 3308. The user interface screen 3302 indicates that states for which the customer entity 2713 is approaching a threshold of that state for establishing nexus are colored light gray on the map 3308.

In the example shown, among other states, the map 3308 indicates, by coloring Colorado 3310 dark gray 3304, that customer entity 2713 has exceeded the threshold of Colorado 3310 for establishing nexus in that state. Also, the map 3308 indicates, by coloring Alabama 3312 light gray 3306, that customer entity 2713 is approaching the threshold of Alabama 3312 for establishing nexus in that state. The user interface screen 3302, including the map 3308, may be updated dynamically, automatically and/or in real time or near real time by the tax compliance information generation engine 2782 for the applicable customer entity as sales of the customer entity change and/or rules for establishing nexus change for various jurisdictions. The user interface screen 3302, including the map 3308, may be accessible in an account associated with the particular customer entity and/or, in some embodiments, comprise or be included in an electronic notification regarding potential lack of tax compliance to the customer entity. For example, the user interface screen 3302, including the map 3308, may comprise or be included in, one or more of: an email, updates to user accounts, text messages, chat messages, web-based messages, desktop computer alerts, pop-up messages or alerts, mobile device messages, mobile device applications, etc. In some embodiments, a message that includes or refers to a representation or reproduction of the user interface screen 3302 may be electronically initiated by the tax compliance information generation engine 2782 to be sent by mail or courier to an address selected by the particular customer entity.

The map 3308 may also be interactive, for example, such that the user may click on or otherwise select one or more states and receive further information, options, actions and/or features pertaining to potential lack of tax compliance of the customer entity for that jurisdiction. For example, a user of the customer entity 2713 may click on Colorado 3310 and electronically receive or be presented with one or more of: information regarding rules for establishing nexus in Colorado; reasons for which there was a determination of potential lack of tax compliance in Colorado; which transactions of customer entity 2713 caused the determination of potential lack of tax compliance in Colorado; steps to become tax compliant in Colorado; options to select for the TAE 2742 and/or the tax compliance information generation engine 2782 to perform for customer entity 2713 to become tax compliant in Colorado; options to select for the TAE 2742 and/or the tax compliance information generation engine 2782 to initiate or perform registration with Colorado's taxing agency for collecting and/or remitting transaction taxes; options to select for the TAE 2742 and/or the tax compliance information generation engine 2782 to initiate or perform set up of internal processes for collecting sales tax in Colorado in accordance with the tax rules of that state; options to select for the TAE 2742 and/or the tax compliance information generation engine 2782 to initiate or perform keeping of records for the collected sales tax for Colorado; options to select for the TAE 2742 and/or the tax compliance information generation engine 2782 to initiate or perform filing of reports with Colorado; options to select for the TAE 2742 and/or the tax compliance information generation engine 2782 to initiate or perform paying or otherwise remitting of transaction taxes to Colorado; options to select for the TAE 2742 and/or the tax compliance information generation engine 2782 to initiate or perform requesting exemption certificates from tax exempt sellers for customer entity 2713 in Colorado. In various embodiments, such operations may be performed by the TAE 2742 and/or the tax compliance information generation engine 2782 for various other particular jurisdictions and, at the selection of the particular customer entity, automatically in response to a determination by the tax compliance information generation engine 2782 that there is a potential lack of tax compliance in the particular jurisdiction. For example, in response to the tax compliance information generation engine 2782 determining that customer entity 2713 has exceeded the threshold of Colorado 3310 for establishing nexus in that state, the TAE 2742 and/or the tax compliance information generation engine 2782 may automatically perform or take steps to initiate performance of registration of customer entity 2713 with Colorado's taxing agency for collecting and/or remitting transaction taxes and, in some embodiments, initiate or perform paying or otherwise remitting of transactions taxes to Colorado for customer entity 2713.

Figure 34:
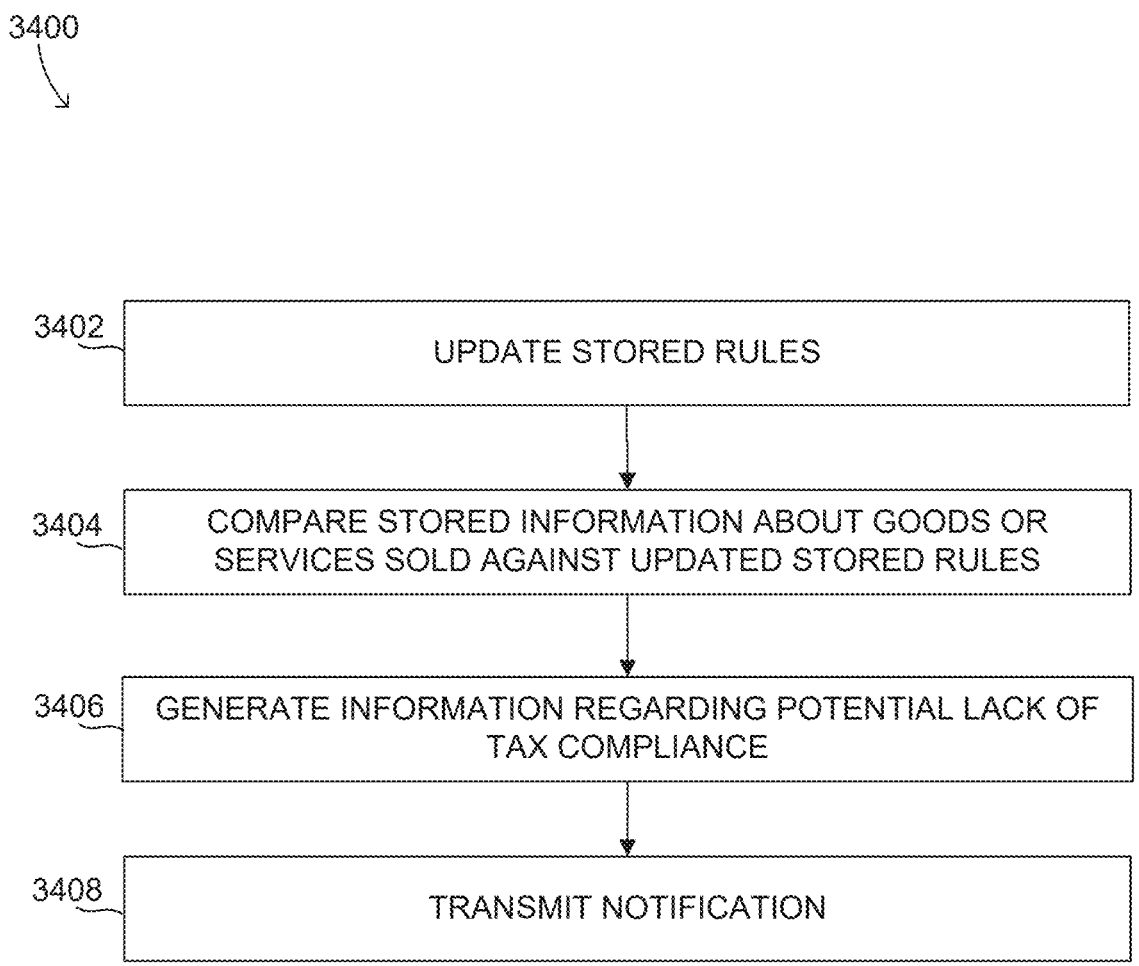
FIG. 34 is a flow diagram of an example process for generating information regarding potential lack of tax compliance of an entity and transmitting a corresponding notification, in a use case of embodiments of the present disclosure.

FIG. 34 is a flow diagram of an example process 3400 for generating information regarding potential lack of tax compliance of an entity and transmitting a corresponding notification, in a use case of various embodiments of the present disclosure. Elements of FIG. 34 can be examples of use cases of analogous elements in FIG. 5.

At 3402, the system 2600 updates stored rules for a certain one of a plurality of tax jurisdictions. The stored rules may be about establishing nexus for purposes of remitting transaction tax in the certain tax jurisdiction. The system 2600 may also monitor changes in rules for the plurality of tax jurisdictions and the updating the stored rules may be performed in response to the monitoring.

At 3404, the system 2600 compares stored information about goods or services sold by an entity in the certain tax jurisdiction against the updated stored rules for the certain tax jurisdiction. The comparing may include determining whether one or more thresholds regarding goods or services sold by the entity for establishing nexus for purposes of remitting transaction tax in the certain tax jurisdiction are met, are within a predetermined threshold of being met, or are exceeded. For example, the comparing may include comparing the stored information about goods or services sold by the entity to one or more thresholds regarding sales. The one or more thresholds regarding sales may be associated with requirements to remit transaction taxes for the certain tax jurisdiction.

In some embodiments, the comparing may be in response to the updating of the stored rules. The system 2600 may detect a change in the stored information about goods or services sold by the entity. The comparing may then be in response to the detected change in the stored information about goods or services sold by the entity. In some embodiments, the change in the stored information about goods or services sold by the entity is a change detected in one or more of: a monetary amount of sales of the entity that are associated with the certain tax jurisdiction and a volume of sales transactions of the entity that are associated with the certain tax jurisdiction.

At 3406, the system 2600 generates information regarding potential lack of tax compliance of the entity for the certain tax jurisdiction based on the comparison. The system 2600 may determine there is a potential lack of tax compliance of the entity in the certain tax jurisdiction if the one or more thresholds regarding sales associated with requirements to remit transaction taxes for the tax jurisdiction are met, are within a predetermined threshold of being met, or are exceeded.

At 3408, the system transmits over a network, to a client computing device associated with the entity, a notification about the generation of the information. In some embodiments, the information is presented graphically and/or includes a map of the certain tax jurisdiction. The transmitting the notification about the generation of the information may include alerting the entity of potential lack of tax compliance by at least causing an indication of each of the plurality of tax jurisdictions for which there exists a potential lack of tax compliance of the entity to be presented on a map. The transmitting of the notification may, in some embodiments, include aggregating the determined records of the one or more records of aggregate transactions. For each determined record of the aggregated determined records, the system 2600 may notify an entity associated with the determined record that there is a potential lack of tax compliance of the entity for one or more of the corresponding individual tax jurisdictions.

Figure 35:
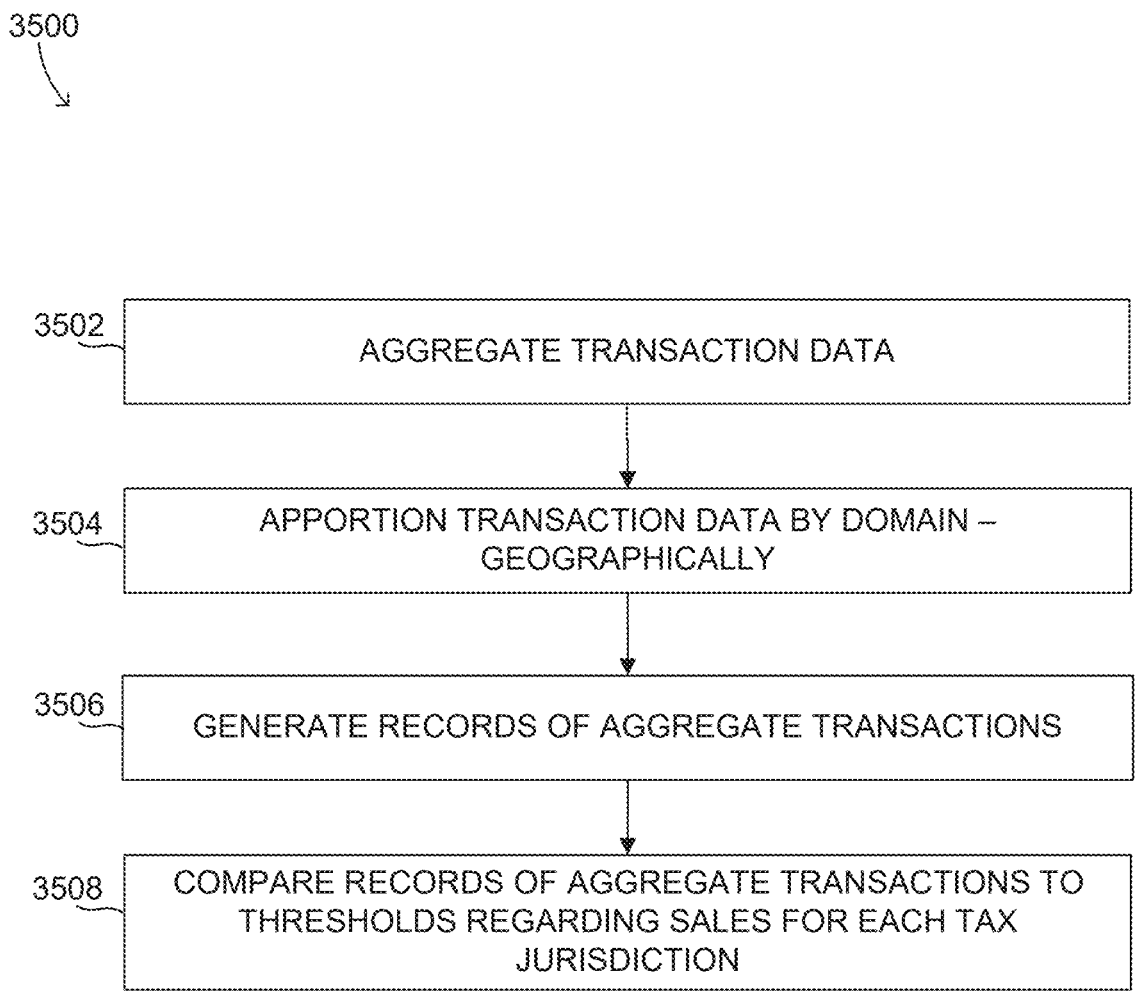
FIG. 35 is a flow diagram of an example process useful in generating information regarding potential lack of tax compliance, in a use case of embodiments of the present disclosure.

FIG. 35 is a flow diagram of an example process 3500 useful in generating information regarding potential lack of tax compliance, in a use case of the present disclosure. For example, comparing of stored information about goods or services sold by a plurality of entities against the stored rules about establishing nexus for purposes of remitting transaction tax in the plurality of tax jurisdictions may include the process 3500. Elements of FIG. 35 can be examples of use cases of analogous elements in FIG. 6.

At 3502, the system 2600 aggregates transaction data from the stored information about goods or services sold by the plurality of entities.

At 3504, the system apportions the transaction data geographically to corresponding individual tax jurisdictions of the plurality of tax jurisdictions.

At 3506, the system 2600 generates one or more records of aggregate transactions based on the apportioning. The generating one or more records of aggregate transactions may include determining, based on the comparing, which records of the one or more records of aggregate transactions meet, are within a predetermined threshold of meeting, or exceed one or more thresholds regarding sales for one or more of the corresponding individual tax jurisdictions.

At 3508, the system 2600 compares the one or more records of aggregate transactions to one or more thresholds regarding sales for each of the corresponding individual tax jurisdictions based on the apportioning. The one or more thresholds may be regarding sales associated with establishing nexus for purposes of remitting transaction tax in the corresponding individual tax jurisdictions.

Figure 36:
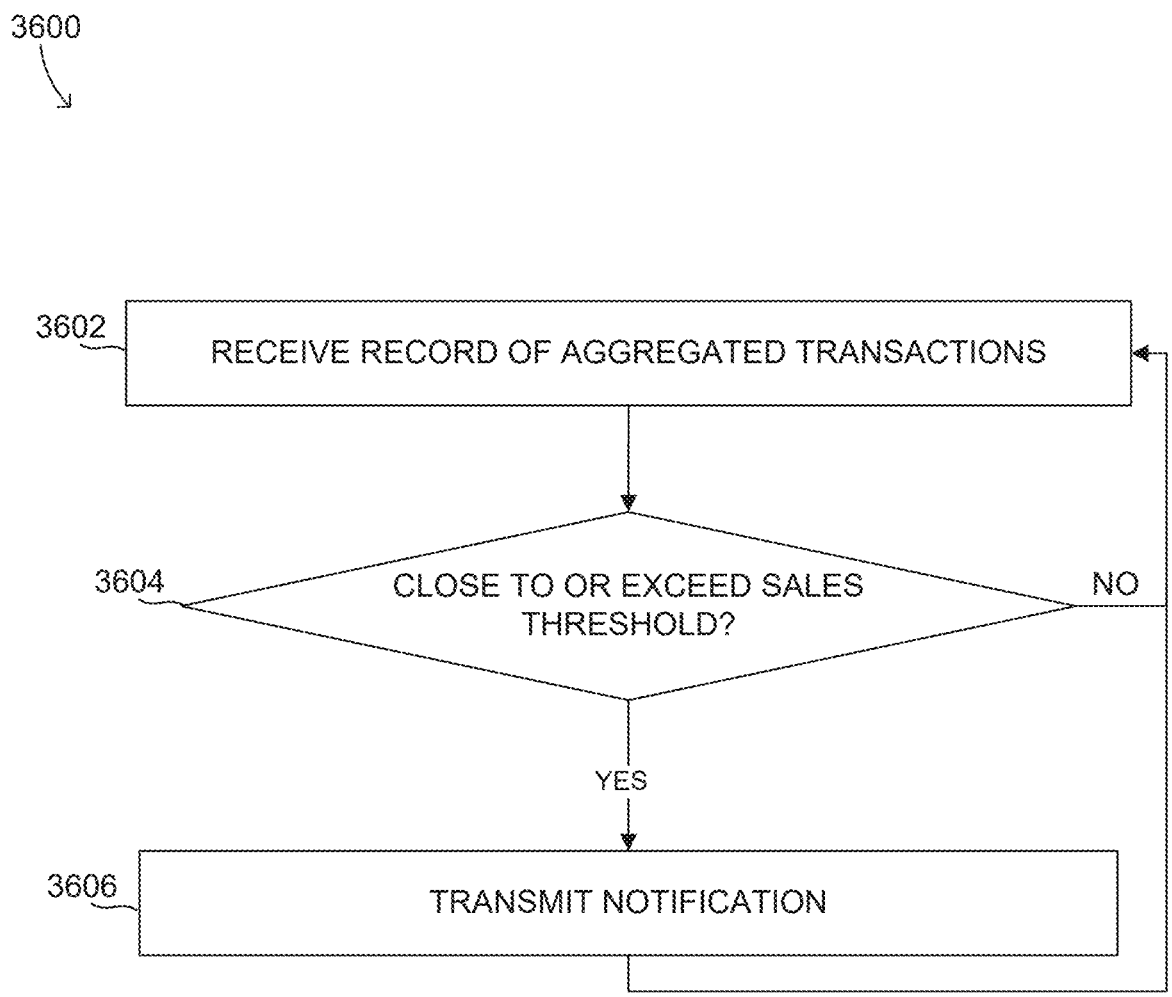
FIG. 36 is a flow diagram of an example process useful in determining for an entity whether there is a potential lack of tax compliance in a tax jurisdiction based on aggregated transactions, in a use case of embodiments of the present disclosure.

FIG. 36 is a flow diagram of an example process 3600 useful in determining for an entity whether there is a potential lack of tax compliance in a tax jurisdiction based on aggregated transactions, in a use case of embodiments of the present disclosure. Elements of FIG. 36 can be examples of use cases of analogous elements in FIG. 7.

At 3602, the system 2600 receives a record of aggregated transactions of a customer entity for a particular jurisdiction.

At 3604, the system 2600 determines whether the record of aggregated transactions for the jurisdiction meets, is within a predetermined threshold of meeting, or exceeds one or more thresholds regarding sales for the tax jurisdiction.

For example, the system 2600 may total the revenue received for all the transactions in the record and/or determine a total number of transactions over applicable periods of time and compare these totals to corresponding thresholds included in updated rules for establishing nexus for the tax jurisdiction to determine whether the corresponding totals meet, are within a predetermined threshold of meeting, or exceed the thresholds regarding sales for the tax jurisdiction.

If it is determined by the system 2600 at 3604 that the record of aggregated transactions for the jurisdiction does not meet, is not within a predetermined threshold of meeting and does not exceed the one or more thresholds regarding sales for the tax jurisdiction, then the process 3600 proceeds back to 3602 to receive a record of aggregated transactions of the particular customer entity for another jurisdiction. If it is determined at 3604 that the record of aggregated transactions for the jurisdiction meets, is within a predetermined threshold of meeting, or exceeds one or more thresholds regarding sales for the tax jurisdiction, then the process 3600 proceeds to 3606.

At 3606, the system 2600 transmits a notification to the entity associated with that there is a potential lack of tax compliance of the entity for the particular tax jurisdiction and the process proceeds to 3602 to receive a record of aggregated transactions of the customer entity for another jurisdiction. This notification may be transmitted in response to the determination by the system 2600 at 3604 that the record of aggregated transactions for the jurisdiction meets, is within a predetermined threshold of meeting, or exceeds one or more thresholds regarding sales for the tax jurisdiction.

Figure 37:
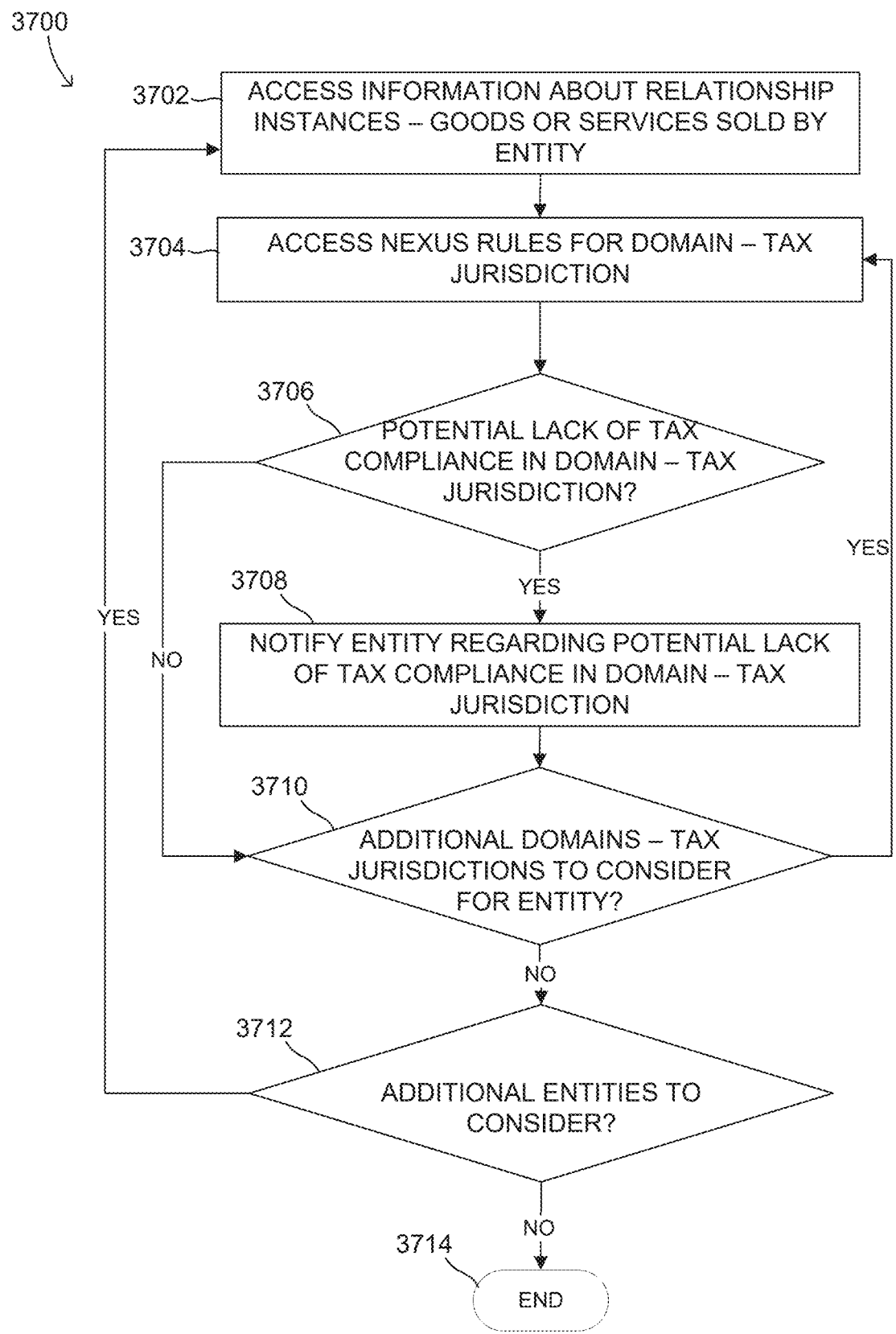
FIG. 37 is a flow diagram of an example process for notifying a plurality of entities whether there is a potential lack of tax compliance in a plurality of tax jurisdictions, in a use case of embodiments of the present disclosure.

FIG. 37 is a flow diagram of an example process 3700 for notifying a plurality of entities whether there is a potential lack of tax compliance in a plurality of jurisdictions, in a use case of embodiments of the present disclosure. Elements of FIG. 37 can be examples of use cases of analogous elements in FIG. 8.

At 3702, the system 2600 electronically accesses information about goods or services sold by a particular customer entity of a plurality of customer entities.

At 3704, the system 2600, electronically accesses rules for establishing nexus for a particular tax jurisdiction of a plurality of tax jurisdictions.

At 3706, the system 2600 determines whether there exists a potential lack of transaction tax compliance of the particular entity in the particular tax jurisdiction based on the accessed information. If it is determined by the system 2600 that there exists a potential lack of transaction tax compliance of the particular entity in the particular tax jurisdiction based on the accessed information, the process 3700 proceeds to 3708. If it is determined by the system 2600 that there does not exist a potential lack of transaction tax compliance of the particular entity in the particular tax jurisdiction based on the accessed information, the process 3700 proceeds to 3710.

At 3708, the system electronically notifies the entity regarding the potential lack of tax compliance.

At 3710, the system 2600 determines whether there are additional tax jurisdictions to consider for the particular entity, such as if the entity has transactions associated with an additional tax jurisdiction that has rules for establishing nexus for purposes of remitting transaction tax in that additional jurisdiction. If it is determined by the system 2600 that there are additional tax jurisdictions to consider for the particular entity, then the process proceeds to 3704 to access those particular rules for that additional jurisdiction. If it is determined by the system 2600 that there are no additional tax jurisdictions to consider for the particular entity, then the process proceeds to 3712.

At 3712, the system 2600 determines whether there are additional customer entities to consider, such as when there are additional customer entities that have transactions in one or more tax jurisdictions that have rules for establishing nexus for purposes of remitting transaction tax in that additional jurisdiction. If it is determined by the system 2600 that there are additional customer entities to consider, then the process proceeds to 3702 to access information about goods or services sold by that additional customer entity in a particular tax jurisdiction. If it is determined by the system 2600 that there are no additional customer entities to consider, then the process ends at 3714.

Figure 38:
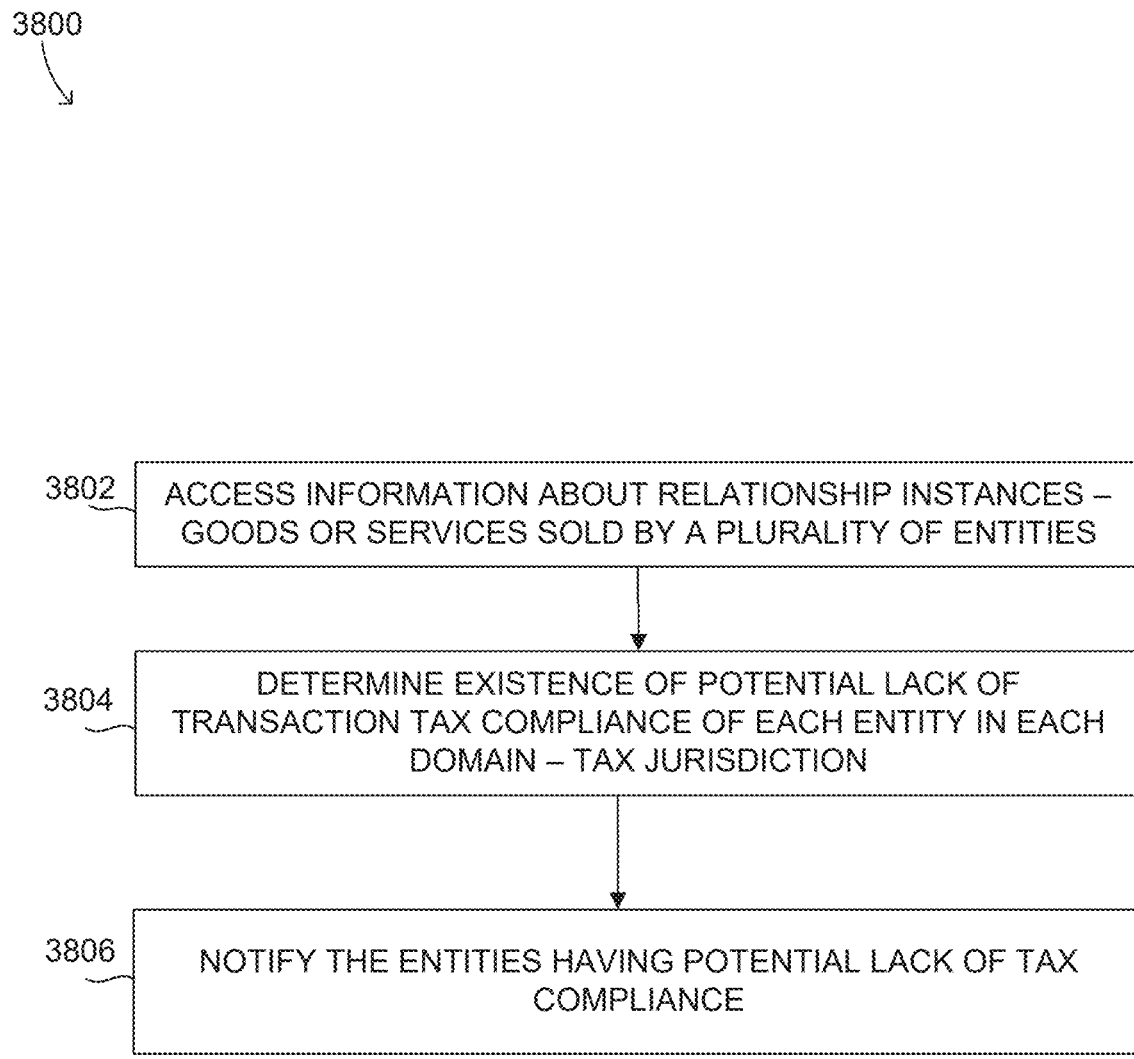
FIG. 38 is a flow diagram of another example process for notifying a plurality of entities whether there is a potential lack of tax compliance, in a use case of embodiments of the present disclosure.

FIG. 38 is a flow diagram of another example process 3800 for notifying a plurality of entities whether there is a potential lack of tax compliance, in a use case of embodiments of the present disclosure. Elements of FIG. 38 can be examples of use cases of analogous elements in FIG. 9.

At 3802, the system 2600 electronically accesses information about goods or services sold by a plurality of entities.

At 3804, the system 2600 determines, for each entity of the plurality of entities, whether there exists a potential lack of transaction tax compliance of the entity in each tax jurisdiction of a plurality of tax jurisdictions based on the accessed information.

At 3806, the system 2600, for each entity of the plurality of entities for which it is determined by the computer system there exists potential lack of tax compliance in one or more of the plurality of tax jurisdictions, electronically notifies the entity regarding the potential lack of tax compliance.

In some embodiments, the system 2600 may also obtain the information about goods or services sold by the plurality of entities. The system may perform this by, for each entity of the plurality of entities, accessing transaction calculations that were performed by the system for the entity for sales transactions associated with one or more of the plurality of tax jurisdictions for the goods or services. For example, the system 2600 may monitor sales transactions for the entity in one or more of the plurality of tax jurisdictions. In some embodiments, the system 2600 that monitors sales transactions for the entity in particular jurisdictions for purposes of determining whether there exists a potential lack of transaction tax compliance of the entity may be the same system (or communicate with the same system) that performs per-transaction transaction tax calculations for the entity in various other jurisdictions. Thus, moving from determining whether there exists a potential lack of transaction tax compliance of the entity in a particular jurisdiction to performing per-transaction transaction tax calculations for the entity in that jurisdiction may be made seamlessly based on utilizing the same or similar transaction monitoring systems. The determining whether there exists a potential lack of transaction tax compliance may include comparing the information about goods or services sold by the plurality of entities against stored rules for the plurality of tax jurisdictions. Such stored rules may be about establishing nexus for purposes of remitting transaction tax in a certain tax jurisdiction.

The comparing of the information about goods or services sold by the plurality of entities against stored rules for the plurality of tax jurisdictions may include aggregating transaction data from the information about goods or services sold by the plurality of entities; apportioning the transaction data geographically to corresponding individual tax jurisdictions of the plurality of tax jurisdictions; generating one or more records of aggregate transactions based on the apportioning; and comparing the one or more records of aggregate transactions to one or more thresholds regarding sales for each of the corresponding individual tax jurisdictions based on the apportioning. The one or more thresholds may be in regards to sales associated with establishing nexus for purposes of remitting transaction tax in the corresponding individual tax jurisdictions.

Use cases are now described where the seller is notified of the rare risk of negative consequences of FIG. 21, and their rare opportunity to avoid them.

FIG. 39 is a diagram for an operational example where a buy-sell transaction 3997 is a use case of the relationship instance 1797. The transaction 3997 is conducted between a primary entity 3993, which is a seller, and a secondary entity 3996, which is a buyer. The transaction 3997 is therefore a buy-sell transaction between them, for instance for a physical item, but it could be a non-physical item such as a digital item, a specific right, and so on. A tax obligation 3979 often arises from the transaction 3997—in particular a sales and/or use tax must be paid by either the primary entity 3993 or the secondary entity 3996. A computation of the tax obligation 3979 is a use case of producing the resource 1779. The tax obligation 3979 is variable when it is computed from the purchase price.

It will be recognized that aspects of FIG. 39 have similarities with aspects of FIG. 17. Portions of such aspects may be implemented as described for analogous aspects of FIG. 17. In particular, a thick horizontal line 3915 separates FIG. 39, although not completely or rigorously. Above the line 3915 are shown elements with emphasis mostly on entities, components, their relationships, and their interactions, while below the line 3915 are shown elements with emphasis mostly on processing of data that takes place often within one or more of the components that are shown above the line 3915.

Above the line 3915, a computer system 3995 is shown, which is used to help customers, such as a user 3992, with tax compliance. For instance, the user 3992 may log into the computer system 3995 by using credentials, such as a user name, a password, a token, and so on. Further in this example, the computer system 3995 is part of an OSP 3998 that is implemented as a Software as a Service (SaaS) provider, for being accessed by the user 3992 online. As such, the OSP 3998 can be an online service provider for clients. Alternately, the functionality of the computer system 3995 may be provided locally to a user.

The user 3992 may be standalone. The user 3992 may use a computer system 3990 that has a screen 3991. In embodiments, the user 3992 and the computer system 3990 are considered part of the primary entity 3993, which is also known as entity 3993. The primary entity 3993 can be a business, such as a seller of items, a reseller, a buyer, a service business, and so on. In such instances, the user 3992 can be an employee, a contractor, or otherwise an agent of the entity 3993.

The buyer 3996 can be an organization, a person, and so on. The buyer 3996 has a device 3932 with a screen 3933. The buyer 3996 may have used a device such as the device 3932 for the buy-sell transaction 3997.

The buy-sell transaction 3997 may involve an operation, such as an exchange of data to form an agreement. This operation can be performed in person, or over a network 3988, which can be as described elsewhere for communications networks, etc. In such cases the entity 3993 can even be an online seller, but that is not necessary. The transaction 3997 will have data that is known to the entity 3993, similarly with what was described by the relationship instance 1797 of FIG. 17.

In a number of instances, the user 3992 and/or the entity 3993 use software applications to manage their business activities, such as sales, resource management, production, inventory management, delivery, billing, and so on. The user 3992 and/or the entity 3993 may further use accounting applications to manage purchase orders, sales invoices, refunds, payroll, accounts payable, accounts receivable, and so on. Such software applications, and more, may be used locally by the user 3992, or from an Online Processing Facility (OPF) 3989 that has been engaged for this purpose by the user 3992 and/or the entity 3993. The OPF 3989 can be analogous to the OPF 1789. In such use cases, the OPF 3989 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on.

To help with such complex determinations, the computer system 3995 may be specialized for tax compliance. The computer system 3995 may have one or more processors and memory, for example as was described for the computer system 1795 of FIG. 17. The computer system 3995 thus implements a tax engine 3983 to make the determinations of tax obligations. The tax engine 3983 can be as described for the service engine 1783.

The computer system 3995 may further store locally entity data, i.e. data of user 3992 and/or of entity 3993, either of which/whom may be a customer, and/or a seller or a buyer in a sales transaction. The entity data may include profile data of the customer, and transaction data from which a determination of a tax obligation is desired. In the online implementation of FIG. 39, the OSP 3998 has a database 3994 for storing the entity data. This entity data may be inputted by the user 3992, and/or caused to be downloaded or uploaded by the user 3992 from the computer system 3990 or from the OPF 3989, or extracted from the computer system 3990 or from the OPF 3989, and so on. In other implementations, a simpler memory configuration may suffice for storing the entity data.

A digital tax content utility 3986 is further implemented within the OSP 3998. (The digital tax content utility 3986 is also shown below the line 3915.) The digital tax content utility 3986 can store digital tax rules 3970, which are shown outside the digital tax content utility 3986 as a detail of it. Other elements of the digital tax content utility 3986 may also be shown outside it. The digital tax content utility 3986 can store these digital tax rules 3970 for use by the tax engine 3983. As part of managing the digital tax content utility 3986, there may be continuous updates of the digital tax rules, by inputs gleaned from a set 3980 of different tax authorities 3981, 3982, . . . . Updating may be performed by humans, or by computers, and so on. As mentioned above, the number of the different tax authorities in the set 3980 may be very large. In such use cases, tax jurisdictions such as a country, a state, a county, a city, a municipality, etc. correspond to domains discussed earlier in this document.

For a specific determination of a tax obligation, the computer system 3995 may receive one or more datasets. A sample received dataset 3935 is shown below the line 3915. The dataset 3935 has parameters that can also be called dataset parameters, some of which can have respective dataset values, and can be otherwise examples of what was described for the dataset 1735 of FIG. 17. In this example, the computer system 3990 transmits a request 3984 that includes a payload 3934, and the dataset 3935 is received by the computer system 3995 parsing the received payload 3934. In this example the single payload 3934 encodes the entire dataset 3935, but that is not required, as mentioned above.

In this example, the dataset 3935 has been received because it is desired to determine any tax obligations arising from the buy-sell transaction 3997. As such, the sample received dataset 3935 has dataset parameters with values that characterize attributes of the buy-sell transaction 3997, as indicated by a correspondence arrow 3999. Accordingly, in this example the sample received dataset 3935 has a parameter ID with a value for an identity of the dataset 3935 and/or the transaction 3997. The dataset 3935 also has a parameter PE with a value for the name of the primary entity 3993 or the user 3992, which can be the seller making sales transactions, some perhaps online. The dataset 3935 further has an optional parameter PD with a value for relevant data of the primary entity 3993 or the user 3992, such as an address, place(s) of business, prior nexus determinations with various tax jurisdictions, and so on. The parameter PD is optional because it may be possible to look up its value from the parameter PE. The dataset 3935 also has a parameter SE with a value for the name of the secondary entity 3996, which can be the buyer. The dataset 3935 further has a parameter SD with a value for relevant data of the secondary entity 3996, entity-driven exemption status, and so on. In some instances, the parameter SD is optional, similarly with the parameter PD. The dataset 3935 has a parameter B2 with a numerical value for the sale price of the item sold. The dataset 3935 may further have additional dataset parameters, as indicated by the dot-dot-dot in the right side of the dataset 3935. These parameters may characterize further attributes, such as what item was sold, for example by a Stock Keeping Unit (SKU), how many units of the item were sold in the transaction 3997, a date and possibly also time of the transaction 3997, and so on.

In embodiments, the computer system 3995 may identify, from a characterized attribute of the dataset 3935, a state for the sale of the dataset. In the example of FIG. 39, a plurality 3960 of names for states are indicated. These names may include the state names 3961, 3962, 3963, . . . , such as Idaho, New Mexico, Rhode Island, Texas, Virginia and so on. Of those, the state name 3962 is identified. This identifying may be performed by one or more associations of the characterized attribute with states, attributes of states, lists of what states include, and so on. Sometimes the characterized attribute may even be the name of a state, such as a component of a mailing address. The identified state may be associated with the seller 3993 or the buyer 3996.

The digital tax content utility 3986 may store digital tax content about the identified state name 3962, and possibly also about other state names, similarly to what was described for the database 1746. This digital tax content utility 3986 may implement thresholds. One of these thresholds can be the economic nexus threshold 3913 for the identified state 3962.

In embodiments, an internal process 3940 may be performed to compute taxes for tax jurisdictions, such for as the identified state 3962, meaning the state that was identified by its name. The internal process 3940 can be as the process 1740. In embodiments, for a state, the internal process 3940 may be set up to produce, for datasets relating to the identified state, a sales tax having either a) a zero sales tax 3941 or b) a variable sales tax 3942.

The setting up can be indicated by a switch 3949, which can point to either one of these. The setting may be changed, either directly by the user 3992 or responsive to conditions being met. In this example, the switch 3949 is shown to select the zero sales tax 3941, and therefore that is what will be produced.

In embodiments, digital tax rules 3970 are provided for use by the OSP 3998. These are sometimes implemented within the digital tax content utility 3986. In the example of this diagram, only one sample digital tax rule is shown explicitly, namely rule T_R_RULE4 3974, while other such rules are indicated by the vertical dot-dot-dots.

In the example of FIG. 39, the digital tax rules 3970 are not being used, and thus are shown as crossed out. This is because the switch 3949 is not shown to select the variable sales tax 3942. As such, additional elements in FIG. 39 are also shown as crossed out.

Even though some elements are shown as crossed out, for completeness, more embodiments are described for when the switch 3949 would instead be shown to select the variable sales tax 3942. Responsive to that, the computer system 3995 would access the stored digital tax rules 3970 of the state that was identified. Then the computer system 3995 would be selecting a certain one of the accessed digital tax rules 3970. In this example, the rule T_R_RULE4 3974 would be thus selected, responsive to one or more of the dataset values of the dataset parameters of the dataset 3935, as per the arrows 3971. The selection of this particular rule is indicated also by the fact that an arrow 3978 begins from that rule. The selected rule may be associated with the identified state. In fact, the whole set of these rules 3970 may be associated with the identified state, while other sets (not shown) may be associated with different states. Then the computer system 3995 may compute a tax obligation for the dataset 3935, such as the tax obligation 3979, as indicated by the arrow 3978. In this example, the identified certain digital tax rule T_RULE4 3974 may specify that a sales tax is due, that the amount is to be determined by a multiplication of the sale price of the value of the parameter B2 by a specific rate, the tax return form that needs to be prepared and filed, a date by which it needs to be filed, and so on.

The computer system 3995 may then cause a tax obligation notification 3936 to be transmitted. In the example of FIG. 39, the tax obligation notification 3936 is caused to be transmitted by the computer system 3995 as an answer to the received dataset 3935. The tax obligation notification 3936 can be about an aspect of the tax obligation 3979, similarly with the resource notification 1736 of FIG. 17. For instance, the tax obligation notification 3936 may inform that the tax obligation 3979 has been determined, where it can be found, what it is, or at least a portion or a statistic of its content, and so on.

The tax obligation notification 3936 can be transmitted to one of an output device and another device that can be the remote device, from which the dataset 3935 was received. The output device may be the screen of a local user or a remote user. The tax obligation notification 3936 may thus cause a desired image to appear on the screen, such as within a Graphical User Interface (GUI) and so on. The other device may be a remote device, as in this example. In particular, the computer system 3995 causes the tax obligation notification 3936 to be communicated by being encoded as a payload 3937, which is carried by a response 3987. The response 3987 may be transmitted via a communications network 3988 responsive to the received request 3984. The communications network 3988 can be as described for the communications network 1788, even the same network. The response 3987 may be transmitted to the computer system 3990, or to the OPF 3989, and so on. As such, the other device can be the computer system 3990, or a device of the OPF 3989, or the screen 3991 of the user 3992, and so on. In this example the single payload 3937 encodes the entire tax obligation notification 3936, but that is not required, similarly with what is written above about encoding datasets in payloads. Of course, along with the aspect of the tax obligation 3979, it is advantageous to embed in the payload 3937 the ID parameter and/or one or additional more parameters of the dataset 3935. This will help the recipient correlate the response 3987 that they receive to their request 3984, and therefore match the received aspect of the tax obligation 3979 as the answer to the transmitted dataset 3935.

The digital tax rules 3970 can be implemented or organized in different ways. For example, these digital tax rules 3970 may have applicability conditions that relate to geographical boundaries, effective dates with possible temporary exceptions, item classification into categories, differently-treated parties, and so on, for determining where and when a certain digital tax rule is to be selected and applied, to determine the tax obligation 3979. These conditions may be expressed as logical conditions with ranges, dates, other data, and so on. Values of the dataset parameters of the dataset 3935 can be iteratively tested against these logical conditions according to arrows 3971. In such cases, the applicable tax rules may indicate how to compute one or more tax obligations, such as to indicate different types of taxes that are due, rules, rates, exemption requirements, reporting requirements, remittance requirements, the actual amounts of tax obligations, etc.

FIG. 39 also shows previously stored information 3910, which can be accessed. The previously stored information 3910 can be about previously received datasets that relate to sales of the seller 3993 in the identified state name 3962. The previously stored information 3910 can be previous datasets of previous sales in the same tax jurisdiction within the same year. Detailed examples of such datasets were given in FIG. 28 and FIG. 29 of this document. The previously stored information 3910 can be accessed on a number of occasions, for instance as was described for when and how the previously stored information 1710 is accessed.

FIG. 39 moreover shows that a running statistic 3905 can be computed. The running statistic 3905 may be computed from the dataset 3935 and from the previously stored information 3910 that was accessed. The running statistic 3905 may be for the seller 3993, for a specific state, and for the current time period, which is of the same time period as the dataset 3935. Sample such computations of running statistics are described in FIG. 13 and FIG. 30 of this document.

As also mentioned above, in embodiments one or more running statistics are further monitored in relation to their economic nexus threshold 3913. In particular, a prospective net gain 3975 may be estimated. The prospective net gain 3975 may be estimated when the running statistic 3905 is less than the economic nexus threshold 3913 for the identified state name 3962. The prospective net gain 3975 is what is expected to result in the current time period due to the running statistic 3905 reaching the economic nexus threshold 3913. After the running statistic 3905 exceeds the economic nexus threshold 3913 it is too late, and the prospective net gain 3975 becomes meaningless.

FIG. 39 furthermore shows that a determination 3985 may be made. The determination is whether or not the prospective net gain 3975 is less than a retroactive burden threshold. The retroactive burden is having to pay sales tax for all of the year so far, which is worse on the seller because the seller has not been collecting sales tax from the buyers in the year so far. The prospective net gain now in question is whether that retroactive sales tax will be recouped in the little time left in the current year, from subsequent sales in this state. The retroactive burden threshold is set according to the tolerance for the risk of paying such retroactive sales taxes, and can be set to zero, or a small number, depending on circumstances. For that tolerance, the seller may be sensitive to additional compliance burdens if the economic nexus threshold is exceeded in the current year, namely registering with one additional state, filing tax returns in it, and so on. Moreover, once economic nexus is established, these additional compliance burdens do not go away easily for the tax jurisdiction even in subsequent years, even if the sales diminish in the next year. On the other hand, if sales are paused only on a single jurisdiction but not in other jurisdictions, then the prospective net gain may be positive anyway. Either way, if the economic nexus condition depends on two thresholds, then it is possible that both would need to be monitored.

Considering all this, the seller may determine whether it is worth pausing sales for the current year in the tax jurisdiction, to avoid these burdens. In particular, FIG. 39 also shows that, if the determination 3985 results in an answer of YES then, a rare pause opportunity notification 3917 can be caused to be communicated to the seller 3993 such as to their computer screen 3991, and so on. The rare pause opportunity notification 3917 can be about issuing computer commands from the remote device to pause sales in that tax jurisdiction, which prevents generating and sending datasets that increase the running statistics within the current year. Upon receipt of the rare pause opportunity notification 3917, the user 3992 may decide whether to act upon the advice and pause the generation of the datasets until after the current year passes. The user 3992 may issue such computer commands to any functionality that controls the activity which generates and sends datasets, such as to the OPF 3989 that could be the online store. As a result, the running statistic 3905 will not reach the economic nexus threshold 3913 within the current year, which avoids the retroactive burden, and possibly future compliance burdens.

FIG. 40 shows a timing diagram 4001 for the admittedly rare scenario where the prospective net gain of FIG. 39 becomes negative near the end of the current year. It will be recognized that FIG. 40 shows a use case of FIG. 21.

In particular, the timing diagram 4001 has a vertical axis 4007 with an intercept for the economic nexus threshold 4013 for the identified tax jurisdiction, such as the state. The timing diagram 4001 also has a horizontal time axis 4008 with intercepts at times 4071 and 4074 for a current year 4011, which is followed by a next year 4012.

The timing diagram 4001 shows a plot of the time evolution of a running statistic 4006. A now time 4072 is when the year is almost done, for instance after a holiday shopping season. It could be, for instance, December 26. At the now time 4072, the plot is extrapolated, and it is observed that the running statistic 4006 is projected to reach the economic nexus threshold 4013 at a future time 4073, which could be December 30, i.e. very late within the current time year 4011.

Then, at the present time 4072, a prospective net gain 4099 is estimated for the future time 4073. The estimation is shown by a scale 4050. An expected retroactive burden 4051 is high, because it integrates almost the entire current year 4011. An expected future benefit 4052 is small, because little time is left in the current year 4011. Therefore, the prospective net gain 4099 is negative, which is also indicated by the upset emoji. As such, a rare pause opportunity notification (not shown) can be caused to be transmitted.

An additional aspect of this rare occurrence is how little time there is to react. That time is from the now time 4072 until before the future time 4073—it could be just a few days. A human user, left to their own devices and without computation and notification by a computer, might never catch this in time, and may become saddled with the expected retroactive burden 4051.

FIG. 41 is a sample view of a User Interface (UI) 4100, shown on a screen 4191. It will be recognized that FIG. 41 shows a use case of the embodiment of FIG. 22. The UI 4100 describes a sample notification of a rare risk, which supplies words to what was illustrated by the outcome of the scale 4050. The UI 4100 also describes a pause opportunity to avoid the risk. The pause opportunity is the opportunity of the seller to stop sales in the tax jurisdiction until the end of the current period. This way, the unfavorable prospective net gain 4099 can be avoided. Of course, this presupposes that the functionality that does the sales can pause them, either on the whole, or in a single jurisdiction.

Figure 42:
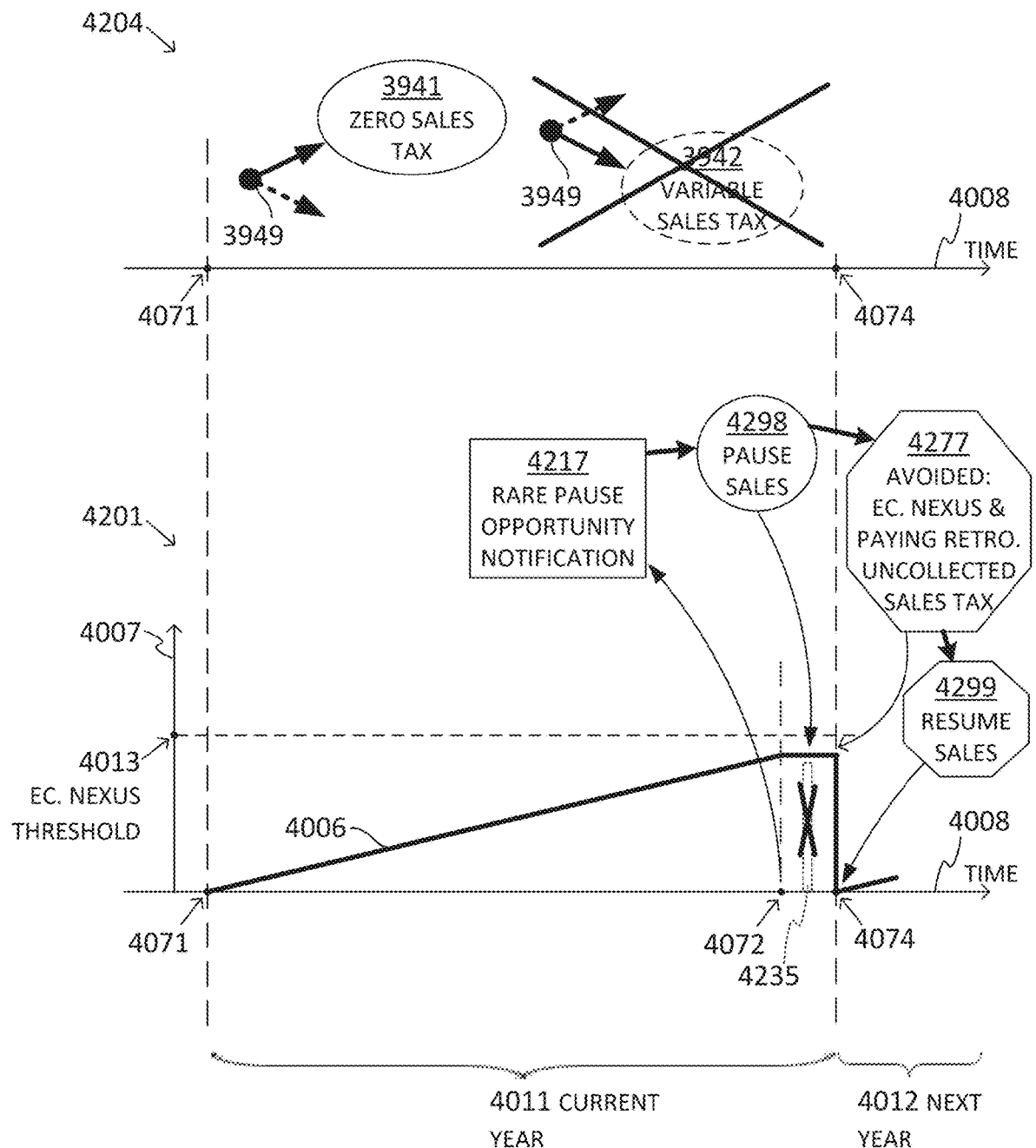
FIG. 42 shows how the timing diagram of FIG. 40 may evolve, if the rare pause opportunity notification of FIG. 41 is acted upon and the economic nexus threshold is thus not reached within the current year, in a use case of the second embodiments.

FIG. 42 shows timing diagrams 4201, 4204, which are use cases of FIG. 23. The timing diagram 4201 use the same axes as FIG. 40, and plots the evolution of the running statistic 4006. At the time 4072, a rare pause opportunity notification 4217 is given. According to a circle 4298, it is acted upon. This means that, shortly after the time 4072, datasets stop being received until the time 4074, which is the end of the current year 4011. In fact a sample dataset 4235 is shown when it would have been received, but it is crossed out—it has been sacrificed to avoid a relatively high retroactive burden.

Shortly after the time 4072, the running statistic 4006 continues as a horizontal line, and therefore remains under the economic nexus threshold 4013. As such, the economic nexus threshold 4013 is never reached within the current year 4011. When the next year 4012 starts at the time 4074, according to a comment 4277, the economic nexus threshold 4013 has been avoided for the year.

According to another comment 4299, sales resume in the next year 4012. Then, at the time 4074, the running statistic 4006 returns to zero for the next year 4012.

FIG. 42 also shows a timing diagram 4204, which repeats the horizontal time axis 4008. The timing diagram 4204 shows a time evolution of how the internal process 3940 is set up, according to the switch 3949.

At the beginning time 4071, the internal process is set up to produce, for datasets relating to the domain, a zero sales tax 3941. Since the economic nexus threshold 4013 was never reached, the internal process is not changed during the entire current year 4011. This lack of change is indicated in FIG. 42 by such a change later in the year that is crossed out.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

At least one of the methods of this description, when implemented by a computer, can be performed at the rate of at least 10 times per second.

In this description systems, methods, techniques, instruction sequences, and computing machine program products that embody illustrative embodiments of the disclosure are included. For the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A person skilled in the art will be able to practice the present invention in view of this description, which is to be taken as a whole. Details have been included to provide a thorough understanding. In other instances, well-known aspects have not been described, in order to not obscure unnecessarily this description.

The technique of three dots in the drawings: The drawings associated with this document may show three dots drawn in sequence, and in any orientation. This document may refer to a shown set of such three dots as "dot-dot-dot". Where shown next to an element, this set of three dots is used to indicate possible additional such elements while omitting drawing them, which helps unclutter the drawings. This technique for the drawings is analogous to the ellipsis used in writing. In particular, an ellipsis is a punctuation mark that consists of three dots or periods ( . . . ), and is used to indicate possibly more of what it follows, perhaps in sequence, while omitting writing the possibly more.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Incorporation by reference: References and citations to other documents, such as patents, patent applications, patent publications, journals, books, papers, web contents, have been made throughout this disclosure. All such documents are hereby incorporated herein by reference in their entirety for all purposes.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Like numerals may describe similar components in different views. Like numerals having different letter suffixes may represent different instances of similar components. Moreover, a further effort may have been made in the preparation of this description to use similar though not identical reference numerals to denote other versions or embodiments of an item, aspect, element, component or process that are identical, or at least similar or related. Where made, such a further effort was not required, but was nevertheless made gratuitously so as to facilitate comprehension by the reader. Even where made in this document, such a further effort might not have been made completely consistently for all of the versions or embodiments that are made possible by this description. Accordingly, the description controls in defining an item, aspect, element, component or process, rather than its reference numeral. Any similarity in reference numerals may be used to infer a similarity in the text, but not to confuse aspects where the text or other context indicates otherwise.

The claims of this document define certain combinations and subcombinations of elements, features and acts or operations, which are regarded as novel and non-obvious. The claims also include elements, features and acts or operations that are equivalent to what is explicitly mentioned. Additional claims for other such combinations and subcombinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

In construing the claims of this document, the inventor(s) invoke 35 U.S.C. § 112(f) only when the words "means for" or "steps for" are expressly used in the claims. Accordingly, if these words are not used in a claim, then that claim is not intended to be construed by the inventor(s) in accordance with 35 U.S.C. § 112(f).

The claimed invention is:

1. A computer system including at least:
one or more processors; and
a non-transitory computer-readable storage medium having stored thereon instructions which, when executed by the one or more processors, are designed to result in operations including at least:
  receiving, by the computer system from a remote device via a communications network, a dataset having dataset parameters of a relationship instance between a primary entity and a secondary entity, at least some of the dataset parameters having respective dataset values, at least one of the dataset values characterizing an attribute of one of the primary entity and the secondary entity, at least one of the dataset values characterizing a date of the relationship instance, the date being within a current time period;
  identifying, by the computer system and from the characterized attribute, a domain for the dataset out of a plurality of domains;
  producing, by the computer system, a resource having a value of zero for the dataset responsive to an internal process for the identified domain being set up to produce a resource having a zero value;
  else, responsive to the internal process being set up to produce for the identified domain a resource having a variable value:
    accessing, by the computer system, stored digital resource rules,
    then selecting, by the computer system and responsive to one or more of the dataset values, a certain one of the accessed digital resource rules that is associated with the identified domain, and
    then producing, by the computer system applying the certain digital resource rule to at least one of the dataset values, a resource for the dataset;
  then causing, by the computer system, a resource notification to be transmitted about an aspect of the produced resource to one of an output device and another device;
  accessing, by the computer system and responsive to the internal process being set up to thus produce a resource having zero value, previously stored information about previously received datasets for the primary entity that relate to the identified domain, the previously received datasets having respective dataset values characterizing respective previous dates that are within the current time period;
  computing, by the computer system, from at least one of the dataset parameters and from the previously stored information, a running statistic for the dataset and for the previously received datasets, the running statistic for the primary entity and for the current time period;
  estimating, by the computer system and when the running statistic is less than a higher-burden threshold for the identified domain, a prospective net gain that is expected to result within the current time period due to the running statistic reaching the higher-burden threshold;

determining, by the computer system, whether or not the prospective net gain is less than a retroactive burden threshold; and causing, by the computer system and responsive to determining that the prospective net gain is less than the retroactive burden threshold, a rare pause opportunity notification to be communicated to a device of the primary entity, the rare pause opportunity notification causing computer commands to be issued from the remote device to prevent activity that generates and sends datasets with dataset parameters that have dataset values characterizing the attribute of the certain entity and a date that is within the current time period, else not causing the rare pause opportunity notification to be thus communicated.

2. The computer system of claim 1, in which:

at least one of the dataset parameters has a numerical base value, and applying the certain digital resource rule includes performing a mathematical operation on the numerical base value.

3. The computer system of claim 1, in which:

at least one of the dataset parameters has a numerical base value, and applying the certain digital resource rule includes multiplying the numerical base value with a number indicated by the certain digital resource rule.

4. The computer system of claim 1, in which the operations further include:

estimating, by the computer system, an expected future benefit that is thus expected to result within the current time period; and estimating, by the computer system, an expected retroactive burden that is thus expected to result within the current time period, and in which the prospective net gain is estimated from a difference of the expected future benefit and the expected retroactive burden.

5. The computer system of claim 4, in which:

the expected retroactive burden is estimated from how much time is projected to have passed in the current time period, when the running statistic reaches the higher-burden threshold.

6. The computer system of claim 4, in which:

the expected future benefit is estimated from how much time is projected to be left in the current time period, when the running statistic reaches the higher-burden threshold.

7. The computer system of claim 1, in which:

the prospective net gain is estimated responsive to producing the resource.

8. The computer system of claim 1, in which:

the prospective net gain is estimated only after a certain portion of the current time period has passed.

9. The computer system of claim 1, in which:

the prospective net gain is estimated only after the running statistic reaches a threshold fraction of the higher-burden threshold.

10. The computer system of claim 1, in which the operations further include:

computing, by the computer system, a diminishing difference between the running statistic and the higher-burden threshold;

determining, by the computer system, whether or not the diminishing difference is within a margin threshold, and in which the prospective net gain is estimated responsive to the diminishing difference being within the margin threshold.

11. The computer system of claim 1, in which the operations further include:

then estimating again, by the computer system and when the running statistic is less than a higher-burden threshold for the identified domain, an updated prospective net gain that is expected to result within the current time period due to the running statistic reaching the higher-burden threshold;

determining again, by the computer system, whether or not the updated prospective net gain is less than the retroactive burden threshold; and causing, by the computer system and responsive to determining that the updated prospective net gain is less than the retroactive burden threshold, the rare pause opportunity notification to be thus communicated.

12. The computer system of claim 1, in which the operations further include:

causing, by the computer system and responsive to the current time period passing, a resume notification to be communicated about the domain to a device of the primary entity, about issuing computer commands from the remote device to resume activity that generates and sends datasets with dataset parameters that have dataset values characterizing the attribute of the certain entity.

* * * * *